(12) United States Patent
Macciola et al.

(10) Patent No.: US 9,117,117 B2
(45) Date of Patent: Aug. 25, 2015

(54) SYSTEMS AND METHODS FOR MOBILE IMAGE CAPTURE AND PROCESSING

(71) Applicant: Kofax, Inc., Irvine, CA (US)

(72) Inventors: Anthony Macciola, Irvine, CA (US); Alexander Shustorovich, Pittsford, NY (US); Christopher W. Thrasher, Rochester, NY (US)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 14/569,375

(22) Filed: Dec. 12, 2014

(65) Prior Publication Data

US 2015/0098628 A1  Apr. 9, 2015

Related U.S. Application Data

(63) Continuation of application No. 14/334,558, filed on Jul. 17, 2014, now Pat. No. 8,971,587, which is a continuation of application No. 13/740,123, filed on Jan. 11, 2013, now Pat. No. 8,855,375.

(60) Provisional application No. 61/586,062, filed on Jan. 12, 2012, provisional application No. 61/720,958, filed on Oct. 31, 2012.

(51) Int. Cl.
  *G06K 9/00* (2006.01)
  *G06T 7/00* (2006.01)
  *G06Q 40/00* (2012.01)

(52) U.S. Cl.
  CPC .......... *G06K 9/00463* (2013.01); *G06T 7/0085* (2013.01)

(58) Field of Classification Search
  USPC ......... 382/100, 103, 106, 113–116, 135–140, 382/155, 168, 173–194, 199, 209–220, 232, 382/254, 266, 274, 276, 286–294, 305, 312, 382/321, 167, 112; 705/38; 235/379; 709/203; 348/222.1
  See application file for complete search history.

(56) References Cited

U.S. PATENT DOCUMENTS 5,101,448 A  3/1992  Kawachiya et al.
5,586,199 A  12/1996  Kanda et al.
(Continued)

FOREIGN PATENT DOCUMENTS

JP  H07260701 A  10/1995
JP  H11118444 A  4/1999
(Continued)

OTHER PUBLICATIONS

International Search Report and Written Opinion from International Application No. PCT/US2013021336, dated May 23, 2013.
(Continued)

*Primary Examiner* — Seyed Azarian
(74) *Attorney, Agent, or Firm* — Zilka-Kotab, PC

(57) ABSTRACT

In various embodiments, methods, systems, and computer program products for capturing and processing digital images captured by a mobile device are disclosed. The claimed algorithms are specifically configured to perform and facilitate loan application processing by capturing an image of a document using a mobile device, and analyzing the image (optionally in conjunction with additional data that may also be captured, determined, or otherwise provided to the loan application process) to determine loan-relevant information. Select loan-relevant information may be extracted, compiled, and/or analyzed to facilitate processing of the loan application. Feedback may be provided to facilitate facile application processing, e.g. by ensuring all requisite information is submitted with the loan application. Image capture and document detection are preferably performed using the mobile device, while all other functions may be performed using the mobile device, a remote server, or some combination thereof.

20 Claims, 34 Drawing Sheets

(56) References Cited

U.S. PATENT DOCUMENTS

| | | | |
|---|---|---|---|
| 5,596,655 | A | 1/1997 | Lopez |
| 5,680,525 | A | 10/1997 | Sakai et al. |
| 5,760,912 | A | 6/1998 | Itoh |
| 5,987,172 | A | 11/1999 | Michael |
| 6,038,348 | A | 3/2000 | Carley |
| 6,215,469 | B1 | 4/2001 | Mori et al. |
| 6,433,896 | B1 | 8/2002 | Ueda et al. |
| 6,456,738 | B1 | 9/2002 | Tsukasa |
| 6,614,930 | B1 | 9/2003 | Agnihotri et al. |
| 6,667,774 | B2 | 12/2003 | Berman et al. |
| 6,831,755 | B1 | 12/2004 | Narushima et al. |
| 7,181,082 | B2 | 2/2007 | Feng |
| 7,528,883 | B2 | 5/2009 | Hsu |
| 7,702,162 | B2 | 4/2010 | Cheong et al. |
| 7,778,457 | B2 | 8/2010 | Nepomniachtchi et al. |
| 7,953,268 | B2 | 5/2011 | Nepomniachtchi |
| 8,064,710 | B2 | 11/2011 | Mizoguchi |
| 8,213,687 | B2 | 7/2012 | Fan |
| 8,295,599 | B2 | 10/2012 | Katougi et al. |
| 8,379,914 | B2 | 2/2013 | Nepomniachtchi et al. |
| 8,587,818 | B2 | 11/2013 | Imaizumi et al. |
| 8,855,375 | B2 | 10/2014 | Macciola et al. |
| 8,879,120 | B2 | 11/2014 | Thrasher et al. |
| 8,955,743 | B1* | 2/2015 | Block et al. .................. 235/379 |
| 8,989,515 | B2 | 3/2015 | Shustorovich et al. |
| 2003/0086615 | A1 | 5/2003 | Dance et al. |
| 2003/0156201 | A1 | 8/2003 | Zhang |
| 2003/0223615 | A1 | 12/2003 | Keaton et al. |
| 2006/0159364 | A1 | 7/2006 | Poon et al. |
| 2006/0294154 | A1 | 12/2006 | Shimizu |
| 2007/0003155 | A1 | 1/2007 | Miller et al. |
| 2007/0252907 | A1 | 11/2007 | Hsu |
| 2008/0147790 | A1* | 6/2008 | Malaney et al. ............. 709/203 |
| 2008/0175476 | A1 | 7/2008 | Ohk et al. |
| 2009/0175537 | A1 | 7/2009 | Tribelhorn et al. |
| 2009/0214112 | A1* | 8/2009 | Borrey et al. ................. 382/167 |
| 2010/0202701 | A1 | 8/2010 | Basri et al. |
| 2010/0232706 | A1 | 9/2010 | Forutanpour |
| 2011/0013039 | A1 | 1/2011 | Aisaka et al. |
| 2011/0025860 | A1 | 2/2011 | Katougi et al. |
| 2011/0032570 | A1 | 2/2011 | Imaizumi et al. |
| 2011/0116716 | A1 | 5/2011 | Kwon et al. |
| 2012/0162527 | A1 | 6/2012 | Baker |
| 2012/0194692 | A1* | 8/2012 | Mers et al. ................. 348/222.1 |
| 2013/0121610 | A1 | 5/2013 | Chen et al. |
| 2013/0152176 | A1 | 6/2013 | Courtney et al. |
| 2013/0182128 | A1 | 7/2013 | Amtrup et al. |
| 2013/0182292 | A1 | 7/2013 | Thrasher et al. |
| 2013/0182951 | A1 | 7/2013 | Shustorovich et al. |
| 2013/0182959 | A1 | 7/2013 | Thrasher et al. |
| 2013/0182970 | A1 | 7/2013 | Shustorovich et al. |
| 2013/0182973 | A1 | 7/2013 | Macciola et al. |
| 2013/0185618 | A1 | 7/2013 | Macciola et al. |
| 2014/0172687 | A1* | 6/2014 | Chirehdast ..................... 705/38 |

FOREIGN PATENT DOCUMENTS

| | | |
|---|---|---|
| JP | 2006031379 A | 2/2006 |
| JP | 2011034387 A | 2/2011 |
| JP | 2011055467 A | 3/2011 |
| WO | 2010030056 A1 | 3/2010 |

OTHER PUBLICATIONS

Office Action from Taiwan Application No. 102101177, dated Dec. 17, 2014.

Non-Final Office Action from U.S. Appl. No. 13/740,127, dated Feruary 23, 2015.

Non-Final Office Action from U.S. Appl. No. 13/740,127, dated Oct. 27, 2014.

Notice of Allowance from U.S. Appl. No. 13/740,131, dated Oct. 27, 2014.

Final Office Action from U.S. Appl. No. 13/740,134, dated Mar. 3, 2015.

Non-Final Office Action from U.S. Appl. No. 13/740,134, dated Oct. 10, 2014.

Non-Final Office Action from U.S. Appl. No. 13/740,138, dated Dec. 1, 2014.

Notice of Allowance from U.S. Appl. No. 13/740,139, dated Aug. 29, 2014.

Notice of Allowance from U.S. Appl. No. 13/740,145, dated Mar. 30, 2015.

Non-Final Office Action from U.S. Appl. No. 13/740,145, dated Sep. 29, 2014.

Office Action from Japanese Patent Application No. 2014-552356, dated Jun. 2, 2015.

Notice of Allowance from Taiwan Patent Application No. 102101177, dated Apr. 24, 2015.

Notice of Allowance from U.S. Appl. No. 13/740,138, dated Jun. 5, 2015.

Notice of Allowance from U.S. Appl. No. 13/740,127, dated Jun. 8, 2015.

Notice of Allowance from U.S. Appl. No. 13/740,134, dated May 29, 2015.

Notice of Allowability from U.S. Appl. No. 13/740,145, dated May 26, 2015.

Corrected Notice of Allowability from U.S. Appl. No. 13/740,138, dated Jul. 8, 2018.

* cited by examiner

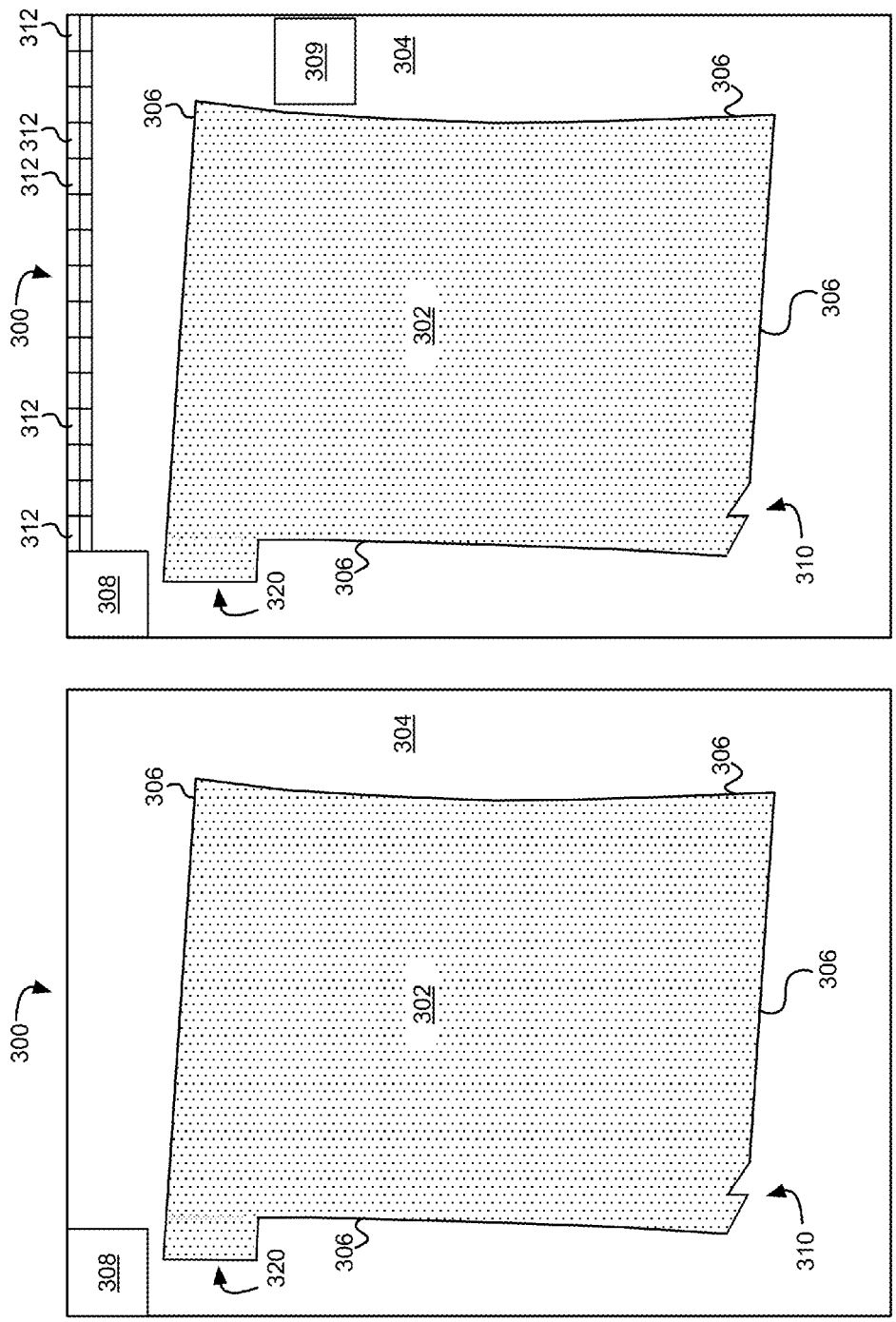

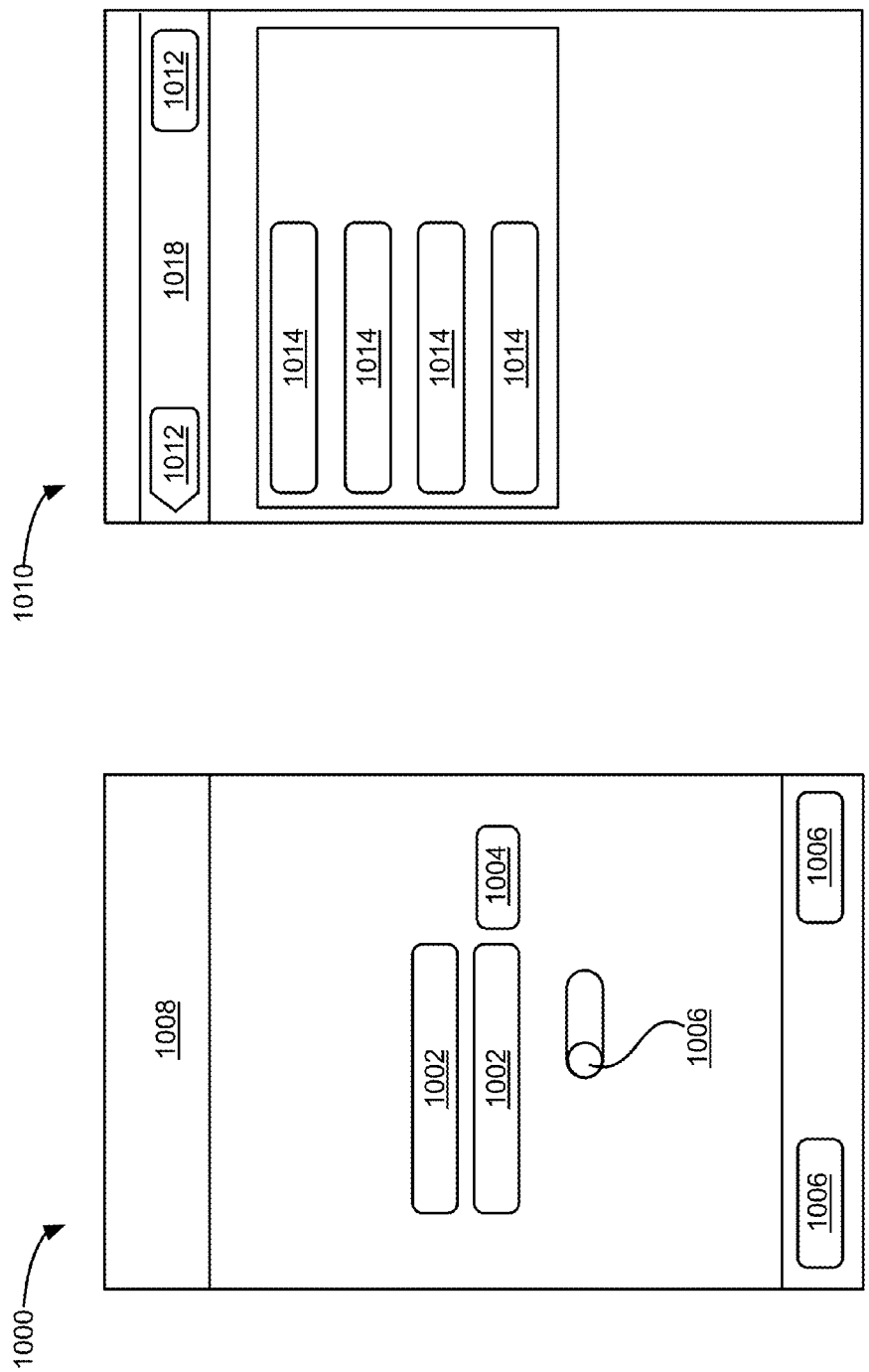

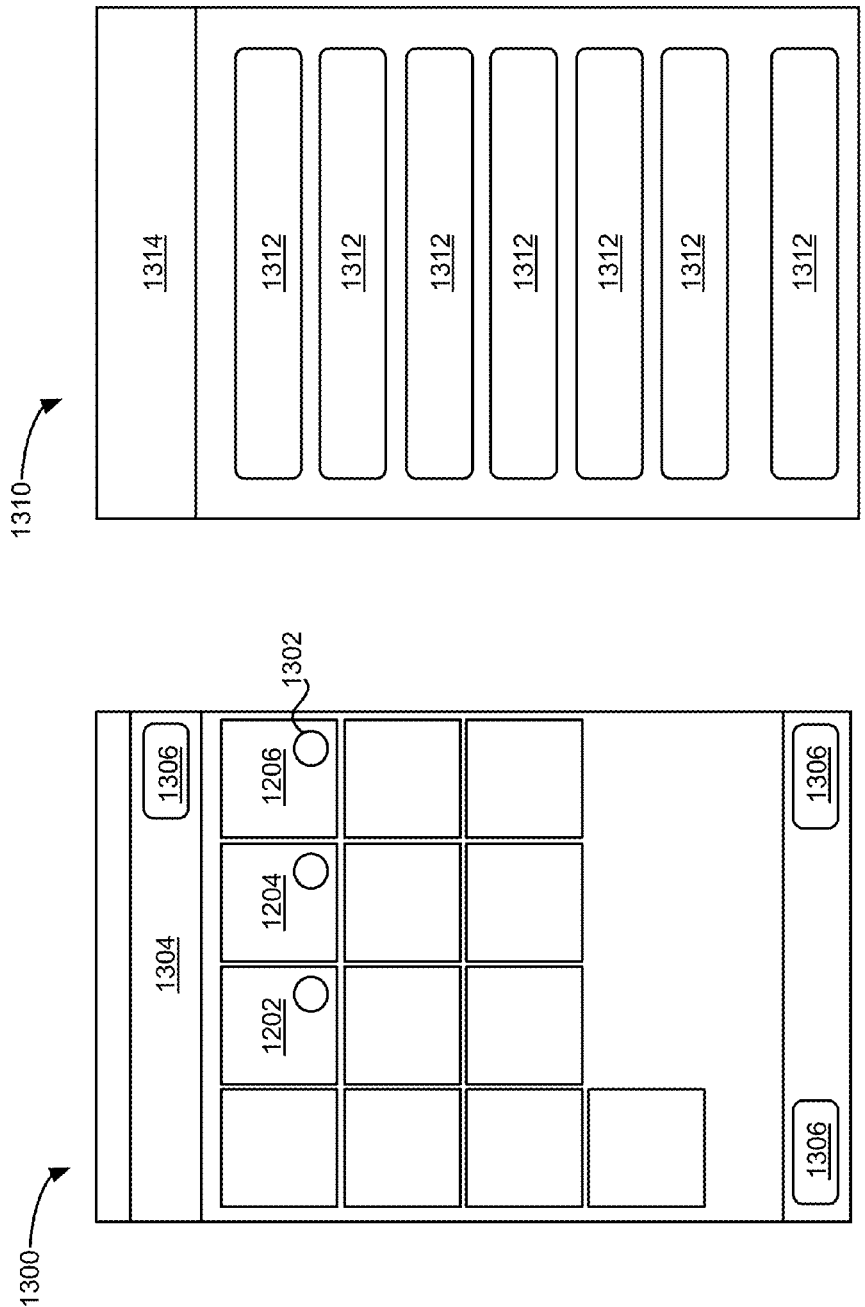

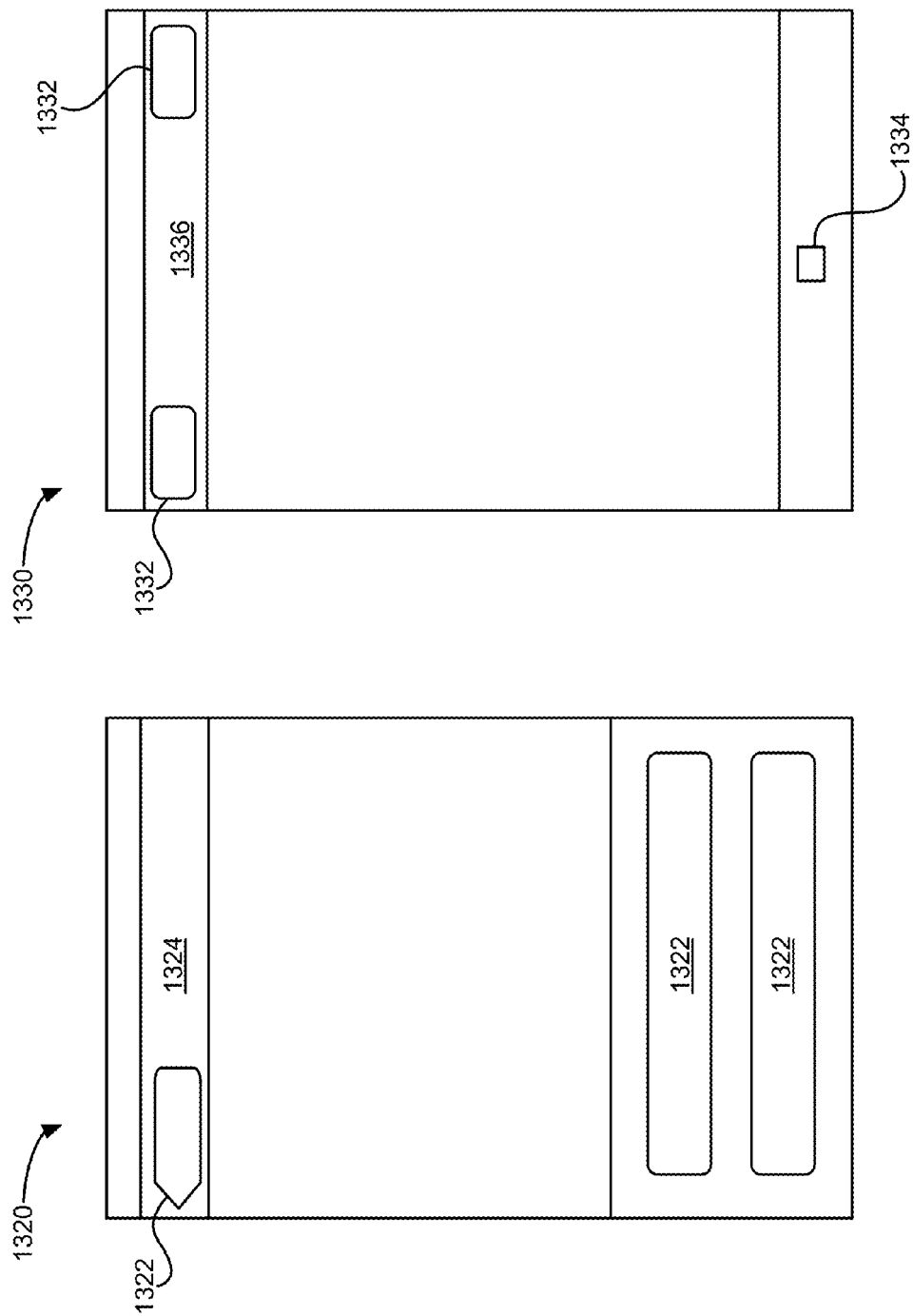

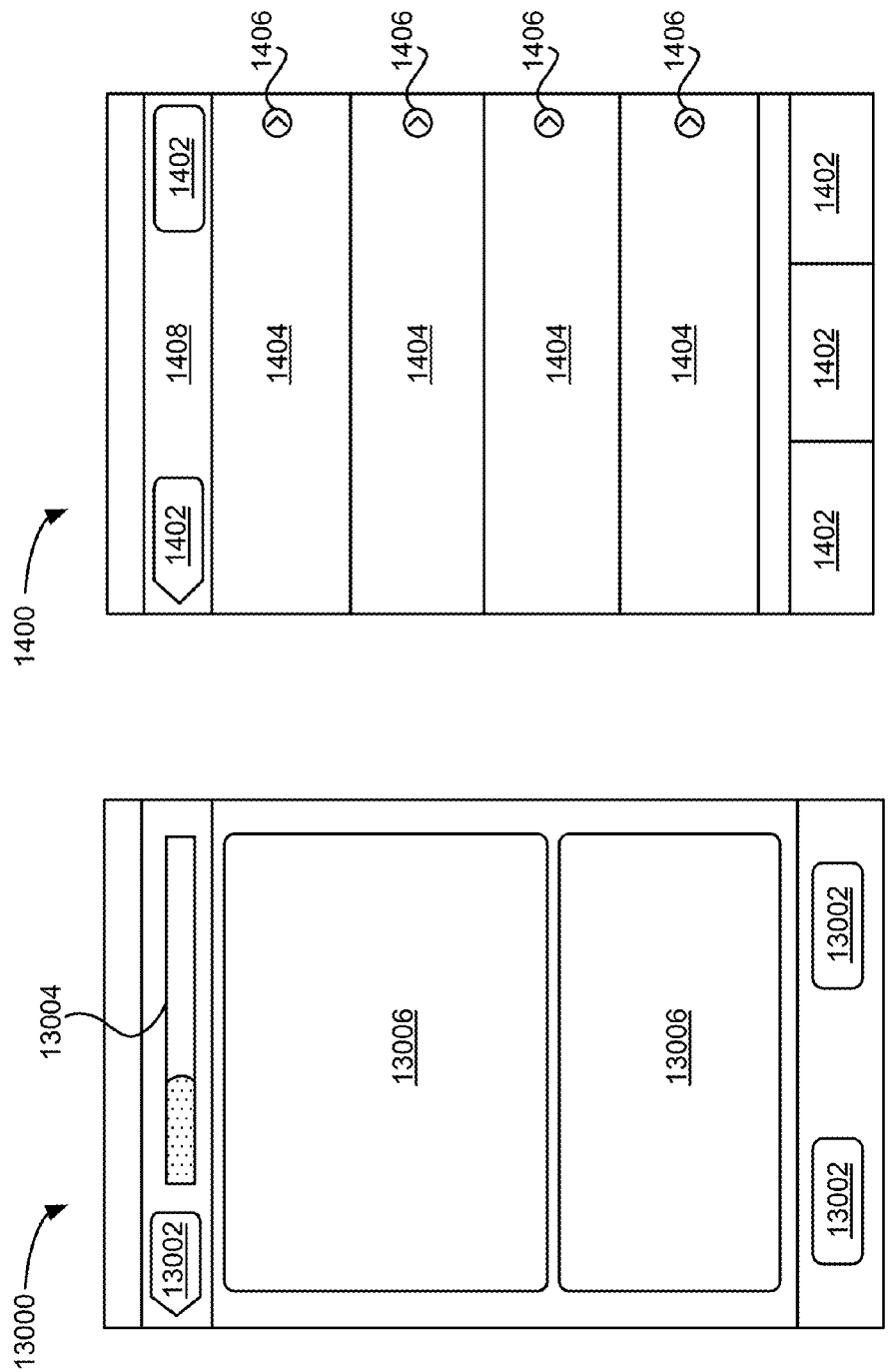

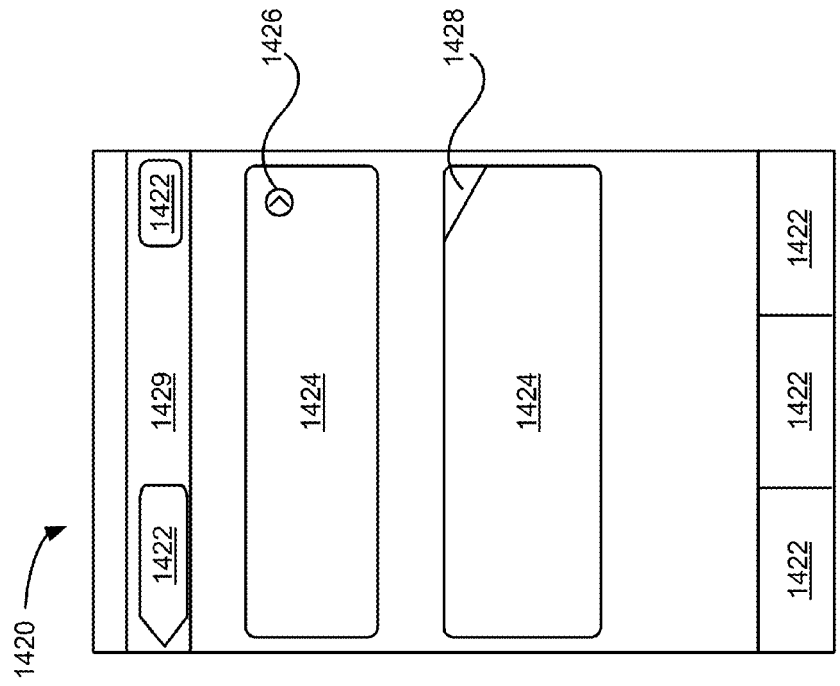
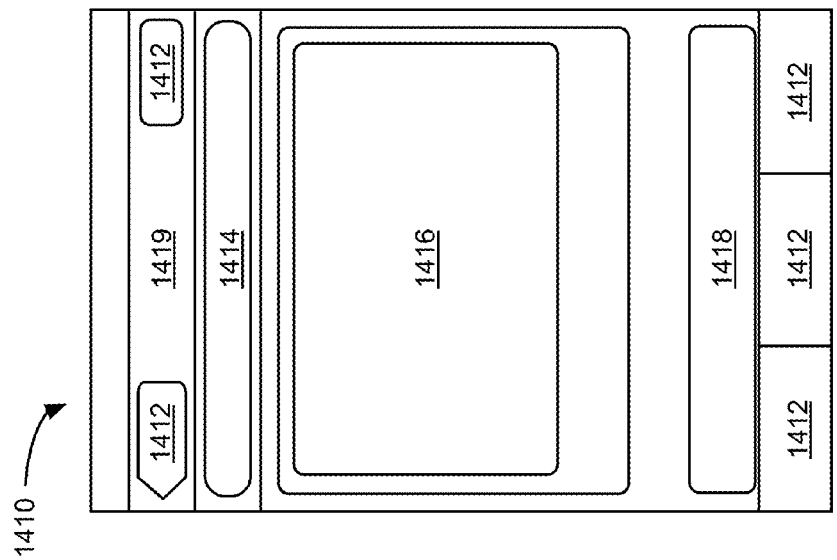

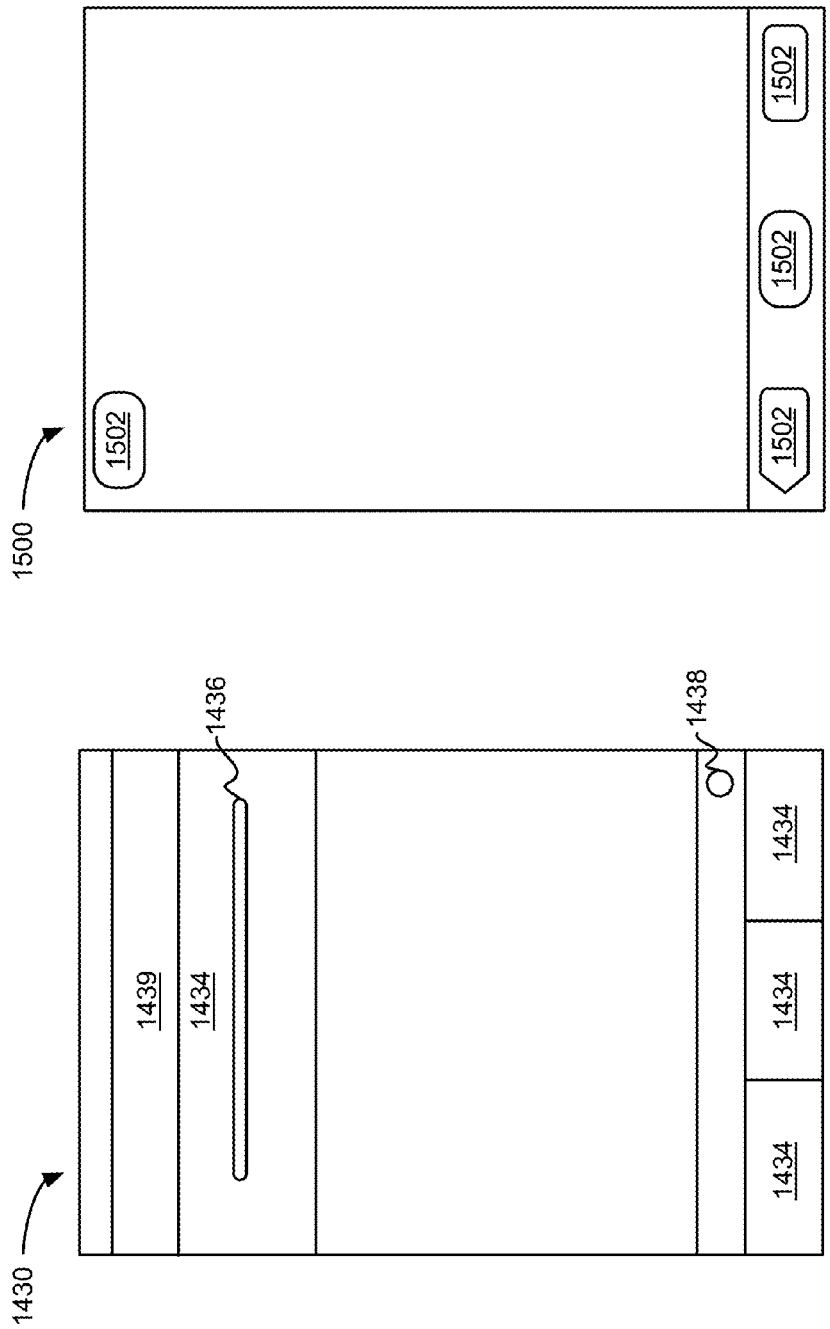

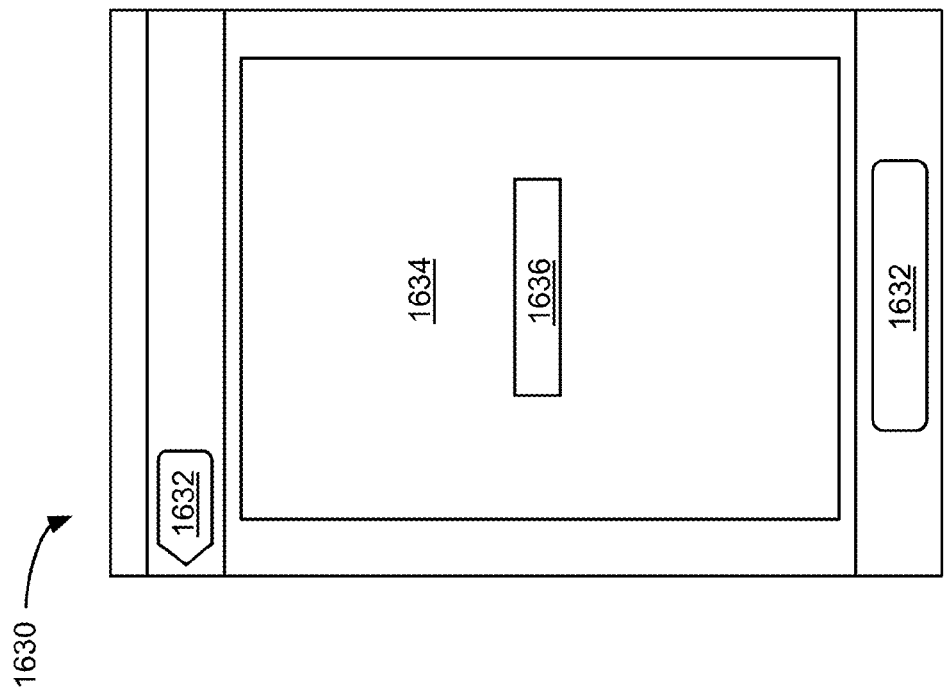
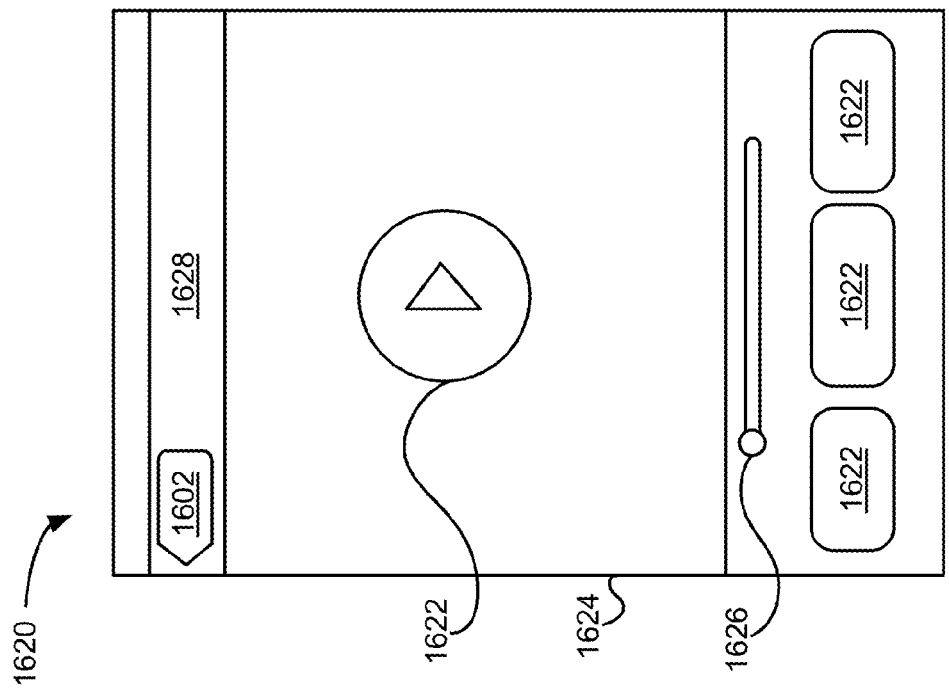

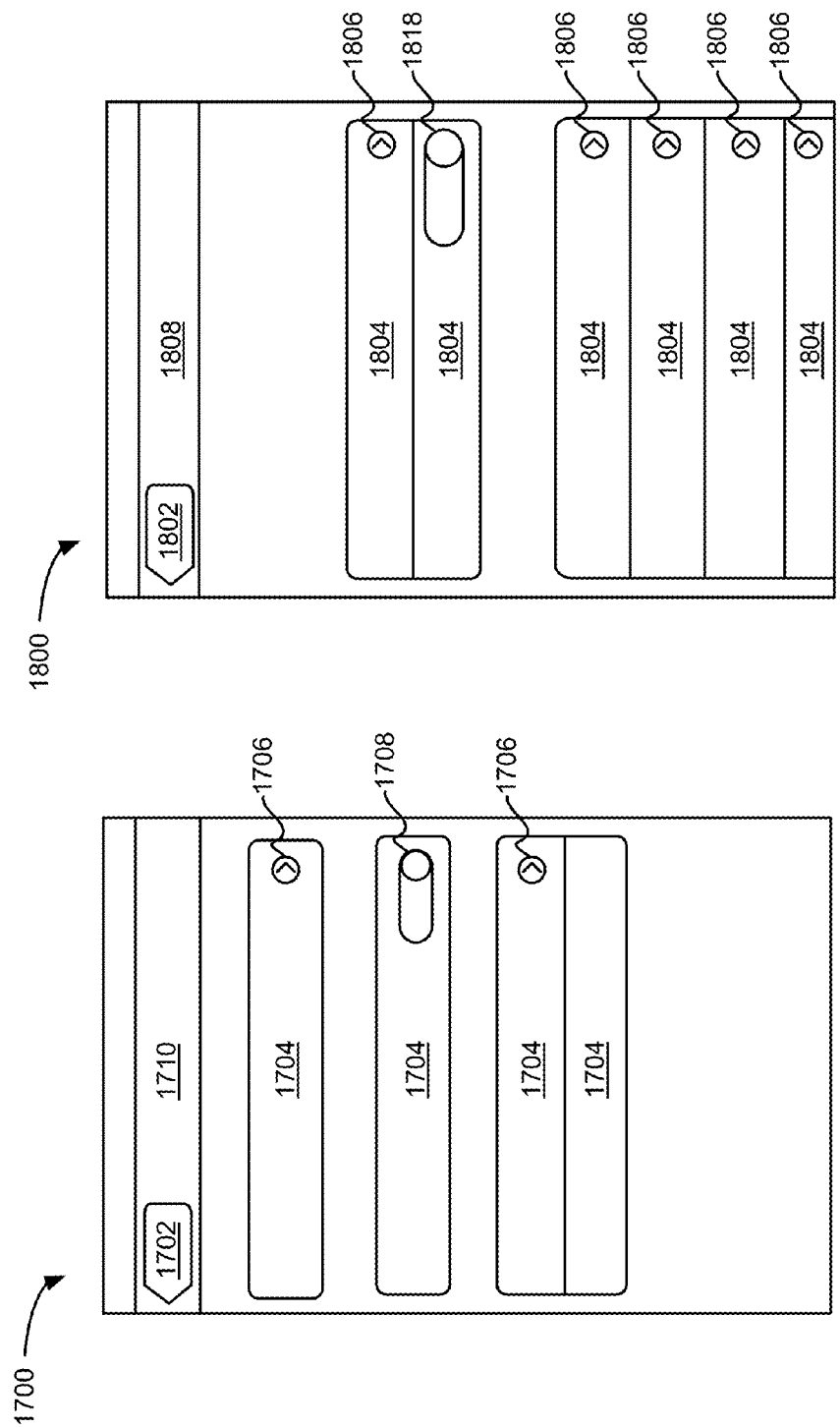

SYSTEMS AND METHODS FOR MOBILE IMAGE CAPTURE AND PROCESSING

PRIORITY CLAIM

This application is a continuation of U.S. patent application Ser. No. 14/334,558, filed Jul. 17, 2014, issued as U.S. Pat. No. 8,971,587, which is a continuation of U.S. patent application Ser. No. 13/740,123, filed Jan. 11, 2013, issued as U.S. Pat. No. 8,855,375, which claims the benefit of priority from U.S. Provisional Application No. 61/586,062, filed Jan. 12, 2012, and from U.S. Provisional Application No. 61/720,958, filed Oct. 31, 2012. The aforementioned applications are also herein incorporated by reference.

FIELD OF INVENTION

The present invention relates to image capture and image processing, and more particularly to capturing and processing digital images using a mobile device.

BACKGROUND OF THE INVENTION

Digital images having depicted therein a document such as a letter, a check, a bill, an invoice, etc. have conventionally been captured and processed using a scanner or multifunction peripheral coupled to a computer workstation such as a laptop or desktop computer. Methods and systems capable of performing such capture and processing are well known in the art and well adapted to the tasks for which they are employed.

However, in an era where day-to-day activities, computing, and business are increasingly performed using mobile devices, it would be greatly beneficial to provide analogous document capture and processing systems and methods for deployment and use on mobile platforms, such as smart phones, digital cameras, tablet computers, etc.

A major challenge in transitioning conventional document capture and processing techniques is the limited processing power and image resolution achievable using hardware currently available in mobile devices. These limitations present a significant challenge because it is impossible or impractical to process images captured at resolutions typically much lower than achievable by a conventional scanner. As a result, conventional scanner-based processing algorithms typically perform poorly on digital images captured using a mobile device.

In addition, the limited processing and memory available on mobile devices makes conventional image processing algorithms employed for scanners prohibitively expensive in terms of computational cost. Attempting to process a conventional scanner-based image processing algorithm takes far too much time to be a practical application on modern mobile platforms.

A still further challenge is presented by the nature of mobile capture components (e.g. cameras on mobile phones, tablets, etc.). Where conventional scanners are capable of faithfully representing the physical document in a digital image, critically maintaining aspect ratio, dimensions, and shape of the physical document in the digital image, mobile capture components are frequently incapable of producing such results.

Specifically, images of documents captured by a camera present a new line of processing issues not encountered when dealing with images captured by a scanner. This is in part due to the inherent differences in the way the document image is acquired, as well as the way the devices are constructed. The way that some scanners work is to use a transport mechanism that creates a relative movement between paper and a linear array of sensors. These sensors create pixel values of the document as it moves by, and the sequence of these captured pixel values forms an image. Accordingly, there is generally a horizontal or vertical consistency up to the noise in the sensor itself, and it is the same sensor that provides all the pixels in the line.

In contrast, cameras have many more sensors in a nonlinear array, e.g., typically arranged in a rectangle. Thus, all of these individual sensors are independent, and render image data that is not typically of horizontal or vertical consistency. In addition, cameras introduce a projective effect that is a function of the angle at which the picture is taken. For example, with a linear array like in a scanner, even if the transport of the paper is not perfectly orthogonal to the alignment of sensors and some skew is introduced, there is no projective effect like in a camera. Additionally, with camera capture, nonlinear distortions may be introduced because of the camera optics.

In view of the challenges presented above, it would be beneficial to provide an image capture and processing algorithm and applications thereof that compensate for and/or correct problems associated with image capture and processing using a mobile device, while maintaining a low computational cost via efficient processing methods.

SUMMARY OF THE INVENTION

In various embodiments, methods, systems, and computer program products for capturing and processing digital images captured by a mobile device are disclosed. The claimed algorithms are specifically configured to perform and facilitate loan application processing by capturing an image of a document using a mobile device, and analyzing the image (optionally in conjunction with additional data that may also be captured, determined, or otherwise provided to the loan application process) to determine loan-relevant information. Select loan-relevant information may be extracted, compiled, and/or analyzed to facilitate processing of the loan application. Feedback may be provided to facilitate facile application processing, e.g. by ensuring all requisite information is submitted with the loan application. Image capture and document detection are preferably performed using the mobile device, while all other functions may be performed using the mobile device, a remote server, or some combination thereof.

In one embodiment a method includes capturing image data using a mobile device, the image data depicting a digital representation of a document; defining, based on the image data, a plurality of candidate edge points corresponding to the document; defining four sides of a tetragon based on at least some of the plurality of candidate edge points; and determining a document type corresponding to the document is one of: "loan document;" "data relating to loan application;" "data not relating to loan application;" and "unknown."

In another embodiment, a computer program product includes a computer readable storage medium having embodied therewith computer readable program code. The computer readable program code includes code configured to: capture image data using a mobile device, the image data depicting a digital representation of a document; define, based on the image data, a plurality of candidate edge points corresponding to the document; define four sides of a tetragon based on at least some of the plurality of candidate edge points; and determine a document type corresponding to the document is one of: "loan document;" "data relating to loan application;" "data not relating to loan application;" and "unknown."

Other embodiments within the scope of the present inventive concepts will become clear based upon carefully reviewing the following detailed descriptions in conjunction with the figures.

BRIEF DESCRIPTION OF THE DRAWINGS

FIG. 3A is a schematic representation of a digital image comprising a digital representation of a document, according to one embodiment.

FIG. 3B is a schematic representation of a digital image comprising a digital representation of a document and a plurality of page detection analysis windows, according to one embodiment.

FIG. 10A is a schematic representation of a user authentication interface of an application for capturing and/or processing a digital image comprising a digital representation of a document, according to one embodiment.

FIG. 10B is a schematic representation of a host connection user interface of an application for capturing and/or processing a digital image comprising a digital representation of a document, according to one embodiment.

FIG. 13A is a schematic representation of a case object management user interface of an application for capturing and/or processing a digital image comprising a digital representation of a document, according to one embodiment.

FIG. 13B is a schematic representation of a case management action user interface of an application for capturing and/or processing a digital image comprising a digital representation of a document, according to one embodiment.

FIG. 13C is a schematic representation of a delete object user interface of an application for capturing and/or processing a digital image comprising a digital representation of a document, according to one embodiment.

FIG. 13D is a schematic representation of an edit object user interface of an application for capturing and/or processing a digital image comprising a digital representation of a document, according to one embodiment.

FIG. 13K is a schematic representation of a submit case user interface of an application for capturing and/or processing a digital image comprising a digital representation of a document, according to one embodiment.

FIG. 14A is a schematic representation of a print case user interface of an application for capturing and/or processing a digital image comprising a digital representation of a document, according to one embodiment.

FIG. 14B is a schematic representation of a select printer user interface of an application for capturing and/or processing a digital image comprising a digital representation of a document, according to one embodiment.

FIG. 14C is a schematic representation of a print details user interface of an application for capturing and/or processing a digital image comprising a digital representation of a document, according to one embodiment.

FIG. 14D is a schematic representation of a print job user interface of an application for capturing and/or processing a digital image comprising a digital representation of a document, according to one embodiment.

FIG. 15A is a schematic representation of an image capture user interface of an application for capturing and/or processing a digital image comprising a digital representation of a document, according to one embodiment.

FIG. 16C is a schematic representation of a capture video attachment user interface of an application for capturing and/or processing a digital image comprising a digital representation of a document, according to one embodiment.

FIG. 16D is a schematic representation of a mobile scanner image capture user interface of an application for capturing and/or processing a digital image comprising a digital representation of a document, according to one embodiment.

FIG. 17 is a schematic representation of a settings user interface of an application for capturing and/or processing a digital image comprising a digital representation of a document, according to one embodiment.

FIG. 18 is a schematic representation of a notifications user interface of an application for capturing and/or processing a digital image comprising a digital representation of a document, according to one embodiment.

DETAILED DESCRIPTION

Figure 1:
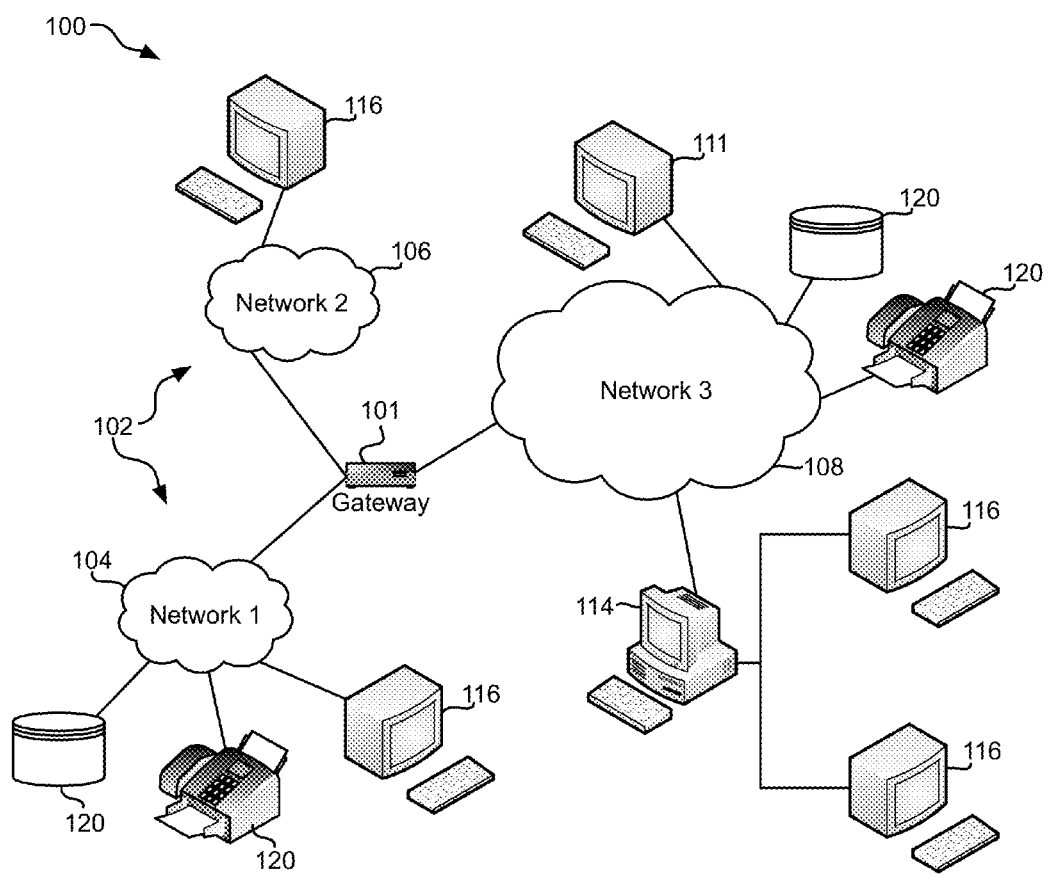
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The present application refers to image processing of images (e.g. pictures, figures, graphical schematics, single frames of movies, videos, films, clips, etc.) captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

General Embodiments

In one general embodiment a method for processing a digital image comprising a digital representation of a document includes: using a processor, defining a plurality of candidate edge points, wherein defining each candidate edge point comprises: defining one or more large analysis windows within a digital image; defining a plurality of small analysis windows within the digital image; estimating one or more distributions of statistics for each large analysis window;

calculating one or more statistics for each small analysis window; determining whether a statistically significant difference exists between one or more of the statistics calculated for each of the small analysis windows and a corresponding distribution of statistics estimated for the one or more large analysis windows; designating a point in each small analysis window for which the statistically significant difference exists as a candidate edge point upon determining the statistically significant difference exists; and defining four sides of a tetragon based on the plurality of candidate edge points; and outputting the digital representation of the document and the tetragon to a display of a mobile device.

In another general embodiment, a system includes a processor configured to execute logic; and logic for transforming a tetragon into a rectangle, wherein the tetragon is characterized by a plurality of equations, wherein each equation corresponds to a side of the tetragon, and wherein each equation is selected from a chosen class of functions.

In another general embodiment, a computer program product includes a computer readable storage medium having computer readable program code stored thereon, the computer readable program code comprising: computer readable program code configured to transform a tetragon into a rectangle, wherein the tetragon is characterized by a plurality of equations, wherein each equation corresponds to a side of the tetragon, and wherein each equation is selected from a chosen class of functions.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site. Examples of how an image may be processed are presented in more detail below.

One illustrative methodology for correction of projective and non-linear optical effects is an extension of a known algorithm for edge detection, such as the algorithm(s) described in U.S. Pat. Nos. 7,545,529 and 6,370,277, which are herein incorporated by reference. Such illustrative methodologies may include some or all of the algorithmic features disclosed herein as the extension on known algorithms, which do not include the specific functionalities disclosed herein.

It may be useful to understand how page detection is performed prior to discussing the differences introduced in order to deal with images captured by area sensors (cameras). In one approach, the edge detection algorithm goes from the boundaries of the image into the image, looking for points that are sufficiently different from what is known about the properties of the background. However, the background in the images captured by even the same mobile device may be different every time, so a new technique to identify the document(s) in the image is provided.

In one embodiment, edges of the document(s) are detected. Any method of edge detection known in the art may be used. For example, the technique described in U.S. patent application Ser. No. 12/206,594, filed Sep. 8, 2008 and which is incorporated by reference, may be used. Moreover, an outside-to-inside edge detection technique, inside-to-outside edge detection technique, or combination of both may be used.

Turning now to the figures, FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, mobile device, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
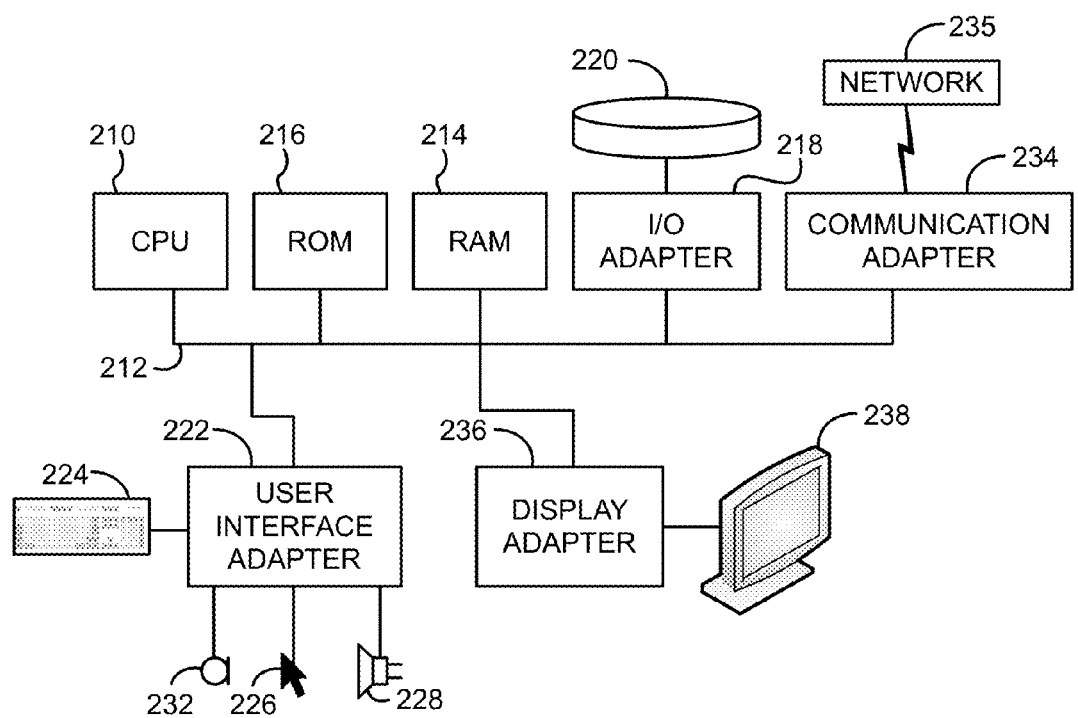
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of brevity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

Various Embodiments of a Mobile Image Capture and Processing Algorithm

Various embodiments of a Mobile Image Capture and Processing algorithm, as well as several mobile applications configured to facilitate use of such algorithmic processing within the scope of the present disclosures are described below. It is to be appreciated that each section below describes functionalities that may be employed in any combination with those disclosed in other sections, including any or up to all the functionalities described herein. Moreover, functionalities of the processing algorithm embodiments as well as the mobile application embodiments may be combined and/or distributed in any manner across a variety of computing resources and/or systems, in several approaches.

An application may be installed on the mobile device, e.g., stored in a nonvolatile memory of the device. In one approach, the application includes instructions to perform processing of an image on the mobile device. In another approach, the application includes instructions to send the image to one or more non-mobile devices, e.g. a remote server such as a network server, a remote workstation, a cloud computing environment, etc. as would be understood by one having ordinary skill in the art upon reading the present descriptions. In yet another approach, the application may include instructions to decide whether to perform some or all processing on the mobile device and/or send the image to the remote site. Examples of how an image may be processed are presented in more detail below.

In one embodiment, there may be no difference between the processing that may be performed on the mobile device and a remote server, other than speed of processing, constraints on memory available, etc. Moreover, there may be some or no difference between various user interfaces presented on a mobile device, e.g. as part of a mobile application, and corresponding user interfaces presented on a display in communication with the non-mobile device.

In other embodiments, a remote server may have higher processing power, more capabilities, more processing algorithms, etc. In yet further embodiments, the mobile device may have no image processing capability associated with the application, other than that required to send the image to the remote server. In yet another embodiment, the remote server may have no image processing capability relevant to the platforms presented herein, other than that required to receive the processed image from the remote server. Accordingly, the image may be processed partially or entirely on the mobile device, and/or partially or entirely on a remote server, and/or partially or entirely in a cloud, and/or partially or entirely in any part of the overall architecture in between. Moreover, some processing steps may be duplicated on different devices.

Which device performs which parts of the processing may be defined by a user, may be predetermined, may be determined on the fly, etc. Moreover, some processing steps may be re-performed, e.g., upon receiving a request from the user. Accordingly, the raw image data, partially processed image data, or fully processed image data may be transmitted from the mobile device, e.g., using a wireless data network, to a remote system. Image data as processed at a remote system may be returned to the mobile device for output and/or further processing.

In a further approach, the image may be partitioned, and the processing of the various parts may be allocated to various devices, e.g., ½ to the mobile device and ½ to the remote server, after which the processed halves are combined.

In one embodiment, selection of which device performs the processing may be based at least in part on a relative speed of processing locally on the mobile device vs. communication with the server.

In one approach, a library of processing functions may be present, and the application on the mobile device or the application on a remote server simply makes calls to this library, and essentially the meaning of the calls defines what kind of processing to perform. The device then performs that processing and outputs the processed image, perhaps with some corresponding metadata.

Any type of image processing known in the art and/or as newly presented herein may be performed in any combination in various embodiments.

Referring now to illustrative image processing, the camera can be considered an area sensor that captures images, where the images may have any number of projective effects, and sometimes non-linear effects. The image may be processed to correct for such effects. Moreover, the position and boundaries of the document(s) in the image may be found during the processing, e.g., the boundaries of one or more actual pages of paper in the background surrounding the page(s). Because of the mobile nature of various embodiments, the sheet of paper may be lying on just about anything. This complicates image analysis in comparison to processing images of documents produced using a scanner, because scanner background properties are constant and typically known, whereas mobile capture backgrounds may vary almost infinitely according to the location of the document and the corresponding surrounding textures captured in the image background, as well as because of variable lighting conditions.

Accordingly, the non-uniformity of the background of the surface on which the piece of paper may be positioned for capture by the camera presents one challenge, and the non-linear and projective effects present additional challenges. Various embodiments overcome these challenges, as will soon become apparent.

In one exemplary mode of operation, an application on the mobile device may be initiated, e.g., in response to a user request to open the application. For example, a user-selection of an icon representing the application may be detected.

In some approaches, a user authentication may be requested and/or performed. For example, a user ID and password, or any other authentication information, may be requested and/or received from the user.

In further approaches, various tasks may be enabled via a graphical user interface of the application. For example, a list of tasks may be presented. In such case, a selection of one of the tasks by the user may be detected, and additional options may be presented to the user, a predefined task may be initiated, the camera may be initiated, etc.

An image may be captured by the camera of the mobile device, preferably upon receiving some type of user input such as detecting a tap on a screen of the mobile device, depression of a button on the mobile device, a voice command, a gesture, etc. Another possible scenario may involve some level of analysis of sequential frames, e.g. from a video stream. Sequential frame analysis may be followed by a switch to capturing a single high-resolution image frame, which may be triggered automatically or by a user, in some approaches. Moreover, the trigger may be based on information received from one or more mobile device sensors. For example, in one embodiment an accelerometer in or coupled to the mobile device may indicate a stability of the camera, and the application may analyze low-resolution video frame(s) for a document. If a document is detected, the application may perform a focusing operation and acquire a high-resolution image of the detected document. Either the low- or high-resolution image may be further processed, but preferred embodiments utilize the high-resolution image for subsequent processing. In more approaches, switching to single frame mode as discussed above may be unnecessary, particularly for smaller documents such as business cards and receipts. To increase processing rate and reduce consumption of processing resources, document type identification may facilitate determining whether or not to switch to single frame mode and/or capture a high-resolution image for processing. For the present discussion, assume an image of one or more documents is captured.

Given that mobile devices do not typically have the processing power of conventional non-mobile devices, one approach performs some limited processing on the mobile device, for example to let the user verify that the page(s) has been found correctly, that the image is not blurred, and/or that the lighting is adequate, e.g., a preview of sorts.

In one approach, the document(s) within the image captured by the camera may be found.

Additional methods of detecting one or more boundaries of the document(s) are also presented herein. If the document(s) in the image has nonlinearities or is not rectangular, correction processing may be applied.

Once the page(s) are found in the image, one embodiment performs a smooth transformation in order to make the page(s) rectangular, assuming of course the original piece of paper was rectangular. Another useful correction to the image may be mitigation of the unevenness of the illumination.

In one exemplary approach, page detection and rectangularization may be performed substantially as described below.

Various Embodiments of Mobile Page Detection

One exemplary embodiment illustrating an exemplary methodology for performing page detection will now be described with reference to FIGS. 3A-4. With reference to these descriptions, it will become clearer how the advantages implemented for a mobile processing algorithm as described herein handle images captured by area sensors (cameras) and compensate for the inherent difficulties presented thereby.

In one approach, and with particular reference to FIGS. 3A-3B, an edge detection algorithm proceeds from the boundaries of a digital image 300 toward a central region of the image 300, looking for points that are sufficiently different from what is known about the properties of the background.

Notably, the background 304 in the images captured by even the same mobile device may be different every time, so a new technique to identify the document(s) in the image is provided.

Finding page edges within a camera-captured image according to the present disclosures helps to accommodate important differences in the properties of images captured using mobile devices as opposed, e.g., to scanners. For example, due to projective effects the image of a rectangular document in a photograph may not appear truly rectangular, and opposite sides of the document in the image may not have the same length. Second, even the best lenses have some non-linearity resulting in straight lines within an object, e.g. straight sides of a substantially rectangular document, appearing slightly curved in the captured image of that object. Third, images captured using cameras overwhelmingly tend to introduce uneven illumination effects in the captured image. This unevenness of illumination makes even a perfectly uniform background of the surface against which a document may be placed appear in the image with varied brightness, and often with shadows, especially around the page edges if the page is not perfectly flat.

In an exemplary approach, to avoid mistaking the variability within the background for page edges, the current algorithm utilizes one or more of the following functionalities.

In various embodiments, the frame of the image contains the digital representation of the document 302 with margins of the surrounding background 304. In the preferred implementation the search for individual page edges 306 may be performed on a step-over approach analyzing rows and columns of the image from outside in. In one embodiment, the step-over approach may define a plurality of analysis windows 308 within the digital image 300, such as shown in FIGS. 3A-3B. As understood herein, analysis windows 308 may include one or more "background windows," i.e. windows encompassing only pixels depicting the background 304 of the digital image 300, as well as one or more "test windows" i.e. windows encompassing pixels depicting the background 304 of the digital image 300, the digital representation of the document 302, or both.

In a preferred embodiment, the digital representation of the document may be detected in the digital image by defining a first analysis window 308, i.e. a background analysis window, in a margin of the image corresponding to the background 304 of the surface upon which the document is placed. Within the first analysis window 308, a plurality of small analysis windows (e.g. test windows 312 as shown in FIG. 3D) may be defined within the first analysis window 308. Utilizing the plurality of test windows 312, one or more distributions of one or more statistical properties descriptive of the background 304 may be estimated.

With continuing reference to the preferred embodiment discussed immediately above, a next step in detecting boundaries of the digital representation of the document may include defining a plurality of test windows 312 within the digital image, and analyzing the corresponding regions of the digital image. For each test window 312 one or more statistical values descriptive of the corresponding region of the image may be calculated. Further, these statistical values may be compared to a corresponding distribution of statistics descriptive of the background 304.

In a preferred approach, the plurality of test windows 312 may be defined along a path, particularly a linear path. In a particularly preferred approach, the plurality of test windows 312 may be defined in a horizontal direction and/or a vertical direction, e.g. along rows and columns of the digital image. Moreover, a stepwise progression may be employed to define the test windows 312 along the path and/or between the rows and/or columns. In some embodiments, as will be appreciated by one having ordinary skill in the art upon reading the present descriptions, utilizing a stepwise progression may advantageously increase the computational efficiency of document detection processes.

Moreover, the magnitude of the starting step may be estimated based on the resolution or pixel size of the image, in some embodiments, but this step may be reduced if advantageous for reliable detection of document sides, as discussed further below.

In more embodiments, the algorithm estimates the distribution of several statistics descriptive of the image properties found in a large analysis window 308 placed within the background surrounding the document. In one approach a plurality of small windows 312 may be defined within the large analysis window 308, and distributions of statistics descriptive of the small test windows 312 may be estimated. In one embodiment, large analysis window 308 is defined in a background region of the digital image, such as a top-left corner of the image.

Statistics descriptive of the background pixels may include any statistical value that may be generated from digital image data, such as a minimum value, a maximum value, a median value, a mean value, a spread or range of values, a variance, a standard deviation, etc. as would be understood by one having ordinary skill in the art upon reading the present descriptions. Values may be sampled from any data descriptive of the digital image 300, such as brightness values in one or more color channels, e.g. red-green-blue or RGB, cyan-magenta, yellow, black or CMYK, hue saturation value or HSV, etc. as would be understood by one having ordinary skill in the art upon reading the present descriptions.

As shown in FIG. 3D, each of the small analysis windows 312 may comprise a subset of the plurality of pixels within the large analysis window 308. Moreover, small analysis windows 312 may be of any size and/or shape capable of fitting within the boundaries of large analysis window 308. In a preferred embodiment, small analysis windows 312 may be characterized by a rectangular shape, and even more preferably a rectangle characterized by being three pixels long in a first direction (e.g. height) and seven pixels long in a second direction (e.g. width). Of course, other small analysis window sizes, shapes, and dimensions are also suitable for implementation in the presently disclosed processing algorithms.

In one embodiment, test windows may be employed to analyze an image and detect the boundary of a digital representation of a document depicted in the image. Background windows are used for estimation of original statistical properties of the background and/or reestimation of local statistical properties of the background. Reestimation may be necessary and/or advantageous in order to address artifacts such as uneven illumination and/or background texture variations.

Preferably, statistical estimation may be performed over some or all of a plurality of small analysis window(s) 312 in a large analysis window 308 within the margin outside of the document page in some approaches. Such estimation may be performed using a stepwise movement of a small analysis window 312 within the large analysis window 308, and the stepwise movement may be made in any suitable increment so as to vary the number of samples taken for a given pixel. For example, to promote computational efficiency, an analysis process may define a number of small analysis windows 312 within large analysis window 308 sufficient to ensure each pixel 318 is sampled once. Thus the plurality of small analysis windows 312 defined in this computationally efficient approach would share common borders but not overlap.

In another approach designed to promote robustness of statistical estimations, the analysis process may define a number of small analysis windows 312 within large analysis window 308 sufficient to ensure each pixel 318 is sampled a maximum number of times, e.g. by reducing the step to produce only a single pixel shift in a given direction between sequentially defined small analysis windows 312. Of course, any step increment may be employed in various embodiments of the presently disclosed processing algorithms, as would be understood by one having ordinary skill in the art upon reading the present descriptions.

The skilled artisan will appreciate that large analysis windows 308 utilized to reestimate statistics of local background in the digital image as well as test windows can be placed in the digital image in any which way desirable.

For example, according to one embodiment shown in FIG. 3A, the search for the left side edge in a given row i begins from the calculation of the above mentioned statistics in a large analysis window 308 adjacent to the frame boundary on the left side of the image centered around a given row i.

In still more embodiments, when encountering a possible non-background test window (e.g. a test window for which the estimated statistics are dissimilar from the distribution of statistics characteristic of the last known local background) as the algorithm progresses from the outer region(s) of the image towards the interior regions thereof, the algorithm may backtrack into a previously determined background region, form a new large analysis window 308 and re-estimate the distribution of background statistics in order to reevaluate the validity of the differences between the chosen statistics within the small analysis window 312 and the local distribution of corresponding statistics within the large analysis window 308, in some embodiments.

As will be appreciated by one having ordinary skill in the art upon reading the present descriptions, the algorithm may proceed from an outer region of the image 300 to an inner region of the image 300 in a variety of manners. For example, in one approach the algorithm proceeds defining test windows 312 in a substantially spiral pattern. In other approaches the pattern may be substantially serpentine along either a vertical or a horizontal direction. In still more approaches the pattern may be a substantially shingled pattern. The pattern may also be defined by a "sequence mask" laid over part or all of the digital image 300, such as a checkerboard pattern, a vertically, horizontally, or diagonally striped pattern, concentric shapes, etc. as would be understood by one having ordinary skill in the art upon reading the present descriptions. In other embodiments, analysis windows such as large analysis windows 308 and/or small analysis windows 312 may be defined throughout the digital image 300 in a random manner, a pseudo-random manner, stochastically, etc. according to some defined procedure, as would be understood by one having ordinary skill in the art upon reading the present descriptions. The algorithm can proceed with a sequence of test windows in any desirable fashion as long as the path allows to backtrack into known background, and the path covers the whole image with desirable granularity.

Figure 3C:
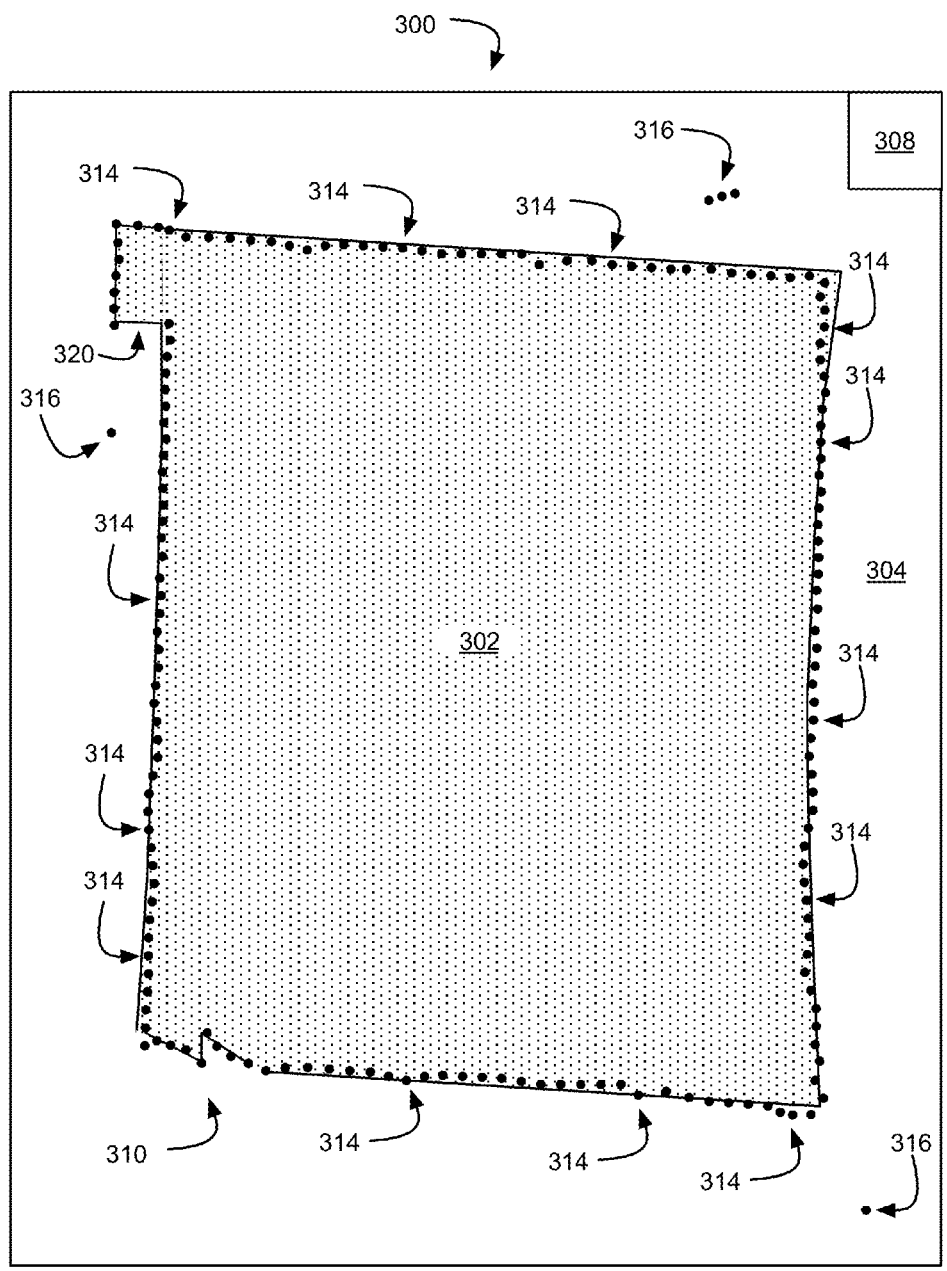
FIG. 3C is a schematic representation of a digital image comprising a digital representation of a document characterized by a plurality of candidate edge points, according to one embodiment.
Figure 3D:
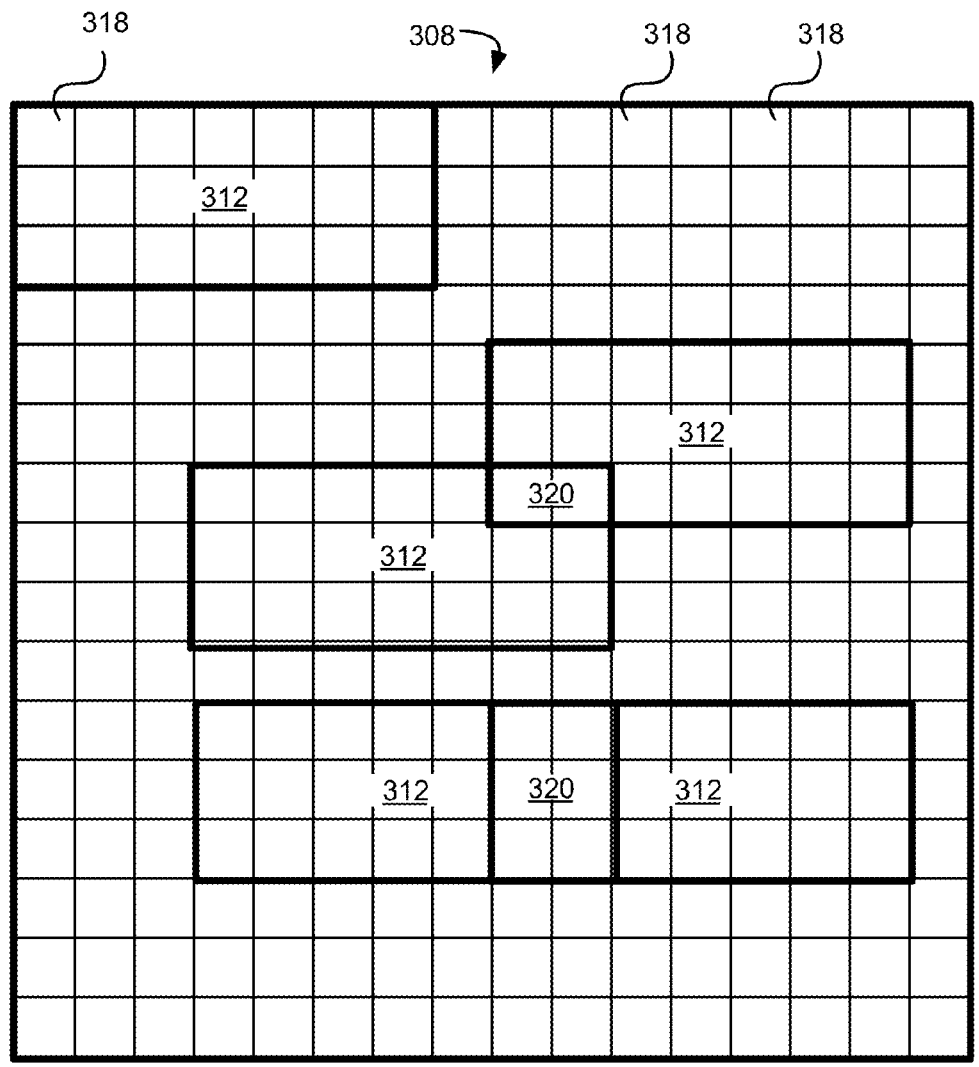
FIG. 3D is a schematic representation of a large analysis window comprising a plurality of pixels of a digital image, and a small analysis window within the large analysis window, according to one embodiment.

Advantageously, recalculating statistics in this manner helps to accommodate for any illumination drift inherent to the digital image 300 and/or background 304, which may otherwise result in false identification of non-background points in the image (e.g. outlier candidate edge points 316 as shown in FIG. 3C.)

In still yet more embodiments, when the difference is statistically valid, the algorithm may jump a certain distance further along its path in order to check again and thus bypass small variations in the texture of the background 304, such as wood grain, scratches on a surface, patterns of a surface, small shadows, etc. as would be understood by one having ordinary skill in the art upon reading the present descriptions.

In additional and/or alternative embodiments, after a potential non-background point has been found, the algorithm determines whether the point lies on the edge of the shadow (a possibility especially if the edge of the page is raised above the background surface) and tries to get to the actual page edge. This process relies on the observation that shadows usually darken towards the real edge followed by an abrupt brightening of the image.

The above described approach to page edge detection was utilized because the use of standard edge detectors may be unnecessary and even undesirable, for several reasons. First, most standard edge detectors involve operations that are time consuming, and second, the instant algorithm is not concerned with additional requirements like monitoring how thin the edges are, which directions they follow, etc. Even more importantly, looking for page edges 306 does not necessarily involve edge detection per se, i.e. page edge detection according to the present disclosures may be performed in a manner that does not search for a document boundary (e.g. page edge 306), but rather searches for image characteristics associated with a transition from background to the document. For example, the transition may be characterized by flattening of the off-white brightness levels within a glossy paper, i.e. by changes in texture rather than in average gray or color levels.

As a result, it is possible to obtain candidate edge points (e.g. candidate edge points 314 as shown in FIG. 3C) that are essentially the first and the last non-background pixels in each row and column on a grid. In order to eliminate random outliers (e.g. outlier candidate edge points 316 as shown in FIG. 3C) and to determine which candidate edge points 314 correspond to each side of the page, it is useful in one approach to analyze neighboring candidate edge points.

In one embodiment, a "point" may be considered any region within the digital image, such as a pixel, a position between pixels (e.g. a point with fractional coordinates such as the center of a 2-pixel by 2-pixel square) a small window of pixels, etc. as would be understood by one having ordinary skill in the art upon reading the present descriptions. In a preferred embodiment, a candidate edge point is associated with the center of a test window (e.g. a 3-pixel×7-pixel window) that has been found to be characterized by statistics that are determined to be different from the distribution of statistics descriptive of the local background.

As understood herein, a "neighboring" candidate edge point, or a "neighboring" pixel is considered to be a point or pixel, respectively, which is near or adjacent a point or pixel of interest (e.g. pixel 318), e.g. a point or pixel positioned at least in part along a boundary of the point or pixel of interest, a point or pixel positioned within a threshold distance of the point or pixel of interest (such as within 2, 10, 64 pixels, etc. in a given direction, within one row of the point or pixel of interest, within one column of the point or pixel of interest), etc. as would be understood by one having ordinary skill in the art upon reading the present descriptions. In preferred approaches, the "neighboring" point or pixel may be the closest candidate edge point to the point of interest along a particular direction, e.g. a horizontal direction and/or a vertical direction.

Each "good" edge point ideally has at least two immediate neighbors (one on each side) and does not deviate far from a straight line segment connecting these neighbors and the "good" edge point, e.g. the candidate edge point and the at least two immediately neighboring points may be fit to a linear regression, and the result may be characterized by a coefficient of determination ($R^2$) not less than 0.95. The angle of this segment with respect to one or more borders of the digital image, together with its relative location determines whether the edge point is assigned to top, left, right, or bottom side of the page. In a preferred embodiment, a candidate edge point and the two neighboring edge points may be assigned to respective corners of a triangle. If the angle of the triangle at the candidate edge point is close to 180 degrees, then the candidate edge point may be considered a "good" candidate edge point. If the angle of the triangle at the candidate edge point deviates far from 180 degrees by more than a threshold value (such as by 20 degrees or more), then the candidate edge point may be excluded from the set of "good" candidate edge points. The rationale behind this heuristic is based on the desire to throw out random errors in the determination of the first and last non-background pixels within rows and columns. These pixels are unlikely to exist in consistent lines, so checking the neighbors in terms of distance and direction is particularly advantageous in some approaches.

For speed, the step of this grid may start from a large number such as 32, but it may be reduced by a factor of two and the search for edge points repeated until there are enough of them to determine the Least Mean Squares (LMS) based equations of page sides (see below). If this process cannot determine the sides reliably even after using all rows and columns in the image, it gives up and the whole image is treated as the page.

The equations of page sides are determined as follows, in one embodiment. First, the algorithm fits the best LMS straight line to each of the sides using the strategy of throwing out worst outliers until all the remaining supporting edges lie within a small distance from the LMS line. For example, a point with the largest distance from a substantially straight line connecting a plurality of candidate edge points along a particular boundary of the document may be designated the "worst" outlier. This procedure may be repeated iteratively to designate and/or remove one or more "worst" outliers from the plurality of candidate edge point. In some approaches, the distance with which a candidate edge point may deviate from the line connecting the plurality of candidate edge points is based at least in part on the size and/or resolution of the digital image.

If this line is not well supported all along its stretch, the algorithm may attempt to fit the best second-degree polynomial (parabola) to the same original candidate points. The algorithmic difference between finding the best parabola vs. the best straight line is minor instead of two unknown coefficients determining the direction and offset of the line there are three coefficients determining the curvature, direction, and offset of the parabola; however, in other respects the process is essentially the same, in one embodiment.

If the support of the parabola is stronger than that of the straight line, especially closer to the ends of the candidate edge span, the conclusion is that the algorithm should prefer the parabola as a better model of the page side in the image. Otherwise, the linear model is employed, in various approaches.

Figure 4:
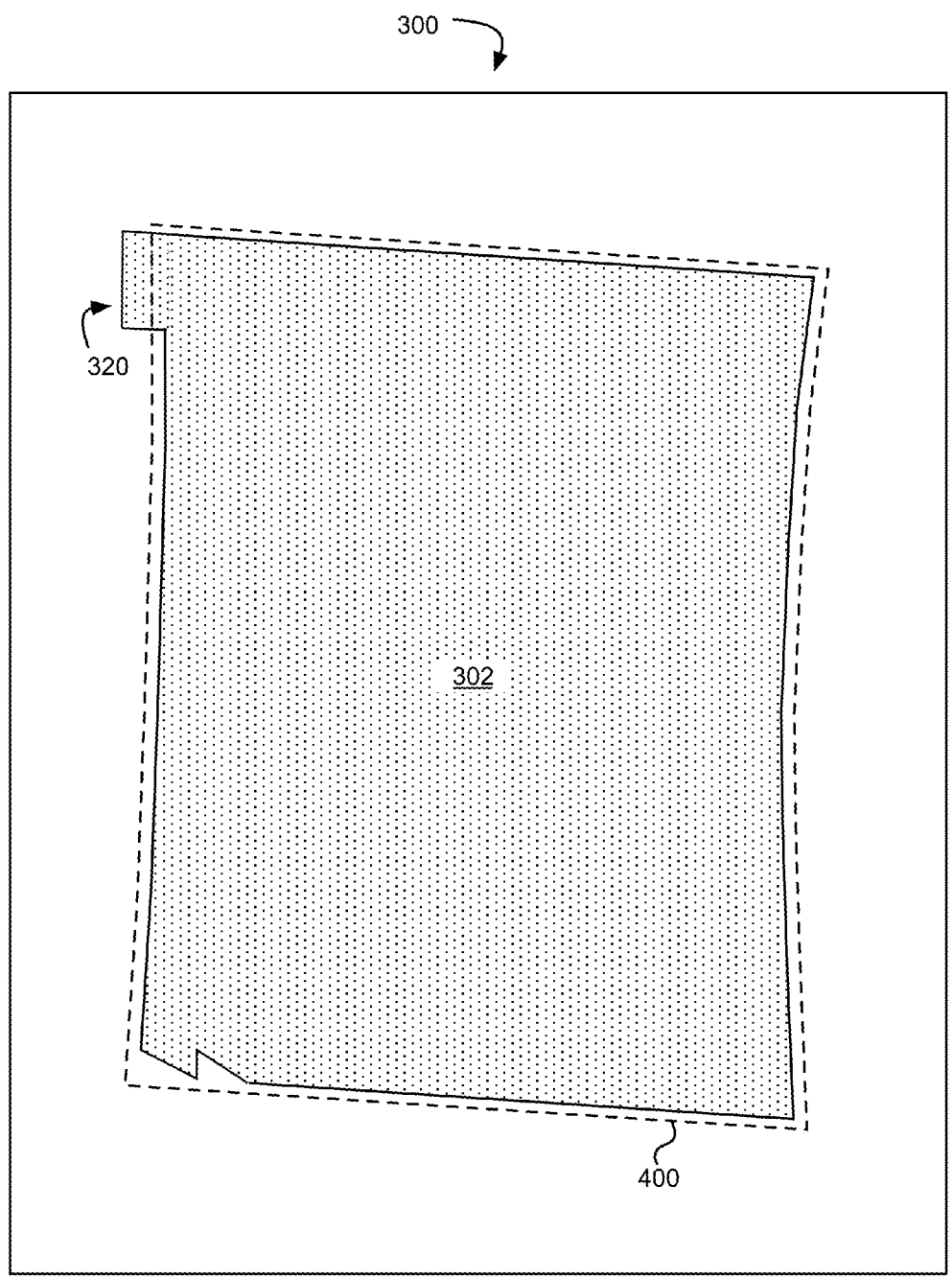
FIG. 4 is a schematic representation of a digital image comprising a digital representation of a document bounded by a target tetragon, according to one embodiment.

Intersections of the four found sides of the document may be calculated in order to find the corners of (possibly slightly curved) page tetragon, (e.g. tetragon 400 as shown in FIG. 4 and discussed in further detail below). In the preferred implementation in order to do this it is necessary to consider three cases: calculating intersections of two straight lines, calculating intersections of a straight line and a parabola, and calculating intersections of two parabolas.

In the first case there is a single solution (since top and bottom page edges 306 stretch mostly horizontally, while left and right page edges 306 stretch mostly vertically, the corresponding LMS lines cannot be parallel) and this solution determines the coordinates of the corresponding page corner.

The second case, calculating intersections of a straight line and a parabola, is slightly more complicated: there can be zero, one, or two solutions of the resulting quadratic equation. If there is no intersection, it may indicate a fatal problem with page detection, and its result may be rejected. A single solution is somewhat unlikely, but presents no further problems. Two intersections present a choice, in which case the intersection closer to the corresponding corner of the frame is a better candidate—in practice, the other solution of the equation may be very far away from the coordinate range of the image frame.

The third case, calculating intersections of two parabolas, results in a fourth degree polynomial equation that (in principle) may be solved analytically. However, in practice the number of calculations necessary to achieve a solution may be greater than in an approximate iterative algorithm that also guarantees the desired sub-pixel precision.

One exemplary procedure used for this purpose is described in detail below with reference to rectangularization of the digital representation of the document 302, according to one approach.

There are several constraints on the validity of the resulting target tetragon (e.g. tetragon 400 as discussed in further detail below with regard to FIG. 4). Namely, the tetragon is preferably not too small (e.g., below a predefined threshold of any desired value, such as 25% of the total area of the image), the corners of the tetragon preferably do not lie too far outside of the frame of the image (e.g. not more than 100 pixels away), and the corners themselves should preferably be interpretable as top-left, top-right, bottom-left and bottom-right with diagonals intersecting inside of the tetragon, etc. If these constraints are not met, a given page detection result may be rejected, in some embodiments.

In one illustrative embodiment where the detected tetragon of the digital representation of the document 302 is valid, the algorithm may determine a target rectangle. Target rectangle width and height may be set to the average of top and bottom sides of the tetragon and the average of left and right sides respectively.

In one embodiment, if skew correction is performed, the angle of skew of the target rectangle may be set to zero so that the page sides will become horizontal and vertical. Otherwise, the skew angle may be set to the average of the angles of top and bottom sides to the horizontal axis and those of the left and right sides to the vertical axis.

In a similar fashion, if crop correction is not performed, the center of the target rectangle may be designated so as to match the average of the coordinates of the four corners of the tetragon; otherwise the center may be calculated so that the target rectangle ends up in the top left of the image frame, in additional embodiments.

In some approaches, if page detection result is rejected for any reason, some or all steps of the process described herein may be repeated with a smaller step increment, in order to obtain more candidate edge points and, advantageously, achieve more plausible results. In a worst-case scenario where problems persist even with the minimum allowed step, the detected page may be set to the whole image frame and the original image may be left untouched.

Figure 19:
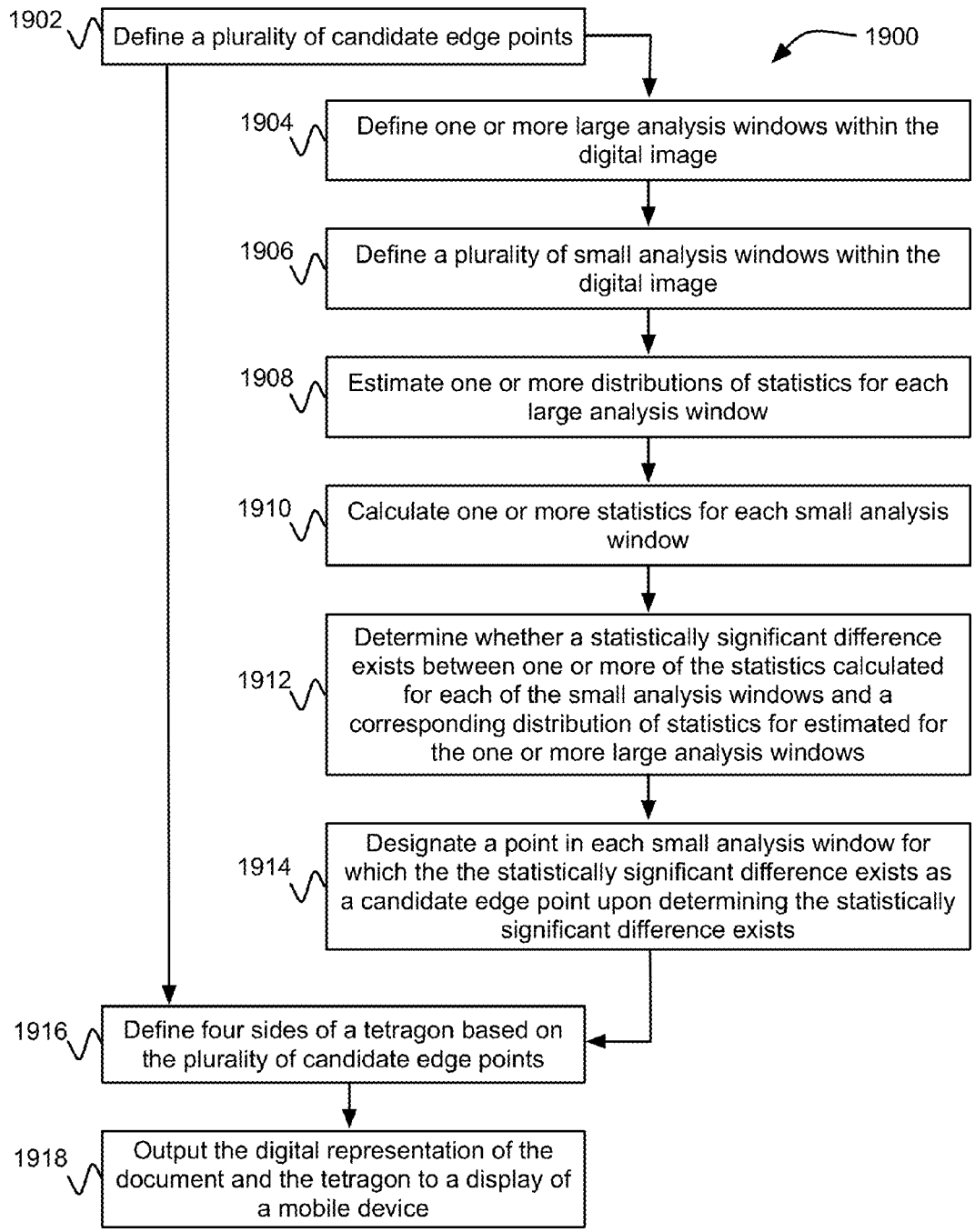
FIG. 19 is a flowchart of a method for page detection, according to one embodiment.

Now with particular reference to an exemplary implementation of the inventive page detection embodiment described herein, in one approach page detection includes performing a method 1900 such as shown in FIG. 19. As will be appreciated by one having ordinary skill in the art upon reading the present descriptions, the method 1900 may be performed in any environment, including those described herein and represented in any of the Figures provided with the present disclosures.

In one embodiment, method 1900 includes operation 1902, where a plurality of candidate edge points corresponding to a transition from a digital image background to the digital representation of the document are defined.

In various embodiments, defining the plurality of candidate edge points in operation 1902 may include one or more additional operations such as operations 1904-1920, described below.

In operation 1904, according to one embodiment, a large analysis window (e.g. large analysis window 308 as shown in FIGS. 3A-3B and 3D is defined within the digital image 300. Preferably, a first large analysis window is defined in a region depicting a plurality of pixels of the digital image background 304, but not depicting the non-background (e.g. the digital representation of the document 302) in order to obtain information characteristic of the digital image background 304 for comparison and contrast to information characteristic of the non-background (e.g. the digital representation of the document 302, such as background statistics discussed in further detail below with reference to operation 1910). For example, the first large analysis window 308 may be defined in a corner (such as a top-left corner) of the digital image 300. Of course, the first large analysis window may be defined in any part of the digital image 300 without departing from the scope of the present disclosures.

Moreover, as will be understood by one having ordinary skill in the art upon reading the present descriptions, the large analysis window 308 may be any size and/or characterized by any suitable dimensions, but in preferred embodiments the large analysis window 308 is approximately forty pixels high and approximately forty pixels wide.

In particularly preferred approaches, the large analysis window 308 may be defined in a corner region of the digital image. For example, with reference to FIG. 3A, a digital image 300 is shown, the digital image 300 comprising a digital representation of a document 302 having a plurality of sides 306 and a background 304. As described above with reference to operation 1904, the large analysis window 308 may be defined in a region comprising a plurality of background pixels and not including pixels corresponding to the digital representation of the document 302. Moreover, the large analysis window 308 may be defined in the corner of the digital image 300, in some approaches.

In operation 1906, according to one embodiment, a plurality of small analysis windows 312 may be defined within the digital image 300, such as within the large analysis window 308. The small analysis windows 312 may overlap at least in part with one or more other small analysis windows 312 such as to be characterized by comprising one or more overlap regions 320 as shown in FIG. 3D. In a preferred approach all possible small analysis windows 312 are defined within the large analysis window 308. Of course, small analysis windows may be defined within any portion of the digital image, such as shown in FIG. 3B, and preferably small analysis windows may be defined such that each small analysis window is characterized by a single center pixel.

In operation 1908, according to one embodiment, one or more statistics are calculated for one or more small analysis windows 312 (e.g. one or more small analysis windows 312 within a large analysis window 308) and one or more distributions of corresponding statistics are estimated (e.g. a distribution of statistics estimated across a plurality of small analysis windows 312). In another embodiment, distributions of statistics may be estimated across one or more large analysis window(s) 308 and optionally merged.

Moreover, values may be descriptive of any feature associated with the background of the digital image, such as background brightness values, background color channel values, background texture values, background tint values, background contrast values, background sharpness values, etc. as would be understood by one having ordinary skill in the art upon reading the present descriptions. Moreover still, statistics may include a minimum, a maximum and/or a range of brightness values in one or more color channels of the plurality of pixels depicting the digital image background 304 over the plurality of small windows 312 within the large analysis window 308.

In operation 1910, according to one embodiment, one or more distributions of background statistics are estimated. By estimating the distribution(s) of statistics, one may obtain descriptive distribution(s) that characterize the properties of the background 304 of the digital image 300 within, for example, a large analysis window 308.

The distribution(s) preferably correspond to the background statistics calculated for each small analysis window, and may include, for example, a distribution of brightness minima, a distribution of brightness maxima, etc., from which one may obtain distribution statistical descriptors such as the minimum and/or maximum of minimum brightness values, the minimum and/or maximum of minimum brightness values, minimum and/or maximum spread of brightness values, minimum and/or maximum of minimum color channel values, minimum and/or maximum of maximum color channel values, minimum and/or maximum spread of color channel values etc. as would be appreciated by one having ordinary skill in the art upon reading the present descriptions. Of course, any of the calculated background statistics (e.g. for brightness values, color channel values, contrast values, texture values, tint values, sharpness values, etc.) may be assembled into a distribution and any value descriptive of the distribution may be employed without departing from the scope of the present disclosures.

In operation 1912, according to one embodiment, a large analysis window, such as analysis window 308 as shown in FIGS. 3A-3B is defined within the digital image 300.

Moreover, window shapes may be defined by positively setting the boundaries of the window as a portion of the digital image 300, may be defined by negatively, e.g. by applying a mask to the digital image 300 and defining the regions of the digital image 300 not masked as the analysis window. Moreover still, windows may be defined according to a pattern, especially in embodiments where windows are negatively defined by applying a mask to the digital image 300. Of course, other manners for defining the windows may be employed without departing from the scope of the present disclosures.

In operation 1914, according to one embodiment, one or more statistics are calculated for the analysis window 312. Moreover, in preferred embodiments each analysis window statistic corresponds to a distribution of background statistics estimated for the large analysis window 308 in operation 1910. For example, in one embodiment maximum brightness corresponds to distribution of background brightness maxima, minimum brightness corresponds to distribution of background brightness minima, brightness spread corresponds to distribution of background brightness spreads, etc. as would be understood by one having ordinary skill in the art upon reading the present descriptions.

In operation 1916, according to one embodiment, it is determined whether a statistically significant difference exists between at least one analysis window statistic and the corresponding distribution of background statistics. As will be appreciated by one having ordinary skill in the art upon reading the present descriptions, determining whether a statistically significant difference exists may be performed using any known statistical significance evaluation method or metric, such as a p-value, a z-test, a chi-squared correlation, etc. as would be appreciated by a skilled artisan reading the present descriptions.

In operation 1918, according to one embodiment, one or more points (e.g. the centermost pixel 318 or point) in the analysis window for which a statistically significant difference exists between a value describing the pixel 318 and the corresponding distribution of background statistics is designated as a candidate edge point. The designating may be accomplished by any suitable method known in the art, such as setting a flag corresponding to the pixel, storing coordinates of the pixel, making an array of pixel coordinates, altering one or more values describing the pixel 318 (such as brightness, hue, contrast, etc.), or any other suitable means.

In operation 1920, according to one embodiment, one or more of operations 1912-1918 may be repeated one or more times. In a preferred embodiment, a plurality of such repetitions may be performed, wherein each repetition is performed on a different portion of the digital image. Preferably, the repetitions may be performed until each side of the digital representation of the document has been evaluated. In various approaches, defining the analysis windows 308, 312 may result in a plurality of analysis windows 308, 312 which share one or more borders, which overlap in whole or in part, and/or which do not share any common border and do not overlap, etc. as would be understood by one having ordinary skill in the art upon reading the present descriptions.

In a particularly preferred embodiment, the plurality of repetitions may be performed in a manner directed to reestimate local background statistics upon detecting a potentially non-background window (e.g. a window containing a candidate edge point or a window containing an artifact such as uneven illumination, background texture variation, etc.).

In operation 1922, according to one embodiment, four sides of a tetragon 400 are defined based on the plurality of candidate edge points. Preferably, the sides of the tetragon 400 encompass the edges 306 of a digital representation of a document 302 in a digital image 300. Defining the sides of the tetragon 400 may include, in some approaches, performing one or more least-mean-squares (LMS) approximations.

In more approaches, defining the sides of the tetragon 400 may include identifying one or more outlier candidate edge points, and removing one or more outlier candidate edge points from the plurality of candidate edge points. Further, defining the sides of the tetragon 400 may include performing at least one additional LMS approximation excluding the one or more outlier candidate edge points.

Further still, in one embodiment each side of the tetragon 400 is characterized by an equation chosen from a class of functions, and performing the at least one LMS approximation comprises determining one or more coefficients for each equation, such as best coefficients of second degree polynomials in a preferred implementation. According to these approaches, defining the sides of the tetragon 400 may include determining whether each side of the digital representation of the document falls within a given class of functions, such as second degree polynomials or simpler functions such as linear functions instead of second degree polynomials.

In preferred approaches, performing method 1900 may accurately define a tetragon around the four dominant sides of a document while ignoring one or more deviations from the dominant sides of the document, such as a rip 310 and/or a tab 320 as depicted in FIGS. 3A-3C and 4.

Additional and/or alternative embodiments of the presently disclosed tetragon 400 may be characterized by having four sides, and each side being characterized by one or more equations such as the polynomial functions discussed above. For example, embodiments where the sides of tetragon 400 are characterized by more than one equation may involve dividing one or more sides into a plurality of segments, each segment being characterized by an equation such as the polynomial functions discussed above.

Defining the tetragon 400 may, in various embodiments, alternatively and/or additionally include defining one or more corners of the tetragon 400. For example, tetragon 400 corners may be defined by calculating one or more intersections between adjacent sides of the tetragon 400, and designating an appropriate intersection from the one or more calculated intersections in cases where multiple intersections are calculated. In still more embodiments, defining the corners may include solving one or more equations, wherein each equation is characterized by belonging to a chosen class of functions such as $N^{th}$ degree polynomials, etc. as would be understood by one having ordinary skill in the art upon reading the present descriptions.

In various embodiments, a corner of the tetragon 400 may be defined by one or more of: an intersection of two curved adjacent sides of the tetragon 400; an intersection of two substantially straight lines; and an intersection of one substantially straight line and one substantially curved line.

In operation 1924, according to one embodiment, the digital representation of the document 302 and the tetragon 400 are output to a display of a mobile device. Outputting may be performed in any manner, and may depend upon the configuration of the mobile device hardware and/or software.

Moreover, outputting may be performed in various approaches so as to facilitate further processing and/or user interaction with the output. For example, in one embodiment the tetragon 400 may be displayed in a manner designed to distinguish the tetragon 400 from other features of the digital image 300, for example by displaying the tetragon 400 sides in a particular color, pattern, illumination motif, as an animation, etc. as would be understood by one having ordinary skill in the art upon reading the present descriptions.

Further still, in some embodiments outputting the tetragon 400 and the digital representation of the document 302 may facilitate a user manually adjusting and/or defining the tetragon 400 in any suitable manner. For example, a user may interact with the display of the mobile device to translate the tetragon 400, i.e. to move the location of the tetragon 400 in one or more directions while maintaining the aspect ratio, shape, edge lengths, area, etc. of the tetragon 400. Additionally and/or alternatively, a user may interact with the display of the mobile device to manually define or adjust locations of tetragon 400 corners, e.g. tapping on a tetragon 400 corner and dragging the corner to a desired location within the digital image 300, such as a corner of the digital representation of the document 302.

Referring again to FIG. 4, one particular example of an ideal result of page detection is depicted, showing the digital representation of the document 302 within the digital image 300, and having a tetragon 400 that encompasses the edges of the digital representation of the document 302.

In some approaches page detection such as described above with reference to FIG. 19 and method 1900 may include one or more additional and/or alternative operations, such as will be described below.

In one approach, method 1900 may further include capturing one or more of the image data containing the digital representation of the document and audio data relating to the digital representation of the document. Capturing may be performed using one or more capture components coupled to the mobile device, such as a microphone, a camera, an accelerometer, a sensor, etc. as would be understood by one having ordinary skill in the art upon reading the present descriptions.

In another approach, method 1900 may include defining a new large analysis window 309 and reestimating the distribution of background statistics for the new large analysis window 309 upon determining that the statistically significant difference exists, i.e. essentially repeating operation 1908 and/or 1910 in a different region of the digital image 300 near a point where a potentially non-background point has been identified, such as near one of the edges 306 of the document.

In several exemplary embodiments, a large analysis window 308 may be positioned near or at the leftmost non-background pixel in a row or positioned near or at the rightmost non-background pixel in a row, positioned near or at the topmost non-background pixel in a column, positioned near or at bottommost non-background pixel in a column.

Approaches involving such reestimation may further include determining whether the statistically significant difference exists between at least one small analysis window (e.g. a test window) statistic and the corresponding reestimated distribution of large analysis window statistics. In this manner, it is possible to obtain a higher-confidence determination of whether the statistically significant difference exists, and therefore better distinguish true transitions from the digital image background to the digital representation of the document as opposed to, for example, variations in texture, illumination anomalies, and/or other artifacts within the digital image.

Moreover, with or without performing reestimation as described above may facilitate the method 1900 avoiding one or more artifacts such as variations in illumination and/or background texture, etc. in the digital image, the artifacts not corresponding to a true transition from the digital image background to the digital representation of the document. In some approaches, avoiding artifacts may take the form of bypassing one or more regions (e.g. regions characterized by textures, variations, etc. that distinguish the region from the true background) of the digital image.

In some approaches, one or more regions may be bypassed upon determining a statistically significant difference exists between a statistical distribution estimated for the large analysis window 308 and a corresponding statistic calculated for the small analysis window 312, defining a new large analysis window near the small analysis window, reestimating the distribution of statistics for the new large analysis window, and determining that the statistically significant difference does not exist between the reestimated statistical distribution and the corresponding statistic calculated for the small analysis window 312.

In other approaches, bypassing may be accomplished by checking another analysis window 312 further along the path and resuming the search for a transition to non-background upon determining that the statistics of this checked window do not differ significantly from the known statistical properties of the background, e.g. as indicated by a test of statistical significance.

As will be appreciated by the skilled artisan upon reading the present disclosures, bypassing may be accomplished by checking another analysis window further along the path.

In still further approaches, page detection may additionally and/or alternatively include determining whether the tetragon 400 satisfies one or more quality control metrics; and rejecting the tetragon 400 upon determining the tetragon 400 does not satisfy one or more of the quality control metrics. Moreover, quality control metrics may include measures such as a LMS support metric, a minimum tetragon 400 area metric, a tetragon 400 corner location metric, and a tetragon 400 diagonal intersection location metric.

In practice, determining whether the tetragon 400 satisfies one or more of these metrics acts as a check on the performance of method 1900. For example, checks may include determining whether the tetragon 400 covers at least a threshold of the overall digital image area, e.g. whether the tetragon 400 comprises at least 25% of the total image area. Furthermore, checks may include determining whether tetragon 400 diagonals intersect inside the boundaries of the tetragon 400, determining whether one or more of the LMS approximations were calculated from sufficient data to have robust confidence in the statistics derived therefrom, i.e. whether the LMS approximation has sufficient "support," (such as an approximation calculated from at least five data points, or at least a quarter of the total number of data points, in various approaches), and/or determining whether tetragon 400 corner locations (as defined by equations characterizing each respective side of the tetragon 400) exist within a threshold distance of the edge of the digital image, e.g. whether tetragon 400 corners are located more than 100 pixels away from an edge of the digital image in a given direction. Of course, other quality metrics and/or checks may be employed without departing from the scope of these disclosures, as would be appreciated by one having ordinary skill in the art upon reading the present descriptions.

In one approach, quality metrics and/or checks may facilitate rejecting suboptimal tetragon 400 definitions, and further facilitate improving the definition of the tetragon 400 sides. For example, one approach involves receiving an indication that the defining the four sides of the tetragon 400 based on the plurality of candidate edge points failed to define a valid tetragon 400, i.e. failed to satisfy one or more of the quality control metrics; and redefining the plurality of candidate edge points. Notably, in this embodiment redefining the plurality of candidate edge points includes sampling a greater number of points within the digital image than a number of points sampled in the prior, failed attempt. This may be accomplished, in one approach, by reducing the step over one or more of rows or columns of the digital image and repeating all the steps of the algorithm in order to analyze a larger number of candidate edge points. The step may be decreased in a vertical direction, a horizontal direction, or both. Of course, other methods of redefining the candidate edge points and/or resampling points within the digital image may be utilized without departing from the scope of the present disclosures.

Further still, page detection may include designating the entire digital image as the digital representation of the document, particularly where multiple repetitions of method 1900 failed to define a valid tetragon 400, even with significantly reduced step in progression through the digital image analysis. In one approach, designating the entire digital image as the digital representation of the document may include defining image corners as document corners, defining image sides as document sides, etc. as would be understood by one having ordinary skill in the art upon reading the present descriptions.

As described herein, the diagonals of the tetragon 400 may be characterized by a first line connecting a calculated top left corner of the tetragon 400 to a calculated bottom right corner of the tetragon 400, and second line connecting a calculated top right corner of the tetragon 400 and a calculated bottom left corner of the tetragon 400. Moreover, the first line and the second line preferably intersect inside the tetragon 400.

In various approaches, one or more of the foregoing operations may be performed using a processor, and the processor may be part of a mobile device, particularly a mobile device having an integrated camera.

Various Embodiments of Mobile Page Rectangularization

The present descriptions relate to rectangularizing a digital representation of a document in a digital image, various approaches to which will be described in detail below with reference to FIGS. 5A-5C and 20.

Figure 5A:
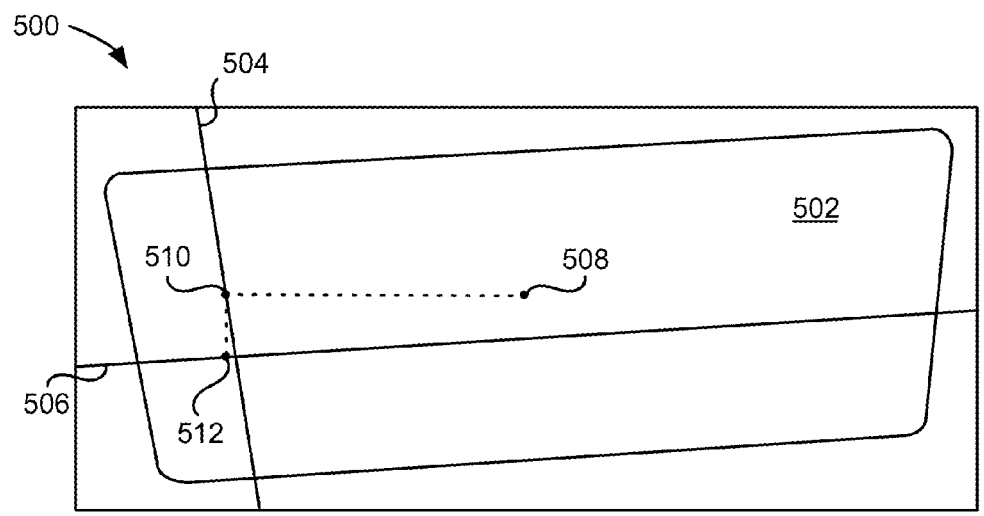
FIG. 5A is a graphical representation of a first iteration of a page rectangularization algorithm, according to one embodiment.
Figure 5B:
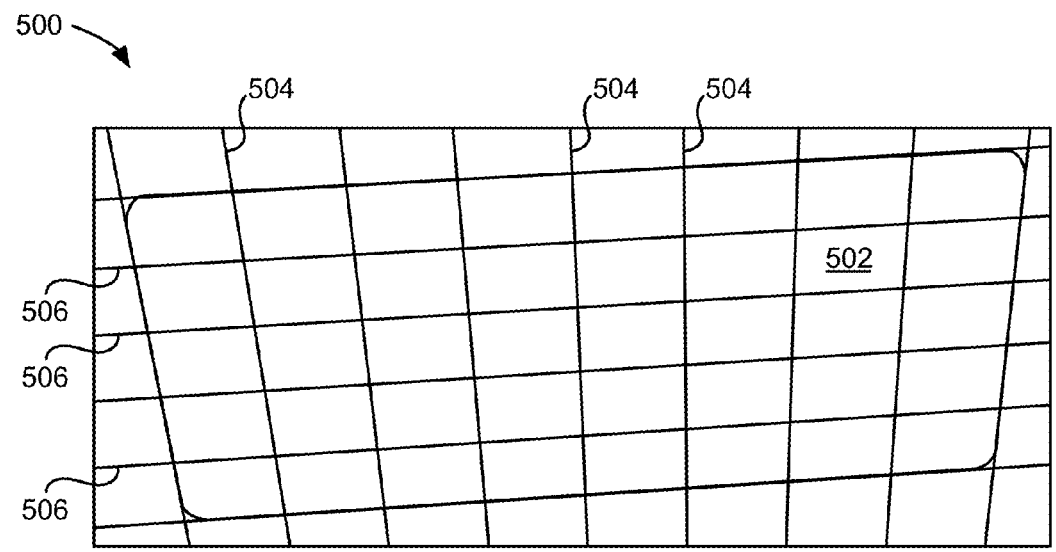
FIG. 5B is a graphical representation of an input to a page rectangularization algorithm, according to one embodiment.
Figure 5C:
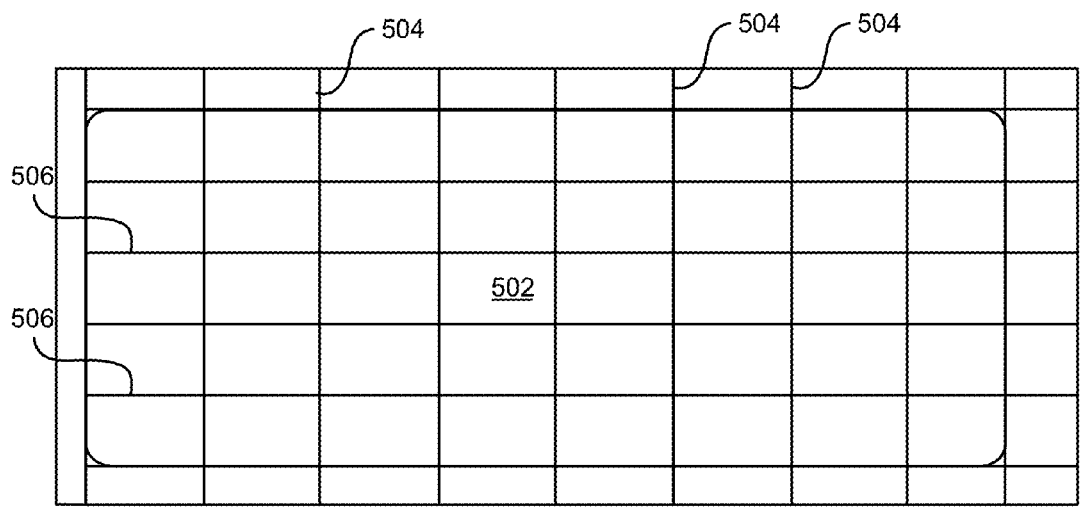
FIG. 5C is a graphical representation of an output of a page rectangularization algorithm, according to one embodiment.

In one embodiment, the goal of a rectangularization algorithm is to smoothly transform a tetragon 400 (such as defined above in page detection method 1900) into a rectangle (such as shown in FIG. 5C). Notably, the tetragon 400 is characterized by a plurality of equations, each equation corresponding to a side of the tetragon 400 and being selected from a chosen class of functions. For example, each side of the tetragon 400 may be characterized by a first degree polynomial, second degree polynomial, third degree polynomial, etc. as would be appreciated by the skilled artisan upon reading the present descriptions.

In one approach, sides of the tetragon 400 may be described by equations, and in a preferred embodiment a left side of the tetragon 400 is characterized by a second degree polynomial equation: $x=a_2*y^2+a_1*y+a_0$; a right side of the tetragon 400 is characterized by a second degree polynomial equation: $x=b_2*y^2+b_1*y+b_0$; a top side of the tetragon 400 is characterized by a second degree polynomial equation: $y=c_2*x^2+c_1*x+c_0$; and a bottom side of the tetragon 400 is characterized by a second degree polynomial equation: $y=d_2*x^2+d_1*x+d_0$.

The description of page rectangularization algorithm presented below utilizes the definition of a plurality of tetragon-based intrinsic coordinate pairs (p, q) within the tetragon, each intrinsic coordinate pair (p, q) corresponding to an intersection of a top-to-bottom curve characterized by an equation obtained from the equations of its left and right sides by combining all corresponding coefficients in a top-to-bottom curve coefficient ratio of p to 1−p, and a left-to-right curve characterized by an equation obtained from the equations of its top and bottom sides by combining all corresponding coefficients in a left-to-right curve coefficient ratio of q to 1−q, wherein 0≤p≤1, and wherein 0≤q≤1.

In a preferred embodiment where the sides of the tetragon 400 are characterized by second degree polynomial equations, the top-to-bottom curve corresponding to the intrinsic coordinate p will be characterized by the equation: $x=((1-p)*a_2+p*b_2)*y^2+((1-p)*a_1+p*b_1)*y+((1-p)*a_0+p*b_0)$, and the left-to-right curve corresponding to the intrinsic coordinate q will be characterized by the equation: $y=((1-q)*c_2+q*d_2)*y^2+((1-q)*c_1+q*d_1)*y+((1-q)*c_0+q*d_0)$. Of course, other equations may characterize any of the sides and/or curves described above, as would be appreciated by one having ordinary skill in the art upon reading the present descriptions.

For a rectangle, which is a particular case of a tetragon, the intrinsic coordinates become especially simple: within the rectangle, each intrinsic coordinate pair (p, q) corresponds to an intersection of a line parallel to each of a left side of the rectangle and a right side of the rectangle, e.g. a line splitting both top and bottom sides in the proportion of p to 1−p; and a line parallel to each of a top side of the rectangle and a bottom side of the rectangle, e.g. a line splitting both top and bottom sides in the proportion of q to 1−q, wherein 0≤p≤1, and wherein 0≤q≤1.

The goal of the rectangularization algorithm described below is to match each point in the rectangularized image to a corresponding point in the original image, and do it in such a way as to transform each of the four sides of the tetragon 400 into a substantially straight line, while opposite sides of the tetragon 400 should become parallel to each other and orthogonal to the other pair of sides; i.e. top and bottom sides of the tetragon 400 become parallel to each other; and left and right sides of the tetragon 400 become parallel to each other and orthogonal to the new top and bottom. Thus, the tetragon 400 is transformed into a true rectangle characterized by four corners, each corner comprising two straight lines intersecting to form a ninety-degree angle.

The main idea of the rectangularization algorithm described below is to achieve this goal by, first, calculating rectangle-based intrinsic coordinates (p, q) for each point P (not shown) in the rectangularized destination image, second, matching these to the same pair (p, q) of tetragon-based intrinsic coordinates in the original image, third, calculating the coordinates of the intersection of the left-to-right and top-to-bottom curves corresponding to these intrinsic coordinates respectively, and finally, assigning the color or gray value at the found point in the original image to the point P.

Referring now to FIG. 5A, which depicts a graphical representation of a first iteration of a page rectangularization algorithm, according to one embodiment. As shown in FIG. 5A, each point in a digital image 500 may correspond to an intersection of a top-to-bottom curve 504 and a left-to-right curve 506 (a curve may include a straight line, a curved line, e.g. a parabola, etc. as would be understood by one having ordinary skill in the art upon reading the present descriptions) corresponding to intrinsic coordinates (such as described above) associated with a point.

As will become apparent from the present descriptions, rectangularization may involve defining a plurality of such left-to-right lines 506 and top-to-bottom lines 504.

Moreover, rectangularization may include matching target rectangle-based coordinates to intrinsic tetragon-based coordinates of the digital representation of the document 502.

As shown in FIG. 5A, this matching may include iteratively searching for an intersection of a given left-to-right curve 506 and a given top-to-bottom curve 504. FIG. 5A shows the first iteration of an exemplary iterative search within the scope of the present disclosures.

The iterative search, according to one approach discussed in further detail below with regard to FIG. 20, includes designating a starting point 508 having coordinates $(x_0, y_0)$. The starting point 508 may be located anywhere within the digital representation of the document 502, but preferably is located at or near the center of the target rectangle.

The iterative search may include projecting the starting point 508 onto one of the two intersecting curves 504, 506. While the starting point may be projected onto either of the curves 504, 506, in one approach the first half of a first iteration in the iterative search includes projecting the starting point 508 onto the top-to-bottom curve to obtain x-coordinate $(x_1)$ of the next point, the projection result represented in FIG. 5A by point 510, which has coordinates $(x_1, y_0)$. Similarly, in some embodiments the second half of a first iteration in the iterative search includes projecting the point 510 onto the left-to-right curve 506 to obtain y-coordinate $(y_1)$ of the next point, the projection result represented in FIG. 5A by point 512, which has coordinates $(x_1, y_1)$.

FIG. 5B is a graphical representation of a starting point of a page rectangularization algorithm, after dividing the digital representation of the document 502 into a plurality of equally-sized sections defined by the plurality of top-to-bottom curves 504 and the plurality of left-to-right curves 506, according to one embodiment.

Rectangularization involves transforming the tetragon 400 defined in page detection into a true rectangle. The result of this process is shown in FIG. 5C as a graphical representation of an output after performing a page rectangularization algorithm, according to one embodiment.

Further iterations may utilize a similar approach such as described in further detail below with respect to FIG. 20 and method 2000, in some embodiments.

Figures 20, 21:
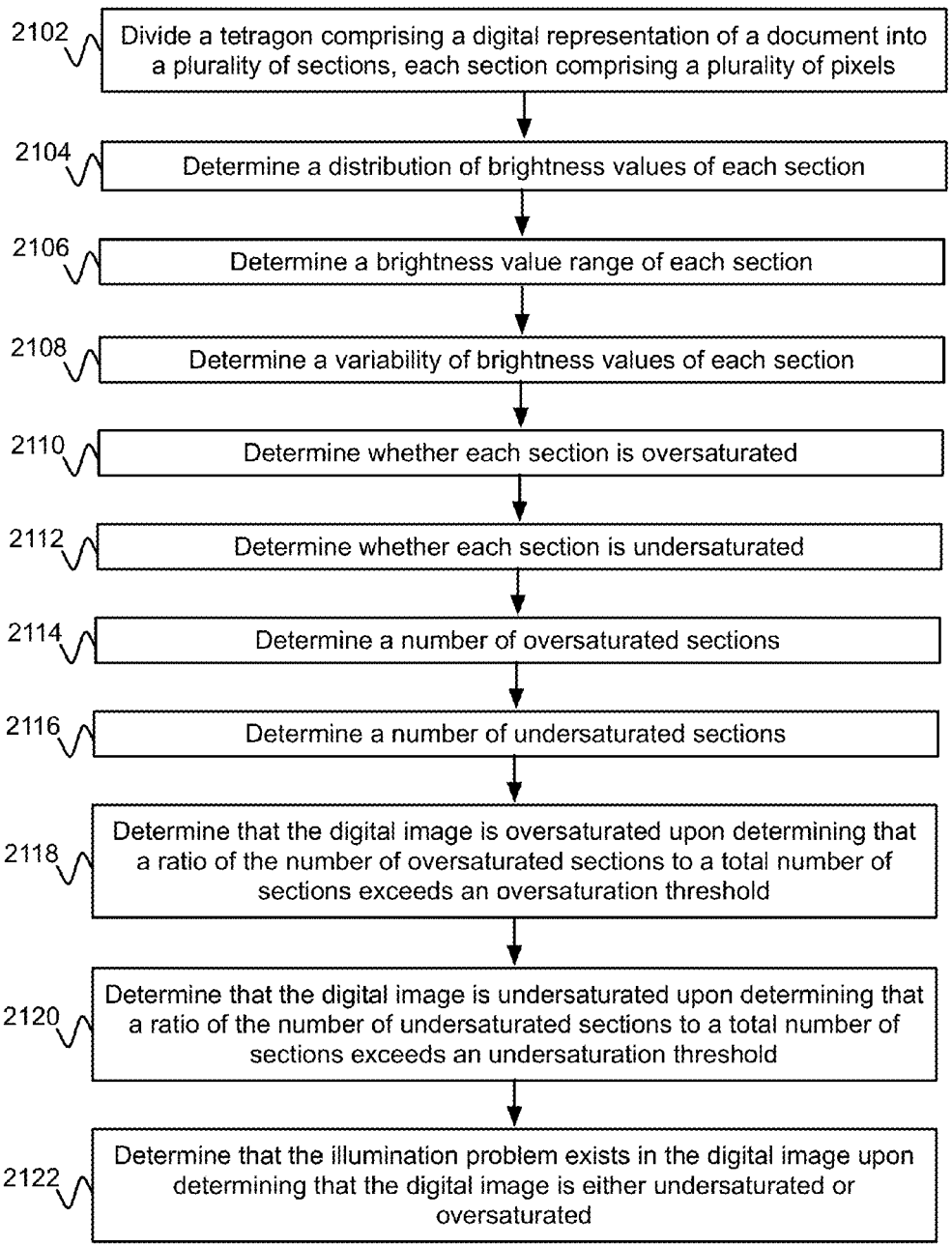
FIG. 20 is a flowchart of a method for page rectangularization, according to one embodiment.
FIG. 21 is a flowchart of a method for detecting illumination problems, according to one embodiment.

With continuing reference to FIGS. 5A-5C, and now with additional reference to FIG. 20, a method 2000 for modifying one or more spatial characteristics of a digital representation of a document in a digital image is shown, according to one embodiment. As will be appreciated by one having ordinary skill in the art upon reading the present descriptions, method 2000 may be performed in any suitable environment, including those shown and/or described in the figures and corresponding descriptions of the present disclosures.

In one embodiment, method 2000 includes operation 2002, where a tetragon 400 (such as defined above in page detection method 1900) is transformed into a rectangle (such as shown in FIG. 5C). Notably, the tetragon 400 is characterized by a plurality of equations, each equation corresponding to a side of the tetragon 400 and being selected from a chosen class of functions. For example, each side of the tetragon 400 may be characterized by a first degree polynomial, second degree polynomial, third degree polynomial, etc. as would be appreciated by the skilled artisan upon reading the present descriptions.

In one embodiment, sides of the tetragon 400 may be described by equations, and in a preferred embodiment a left side of the tetragon 400 is characterized by a second degree polynomial equation: $x=a_2*y^2+a_1*y+a_0$; a right side of the tetragon 400 is characterized by a second degree polynomial equation: $x=b_2*y^2+b_1*y+b_0$; a top side of the tetragon 400 is characterized by a second degree polynomial equation: $y=c_2*x^2+c_1*x+c_0$; and a bottom side of the tetragon 400 is characterized by a second degree polynomial equation: $y=d_2*x^2+d_1*x+d_0$. Moreover, the top-to-bottom curve equation is: $x=((1-p)*a_2+p*b_2)*y^2+((1-p)*a_1+p*b_1)*y+((1-p)*a_0+p*b_0)$, and the left-to-right curve equation is: $y=((1-q)*c_2+q*d_2)*y^2+((1-q)*c_1+q*d_1)*y+((1-q)*c_0+q*d_0)$. Of course, other equations may characterize any of the sides and/or curves described above, as would be appreciated by one having ordinary skill in the art upon reading the present descriptions.

In one embodiment, curves 504, 506 may be described by exemplary polynomial functions fitting one or more of the following general forms.

$$x_1=u_2*y_0^2+u_1*y_0+u_0;$$

$$y_1=v_2*x_1^2+v_1*x_1+v_0,$$

where $u_i=(1-p)*a_i+p*b_i$, and $v_i=(1-q)*c_i+q*d_i$, and where, $a_i$ are the coefficients in the equation of the left side of the tetragon, $b_i$ are the coefficients in the equation of the right side of the tetragon, $c_i$ are the coefficients in the equation of the top side of the tetragon, $d_i$ are the coefficients in the equation of the bottom side of the tetragon, and p and q are the tetragon-based intrinsic coordinates corresponding to curves 504, 506. In some approaches, the coefficients such as $a_i$, $b_i$, $c_i$, $d_i$, etc. may be derived from calculations, estimations, and/or determinations achieved in the course of performing page detection, such as a page detection method as discussed above with reference to method 1900 and FIG. 19.

Of course, as would be understood by one having ordinary skill in the art, transforming the tetragon 400 into a rectangle may include one or more additional operations, such as will be described in greater detail below.

In one embodiment, method 2000 additionally and/or alternatively includes stretching one or more regions of the tetragon 400 to achieve a more rectangular or truly rectangular shape. Preferably, such stretching is performed in a manner sufficiently smooth to avoid introducing artifacts into the rectangle.

In some approaches, transforming the tetragon 400 into a rectangle may include determining a height of the rectangle, a width of the rectangle, a skew angle of the rectangle, and/or a center position of the rectangle. For example, such transforming may include defining a width of the target rectangle as the average of the width of the top side and the width of the bottom side of the tetragon 400; defining a height of the target rectangle as the average of the height of the left side and the height of the right side of the tetragon 400; defining a center of the target rectangle depending on the desired placement of the rectangle in the image; and defining an angle of skew of the target rectangle, e.g. in response to a user request to deskew the digital representation of the document.

In some approaches, the transforming may additionally and/or alternatively include generating a rectangularized digital image from the original digital image; determining a p-coordinate and a q-coordinate for a plurality of points within the rectangularized digital image (e.g. points both inside and outside of the target rectangle) wherein each point located to the left of the rectangle has a p-coordinate value p<0, wherein each point located to the right of the rectangle has a p-coordinate value p>1, wherein each point located above the rectangle has a q-coordinate value q<0, and wherein each point located below the rectangle has a q-coordinate value q>1.

In some approaches, the transforming may additionally and/or alternatively include generating a rectangularized digital image from the original digital image; determining a pair of rectangle-based intrinsic coordinates for each point within the rectangularized digital image; and matching each pair of rectangle-based intrinsic coordinates to an equivalent pair of tetragon-based intrinsic coordinates within the original digital image.

In preferred approaches, matching the rectangle-based intrinsic coordinates to the tetragon-based intrinsic coordinates may include: performing an iterative search for an intersection of the top-to-bottom curve and the left-to-right curve. Moreover, the iterative search may itself include designating a starting point $(x_0, y_0)$, for example, the center of the target rectangle; projecting the starting point $(x_0, y_0)$ onto the left-to-right curve: $x_1 = u_2 * y_0^2 + u_1 * y_0 + u_0$; and projecting a next point $(x_1, y_0)$ onto the top-to-bottom curve: $y_1 = v_2 * x_1^2 + v_1 * x_1 + v_0$, where $u_i = (1-p) * a_i + p * b_i$, and where $v_i = (1-q) * c_i + q * d_i$. Thereafter, the iterative search may include iteratively projecting $(x_k, y_k)$ onto the left-to-right curve: $x_{k+1} = u_2 * y_k^2 + u_1 * y_k + u_0$; and projecting $(x_{k+1}, y_k)$ onto the top-to-bottom curve: $y_{k+1} = v_2 * x_{k+1}^2 + v_i * x_{k+1} + v_0$.

In still more embodiments, matching the rectangle-based intrinsic coordinates to the tetragon-based intrinsic coordinates may include determining a distance between $(x_k, y_k)$ and $(x_{k+1}, y_{k+1})$; determining whether the distance is less than a predetermined threshold; and terminating the iterative search upon determining that the distance is less than the predetermined threshold.

Various Embodiments of Page Skew Correction

In some embodiments, the image processing algorithm disclosed herein may additionally and/or alternatively include functionality designed to detect and/or correct a skew angle of a digital representation of a document in a digital image. One preferred approach to correcting skew are described below with reference to FIG. 6. Of course, other methods of correcting skew within a digital image are within the scope of the disclosures, as would be appreciated by one having ordinary skill in the art upon reading the present descriptions.

Figure 6:
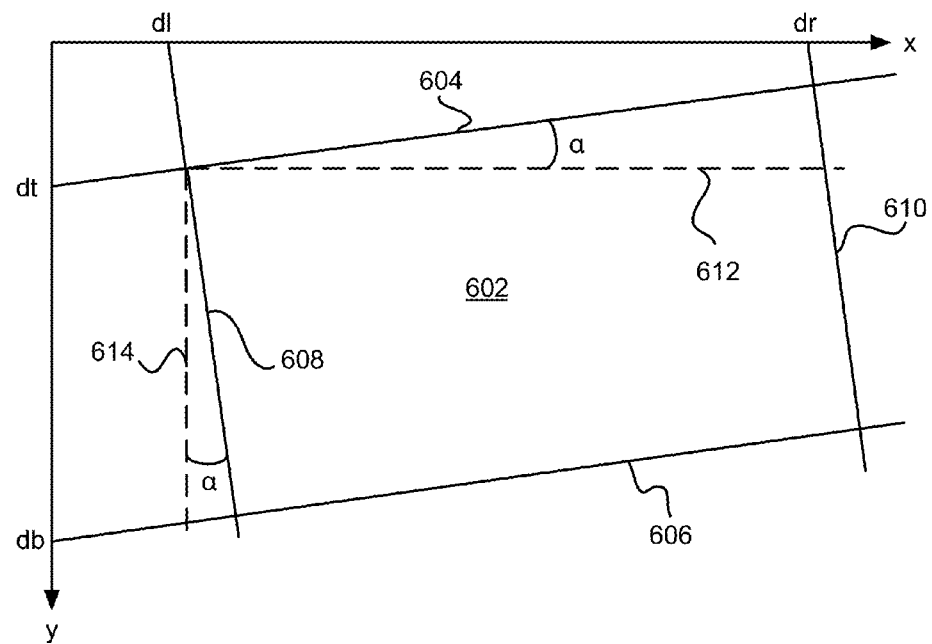
FIG. 6 is a graphical representation of one algorithmic approach to detecting and/or correcting skew of a digital representation of a document in a digital image, according to one embodiment.

FIG. 6 is a graphical representation of one algorithmic approach to detecting and/or correcting skew of a digital representation of a document 602 in a digital image, according to one embodiment.

As shown in FIG. 6, a digital representation of a document 602 in a digital image may be characterized by one or more skew angles α As will be appreciated by the skilled artisan reading these descriptions and viewing FIG. 6, horizontal skew angle α represents an angle between a horizontal line 612 and an edge 604, 606 of the digital representation of the document, the edge 604, 606 having its longitudinal axis in a substantially horizontal direction (i.e. either the top or bottom edge of the digital representation of the document 602). Similarly, a may represent an angle between a vertical line 614 and an edge 608, 610 of the digital representation of the document, the edge 608, 610 having its longitudinal axis in a substantially vertical direction (i.e. either the left edge 608 or right edge 610 of the digital representation of the document 602).

Moreover, as further shown in FIG. 6, the digital representation of the document 602 may be defined by a top edge 604, a bottom edge 606, a right edge 610 and a left edge 608. Each of these edges may be characterized by a substantially linear equation, such that for top edge 604: $y = -\tan(\alpha)x + dt$; for bottom edge 606: $y = -\tan(\alpha)x + db$; for right edge 610: $x = \tan(\alpha)y + dr$; and for left edge 608: $x = \tan(\alpha)y + dl$, where dt and db are the y-intercept of the linear equation describing the top and bottom edges of the digital representation of the document, respectively, and where dr and dl are the x-intercept of the linear equation describing the right and left edges of the digital representation of the document, respectively.

In one approach, having defined the linear equations describing each side of the digital representation of the document 602, for example a rectangular document, a skew angle thereof may be corrected by setting $\alpha=0$, such that for top edge 604: $y=dt$; for bottom edge 606: $y=db$; for right edge 610: $x=dr$; and for left edge 608: $x=dl$.

Various Embodiments of Mobile Page Illumination Detection

In still more embodiments, the presently described image processing algorithm may include features directed to detecting whether a digital representation of a document comprises one or more illumination problems.

For example, illumination problems may include locally under-saturated regions of a digital image, when brightness values vary greatly from pixel-to-pixel within image backgrounds, such as is characteristic of images captured in settings with insufficient ambient and/or provided illumination, and locally over-saturated regions of a digital image, when some areas within the image are washed out, such as within the reflection of the flash.

One exemplary approach to detecting illumination problems in a digital image including a digital representation of a document are described below with reference to FIGS. 7A, which is a pictorial representation of a digital image 700 comprising a digital representation of a document 702 characterized by an illumination problem 704, according to one embodiment; and FIG. 21, which depicts a method 2100 for determining whether illumination problems exist in a digital representation of a document. As will be appreciated by one having ordinary skill in the art upon reading the present descriptions, method 2100 may be performed in any suitable environment, such as those described herein and represented in the various Figures submitted herewith. Of course, other environments may also be suitable for operating method 2100 within the scope of the present disclosures, as would be appreciated by the skilled artisan reading the instant specification.

In one embodiment, method 2100 includes operation 2102, which involves dividing, using a processor, a tetragon 400 including a digital representation of a document into a plurality of sections, each section comprising a plurality of pixels.

In more approaches, method 2100 includes operation 2104, where a distribution of brightness values of each section is determined As will be understood by one having ordinary skill in the art, the distribution of brightness values may be compiled and/or assembled in any known manner, and may be fit to any known standard distribution model, such as a Gaussian distribution, a bimodal distribution, a skewed distribution, etc.

In still more approaches, method 2100 includes operation 2106, where a brightness value range of each section is determined. As will be appreciated by one having ordinary skill in the art, a range is defined as a difference between a maximum value and a minimum value in a given distribution. Here the brightness value range would be defined as the difference between the characteristic maximum brightness value in a given section and the characteristic minimum brightness value in the same section . . . . For example, these characteristic values may correspond to the $2^{nd}$ and $98^{th}$ percentiles of the whole distribution respectively.

In many approaches, method 2100 includes operation 2108, where a variability of brightness values of each section is determined In various approaches, method 2100 includes operation 2110, where it is determined whether each section is oversaturated. For example, operation 2112 may include determining that a region 704 of a digital image 700 depicting a digital representation of a document 702 is oversaturated, as shown in FIG. 7A according to one embodiment. Determining whether each section is oversaturated may include determining a section oversaturation ratio for each section. Notably, in preferred embodiments each section oversaturation ratio is defined as a number of pixels exhibiting a maximum brightness value in the section divided by a total number of pixels in the section.

Figure 7B:
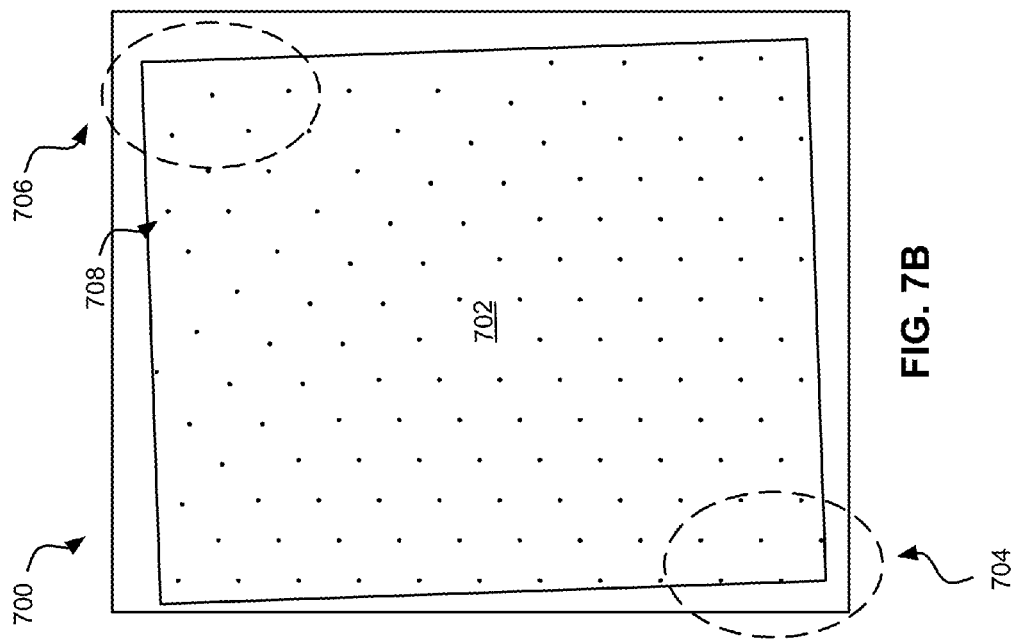
FIG. 7B is a pictorial representation of an output of the digital image as shown in FIG. 7A after normalizing the uneven illumination, according to one embodiment.
Figure 7A:
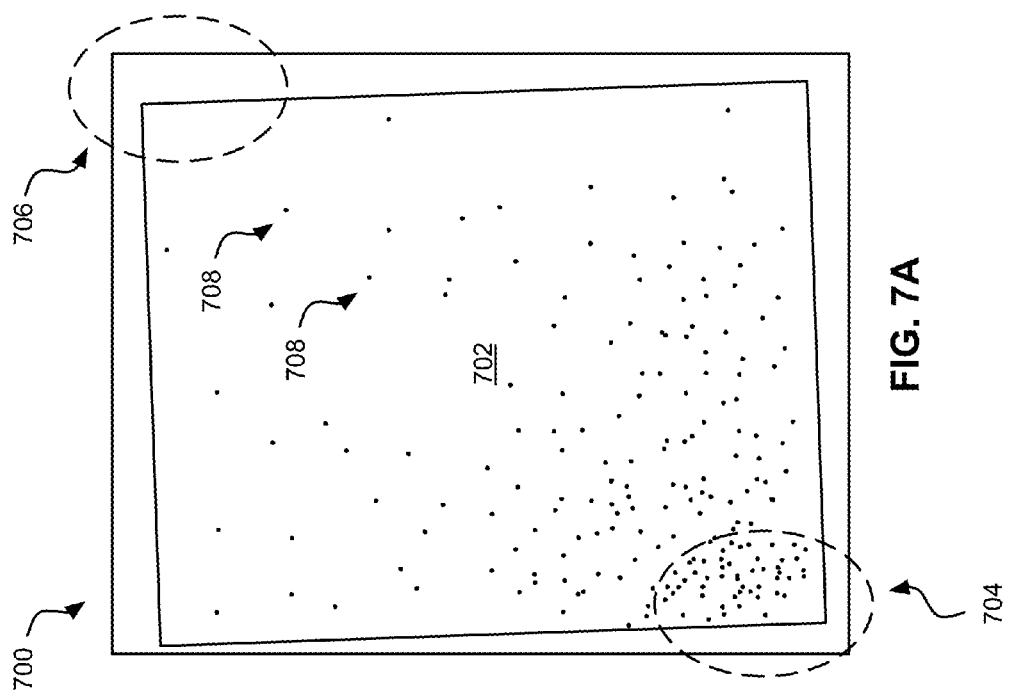
FIG. 7A is a pictorial representation of a digital image comprising a digital representation of a document characterized by uneven illumination, according to one embodiment.

As shown in FIG. 7A, an unevenly illuminated image may depict or be characterized by a plurality of dark spots 708 that may be more dense in areas where the brightness level of a corresponding pixel, point or region of the digital image is lower than that of other regions of the image or document, and/or lower than an average brightness level of the image or document. In some embodiments, uneven illumination may be characterized by a brightness gradient, such as shown in FIG. 7A with a gradient proceeding from a top right corner of the image (near region 706) to a lower left corner of the image (near region 704) such that brightness decreases along the gradient with a relatively bright area in the top right corner of the image (near region 706) and a relatively dark area in the lower left corner of the image (near region 704).

In some approaches, determining whether each section is oversaturated may further include determining, for each section, whether the oversaturation level of the section is greater than a predetermined threshold, such as 10%; and characterizing the section as oversaturated upon determining that the saturation level of the section is greater than the predetermined threshold. While the presently described embodiment, employs a threshold value of 10%, other predetermined threshold oversaturation levels may be employed without departing from the scope of the present descriptions. Notably, the exact value is a matter of visual perception and expert judgment, and may be adjusted and/or set by a user in various approaches.

In more approaches, method 2100 includes operation 2112, where it is determined whether each section is undersaturated. For example, operation 2112 may include determining that a region 704 of a digital image 700 depicting a digital representation of a document 702 is undersaturated, as shown in FIG. 7A according to one embodiment. Determining whether each section is under-saturated may include additional operations such as determining a median variability of the distribution of brightness values of each section; determining whether each median variability is greater than a predetermined variability threshold, such as a median brightness variability of 18 out of a 0-255 integer value range; and determining, for each section, that the section is undersaturated upon determining that the median variability of the section is greater than the predetermined variability threshold. Notably, the exact value is a matter of visual perception and expert judgment, and may be adjusted and/or set by a user in various approaches.

In one particular approach, determining the variability of the section may include determining a brightness value of a target pixel in the plurality of pixels; calculating a difference between the brightness value of the target pixel and a brightness value for one or more neighboring pixels, each neighboring pixel being one or more (for example, 2) pixels away from the target pixel; repeating the determining and the calculating for each pixel in the plurality of pixels to obtain each target pixel variability; and generating a distribution of target pixel variability values, wherein each target pixel brightness value and target pixel variability value is an integer in a range from 0 to 255. This approach may be implemented, for example, by incrementing a corresponding counter in an array of all possible variability values in a range from 0 to 255, e.g. to generate a histogram of variability values.

Notably, when utilizing neighboring pixels in determining the variability of a particular section, the neighboring pixels may be within about two pixels of the target pixel along either a vertical direction, a horizontal direction, or both (e.g. a diagonal direction). Of course, other pixel proximity limits may be employed without departing from the scope of the present invention.

In some approaches, method 2100 may further include removing one or more target pixel variability values from the distribution of target pixel variability values to generate a corrected distribution; and defining a characteristic background variability based on the corrected distribution. For example, in one embodiment generating a corrected distribution and defining the characteristic background variability may include removing the top 35% of total counted values (or any other value sufficient to cover significant brightness changes associated with transitions from the background to the foreground) and define the characteristic background variability based on the remaining values of the distribution, i.e. values taken from a relatively flat background region of the digital representation of the document.

In more approaches, method 2100 includes operation 2114, where a number of oversaturated sections is determined This operation may include any manner of determining a total number of oversaturated sections, e.g. by incrementing a counter during processing of the image, by setting a flag for each oversaturated section and counting flags at some point during processing, etc. as would be understood by one having ordinary skill in the art upon reading the present descriptions.

In more approaches, method 2100 includes operation 2116, where a number of undersaturated sections is determined This operation may include any manner of determining a total number of undersaturated sections, e.g. by incrementing a counter during processing of the image, by setting a flag for each undersaturated section and counting flags at some point during processing, etc. as would be understood by one having ordinary skill in the art upon reading the present descriptions.

In more approaches, method 2100 includes operation 2118, where it is determined that the digital image is oversaturated upon determining that a ratio of the number of oversaturated sections to the total number of sections exceeds an oversaturation threshold, which may be defined by a user, may be a predetermined value, etc. as would be understood by one having ordinary skill in the art upon reading the present descriptions.

In more approaches, method 2100 includes operation 2120, where it is determined that the digital image is undersaturated upon determining that a ratio of the number of undersaturated sections to the total number of sections exceeds an undersaturation threshold, which may be defined by a user, may be a predetermined value, etc. as would be understood by one having ordinary skill in the art upon reading the present descriptions.

In more approaches, method 2100 includes operation 2122, where it is determined that the illumination problem exists in the digital image upon determining that the digital image is either undersaturated or oversaturated.

In still more approaches, method 2100 may include one or more additional and/or alternative operations, such as will be described in detail below.

In one embodiment, method 2100 may include performing the following operations, for each section. Defining a section height by dividing the height of the document into a predefined number of horizontal sections; and defining a section width by dividing the width of the document into a predetermined number of vertical sections. In a preferred approach, the section height and width are determined based on the goal of creating a certain number of sections and making these sections approximately square by dividing the height of the document into a certain number of horizontal parts and by dividing the width of the document into a certain (possibly different) number of vertical parts.

Thus, with reference to FIG. 7A and method 2100, in some embodiments each section is characterized by a section height and width, where the digital image is characterized by an image width w and an image height h, where h>=w, where the section size is characterized by a section width $w_s$ and a section height $h_s$ where $w_s$=w/m, where $h_s$=h/n, where m and n are defined so that $w_s$ is approximately equal to $h_s$. For example, in a preferred embodiment, m>=3, n>=4.

In another approach, a method 2200 for determining whether illumination problems exist in a digital representation of a document, includes the following operations, some or all of which may be performed in any environment described herein and/or represented in the presently disclosed figures.

Various Embodiments of Mobile Page Illumination Normalization

FIG. 7B is a pictorial representation an output of the digital image 700 as shown in FIG. 7A after correcting a detected unevenness of illumination in a digital image, 700, according to one embodiment. In some approaches, correcting unevenness of illumination in a digital image 700 includes normalizing an overall brightness level of the digital image. With reference to FIG. 7A, normalizing overall brightness may transform a digital image characterized by a brightness gradient such as discussed above and shown in FIG. 7A into a digital image characterized by a relatively flat, even distribution of brightness across the digital image, such as shown in FIG. 7B. Note that in FIG. 7A region 704 is characterized by a significantly more dense distribution of dark spots 708 than region 706, but in FIG. 7B regions 704, 706 are characterized by substantially similar dark spot 708 density profiles.

In accordance with the present disclosures, unevenness of illumination may be corrected. In particular, a method 2200 for correcting uneven illumination in one or more regions of the digital image is provided herein for use in any suitable environment, including those described herein and represented in the various figures, among other suitable environments as would be known by one having ordinary skill in the art upon reading the present descriptions.

In one embodiment, method 2200 includes operation 2202 where, using a processor, a two-dimensional illumination model is derived from the digital image.

In one embodiment, method 2200 includes operation 2204, where the two-dimensional illumination model is applied to each pixel in the digital image.

In more approaches, the digital image may be divided into a plurality of sections, and some or all of the pixels within a section may be clustered based on color, e.g. brightness values in one or more color channels, median hue values, etc. as would be understood by one having ordinary skill in the art upon reading the present descriptions. Moreover, several most numerous clusters may be analyzed to determine characteristics of one or more possible local backgrounds. In order to designate a cluster as a local background of the section, the number of pixels belonging to this cluster has to exceed a certain predefined threshold, such as a threshold percentage of the total section area.

In various approaches, clustering may be performed using any known method, including Markov-chain Monte Carlo methods, nearest neighbor joining, distribution-based clustering such as expectation-maximization, density-based clustering such as density-based spatial clustering of applications with noise (DBSCAN), ordering points to identify the clustering structure (OPTICS), etc. as would be understood by one having ordinary skill in the art upon reading the present descriptions.

In one embodiment, method 2200 may include determining, for each distribution of color channel values within background clusters, one or more of an average color of the primary background of the corresponding section and an average color of the secondary background of the corresponding section, if one or both exist in the section.

In one embodiment, method 2200 includes designating, for each section, either the primary background color or the secondary background color as a local representation of a main background of the digital representation of the document, each local representation being characterized by either the average color of the primary background of the corresponding section or the average color of the secondary background of the corresponding section;

In one embodiment, method 2200 includes fitting a plurality of average color channel values of chosen local representations of the image background to a two-dimensional illumination model. In some approaches, the two-dimensional illumination model is a second-degree polynomial characterized by the equation: $v=ax^2+bxy+cy^2+dx+ey+f$; where v is an average color channel value for one of the plurality of color channels; a, b, c, d, e, and f are each unknown parameters of the two-dimensional illumination model, each unknown parameter a, b, c, d, e, and f is approximated using a least-mean-squares approximation, x is a x-coordinate of the mid-point pixel in the section, and y is a y-coordinate of the mid-point pixel in the section.

In one approach, derivation of the two-dimensional illumination model may include, for a plurality of background clusters: calculating an average color channel value of each background cluster, calculating a hue ratio of each background cluster, and calculating a median hue ratio for the plurality of background clusters. Moreover, the derivation may also include comparing the hue ratio of each background cluster to the median hue ratio of the plurality of clusters; selecting the more likely of the possible two backgrounds as the local representation of the document background based on the comparison; fitting at least one two-dimensional illumination model to the average channel values of the local representation; and calculating a plurality of average main background color channel values over a plurality of local representations.

The applying of the model may include the calculating of a difference between one or more predicted background channel values and the average main background color channel values; and adding a fraction of the difference to one or more color channel values for each pixel in the digital image. For example, adding the fraction may involve adding a value in a range from 0 to 1 of the difference, for example, ¾ of the difference, in a preferred embodiment, to the actual pixel value.

Figure 22:
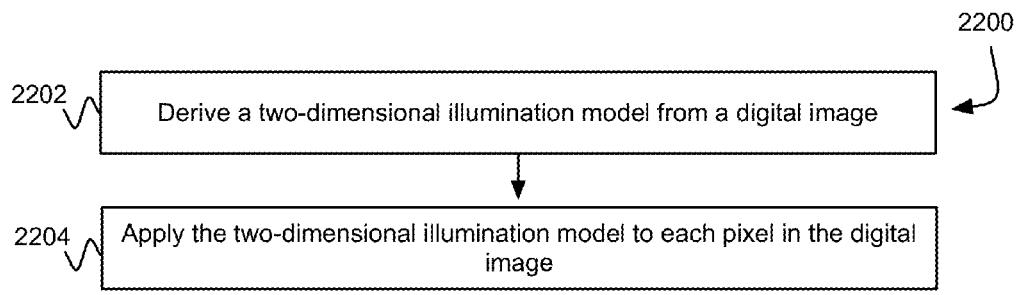
FIG. 22 is a flowchart of a method for correcting illumination problems, according to one embodiment.

In still more approaches, method 2200 may include additional and/or alternative operations, such as those discussed immediately below with continuing reference to FIG. 22.

For example, in one approach method 2200 further includes one or more of: determining, for each section, a plurality of color clusters; determining a plurality of numerous color clusters, each numerous color cluster corresponding to high frequency of representation in the section (e.g. the color cluster is one of the clusters with the highest number of pixels in the section belonging to that color cluster) determining a total area of the section; determining a plurality of partial section areas, each partial section area corresponding to an area represented by one the plurality of numerous color clusters; dividing each partial section area by the total area to obtain a cluster percentage area for each numerous color cluster; (e.g. by dividing the number of pixels in the section belonging to numerous color clusters by the total number of pixels in the section to obtain a percentage of a total area of the section occupied by the corresponding most numerous color clusters) and classifying each numerous color cluster as either a background cluster or a non-background cluster based on the cluster percentage area.

Notably, in preferred approaches the classifying operation identifies either: no background in the section, a single most numerous background in the section, or two most numerous backgrounds in the section. Moreover, the classifying includes classifying each belonging to a cluster containing a number of pixels greater than a background threshold as a background pixel. In some approaches, the background threshold is in a range from 0 to 100% (for example, 15% in a preferred approach). The background threshold may be defined by a user, may be a predetermined value, etc. as would be understood by one having ordinary skill in the art upon reading the present descriptions. . . .

Various Embodiments of Mobile Page Resolution Estimation and Document Classification As a further object of the presently disclosed inventive embodiments, mobile image processing may include a method 2300 for estimating resolution of a digital representation of a document. Of course, method 2300 may be performed in any suitable environment, including those described herein and represented in the various figures presented herewith. Moreover, method 2300 may be used in conjunction with any other method described herein, and may include additional and/or alternative operations to those described below, as would be understood by one having ordinary skill in the art upon reading the present descriptions.

In one embodiment, method 2300 includes operation 2302, where a plurality of connected components of a plurality of non-background elements are detected in the digital image. In some approaches, the digital image may be characterized as a bitonal image, i.e. an image containing only two tones, and preferably a black and white image.

In another embodiment, method 2300 includes operation 2304, where a plurality of likely characters is determined based on the plurality of connected components. Likely characters may be regions of a digital image characterized by a predetermined number of light-to-dark transitions in a given direction, such as three light-to-dark transitions in a vertical direction as would be encountered for a small region of the digital image depicting a capital letter "E," each light-to-dark transition corresponding to a transition from a background of a document (light) to one of the horizontal strokes of the letter "E." Of course, other numbers of light-to-dark transitions may be employed, such as two vertical and/or horizontal light-to-dark transitions for a letter "o," one vertical light to dark transition for a letter "l," etc. as would be understood by one having ordinary skill in the art upon reading the present descriptions.

In still another embodiment, method 2300 includes operation 2306, where one or more average character dimensions are determined based on the plurality of likely text characters. As understood herein, the average character dimensions may include one or more of an average character width and an average character height, but of course other suitable character dimensions may be utilized, as would be recognized by a skilled artisan reading the present descriptions.

In still yet another embodiment, method 2300 includes operation 2308, where the resolution of the digital image is estimated based on the one or more average character dimensions.

Figure 23:
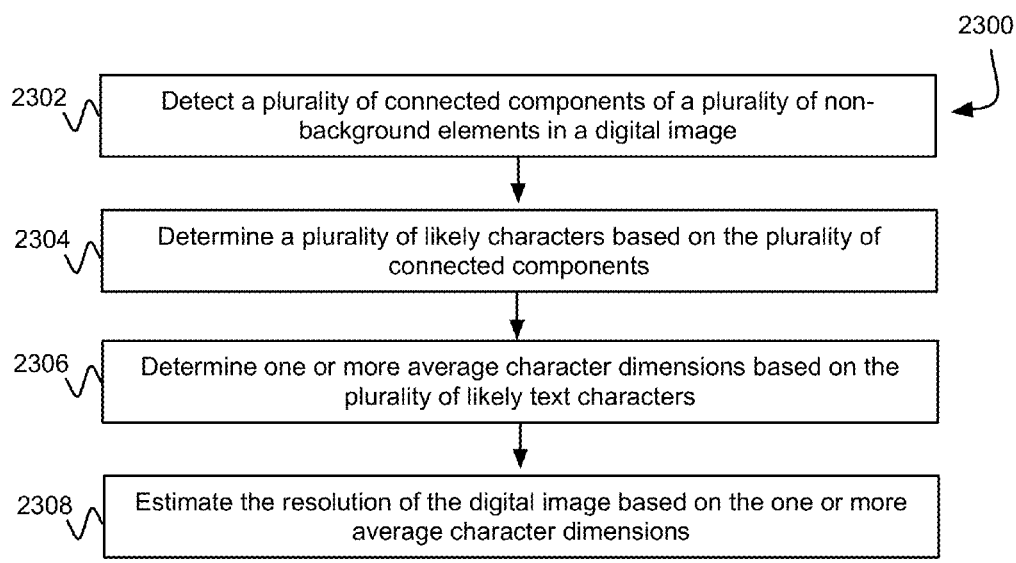
FIG. 23 is a flowchart of a method for estimating resolution of a digital image comprising a digital representation of a document, according to one embodiment.

In further embodiments, method 2300 may optionally and/or alternatively include one or more additional operations, such as described below with continuing reference to FIG. 23.

For example, in one embodiment method 2300 may further include one or more of: estimating one or more dimensions of the digital representation of the document based on the estimated resolution of the digital image; comparing the one or more estimated dimensions of the digital representation of the document to one or more known dimensions of a plurality of known document types; matching the digital representation of the document to one or more of the plurality of known document types based on the comparison; determining whether the match satisfies one or more quality control criteria; and adjusting the estimated resolution of the digital representation of the document based on the known dimensions of the known document type upon determining the match satisfies the one or more quality control criteria. In some approaches, the estimated resolution will only be adjusted if a good match between the digital representation of the document and one of the known document types has been found.

In some approaches, the one or more known document types include: a Letter size document (8.5×11 inch); a Legal size document (8.5×14 inch); an A3 document (11.69×16.54 inch); an A4 (European Letter size) document (8.27×11.69 inch); an A5 document (5.83×8.27 inch); a ledger/tabloid document (11×17 inch); a driver license (2.125×3.375 inch); a business card (2×3.5 inch); a personal check (2.75×6 inch);

a business check (3×7.25 inch); a business check (3×8.25 inch); a business check (2.75×8.5 inch); a business check (3.5×8.5 inch); a business check (3.66×8.5 inch); a business check (4×8.5 inch); a 2.25-inch wide receipt; and a 3.125-inch wide receipt.

In still more approaches, method 2300 may further and/or optionally include computing, for one or more connected components, one or more of: a number of on-off transitions within the connected component; (for example transitions from a character to a document background, e.g. transitions from black-to-white, white-to-black, etc. as would be understood by the skilled artisan reading the present descriptions); a black pixel density within the connected component; an aspect ratio of the connected component; and a likelihood that one or more of the connected components represents a text character based on one or more of the black pixel density, the number of on-off transitions, and the aspect ratio.

In still more approaches, method 2300 may further and/or optionally include determining a character height of at least two of the plurality of text characters; calculating an average character height based on each character height of the at least two text characters; determining a character width of at least two of the plurality of text characters; calculating an average character width based on each character width of the at least two text characters; performing at least one comparison. Notably, the comparison may be selected from: comparing the average character height to a reference average character height; and comparing the average character width to a reference average character width.

In such approaches, method 2300 may further include estimating the resolution of the digital image based on the at least one comparison, where each of the reference average character height and the reference average character width correspond to one or more reference characters, each reference character being characterized by a known average character width and a known average character height.

In various embodiments, each reference character corresponds to a digital representation of a character obtained from scanning a representative sample of one or more business document(s) at some selected resolution, such as 300 DPI, and each reference character further corresponds to one or more common fonts, such as Arial, Times New Roman, Helvetica, Courier, Courier New, Tahoma, etc. as would be understood by the skilled artisan reading the present descriptions. Of course, representative samples of business documents may be scanned at other resolutions, so long as the resulting image resolution is suitable for recognizing characters on the document. In some approaches, the resolution must be sufficient to provide a minimum character size, such as a smallest character being no less than 12 pixels in height in one embodiment. Of course, those having ordinary skill in the art will understand that the minimum character height may vary according to the nature of the image. For example different character heights may be required when processing a grayscale image than when processing a binary (e.g. bitonal) image. In more approaches, characters must be sufficiently large to be recognized by optical character recognition (OCR).

In even still more embodiments, method 2300 may include one or more of: estimating one or more dimensions of the digital representation of the document based on the estimated resolution of the digital representation of the document; computing an average character width from the average character dimensions; computing an average character height from the average character dimensions; comparing the average character width to the average character height; estimating an orientation of the digital representation of the document based on the comparison; and matching the digital representation of the document to a known document type based on the estimated dimensions and the estimated orientation.

In an alternative embodiment, estimating resolution may be performed in an inverse manner, namely by processing a digital representation of a document to determine a content of the document, such as a payment amount for a digital representation of a check, an addressee for a letter, a pattern of a form, a barcode, etc. as would be understood by one having ordinary skill in the art upon reading the present descriptions. Based on the determined content, the digital representation of the document may be determined to correspond to one or more known document types, and utilizing information about the known document type(s), the resolution of the digital representation of the document may be determined and/or estimated.

Various Embodiments of Mobile Blur Detection

Figure 24:
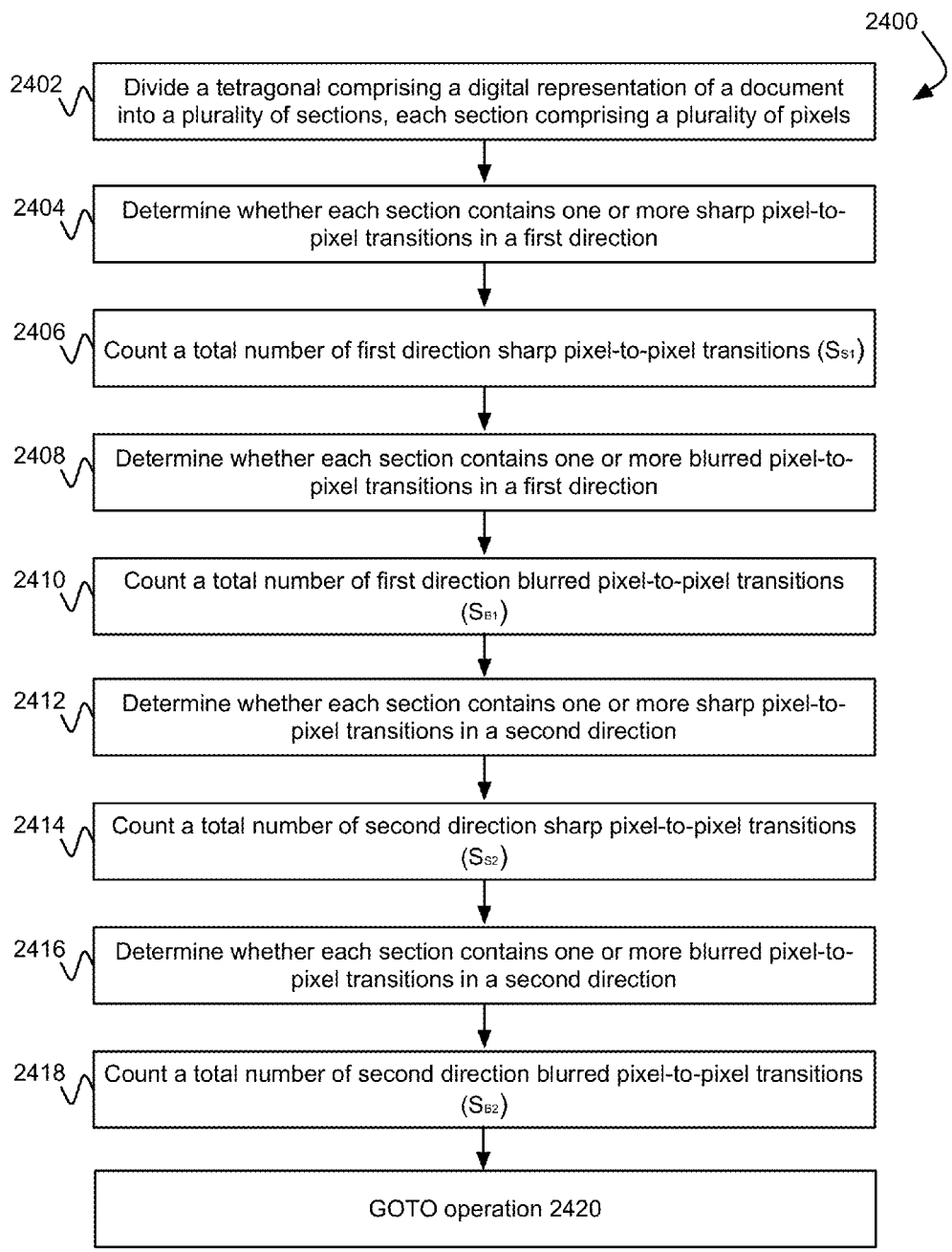
FIG. 24 is a flowchart of a method for detecting blur in a digital image, according to one embodiment.
Figure 24:
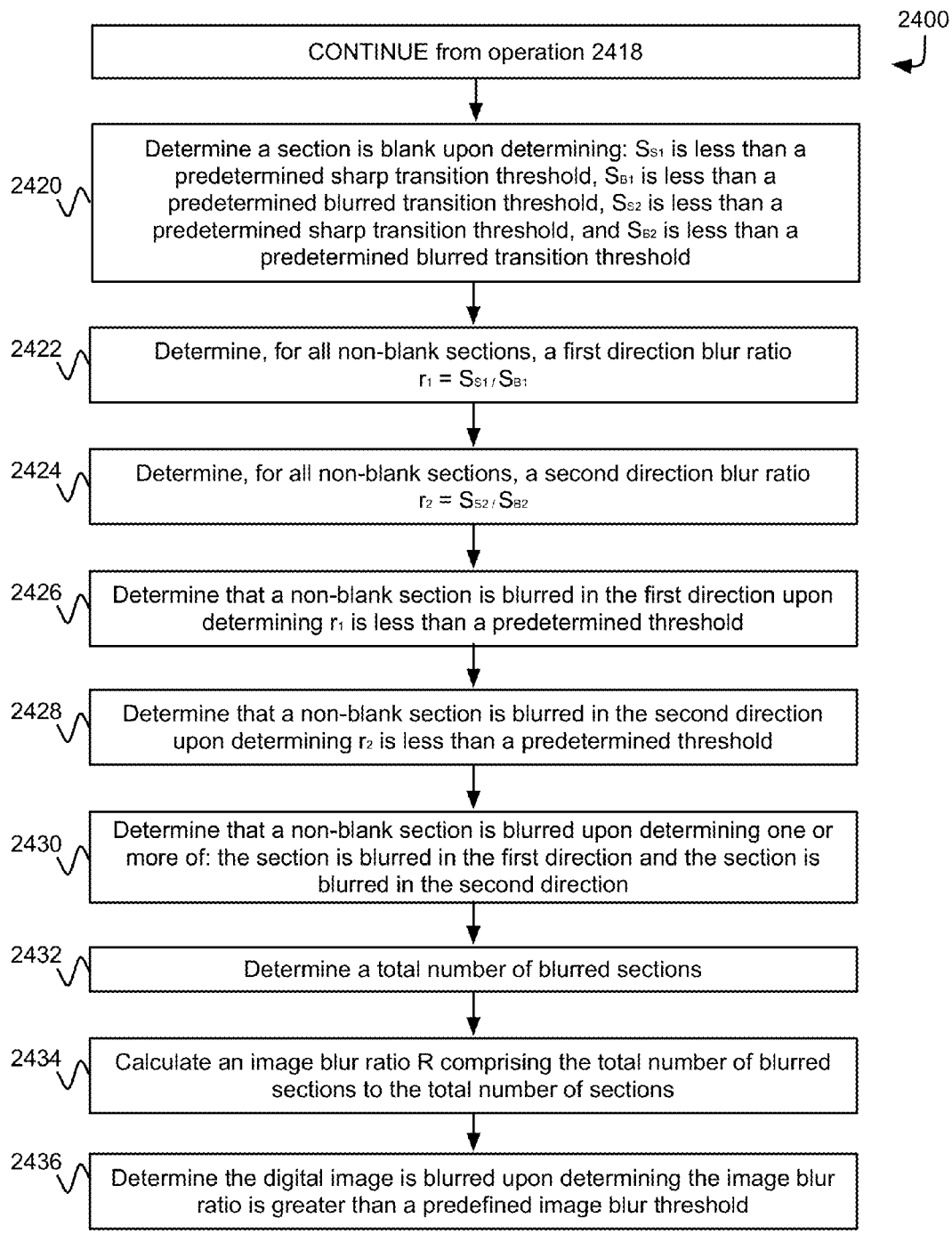

Now with reference to FIG. 24, a method 2400 for detecting one or more blurred regions in a digital image will be described, according to various embodiments. As will be understood and appreciated by the skilled artisan upon reading the present descriptions, method 2400 may be performed in any suitable environment, such as those discussed herein and represented in the multitude of figures submitted herewith. Further, method 2400 may be performed in isolation and/or in conjunction with any other operation of any other method described herein, including but not limited to image.

In one embodiment, method 2400 includes operation 2402, where, using a processor, a tetragon comprising a digital representation of a document in a digital image is divided into a plurality of sections, each section comprising a plurality of pixels.

In one embodiment, method 2400 includes operation 2404, where, for each section it is determined whether the section contains one or more sharp pixel-to-pixel transitions in a first direction In one embodiment, method 2400 includes operation 2406, where, for each section a total number of first direction sharp pixel-to-pixel transitions ($S_{S1}$) are counted.

In one embodiment, method 2400 includes operation 2408, where, for each section it is determined whether the section contains one or more blurred pixel-to-pixel transitions in the first direction.

In one embodiment, method 2400 includes operation 2410, where, for each section a total number of first-direction blurred pixel-to-pixel transitions ($S_{B1}$) are counted.

In one embodiment, method 2400 includes operation 2412, where, for each section it is determined whether the section contains one or more sharp pixel-to-pixel transitions in a second direction.

In one embodiment, method 2400 includes operation 2414, where, for each section a total number of second direction sharp pixel-to-pixel transitions ($S_{S2}$) are counted.

In one embodiment, method 2400 includes operation 2416, where, for each section, it is determined whether the section contains one or more blurred pixel-to-pixel transitions in the second direction In one embodiment, method 2400 includes operation 2418, where for each section, a total number of second-direction blurred pixel-to-pixel transitions ($S_{B2}$) are counted.

In one embodiment, method 2400 includes operation 2420, where for each section, it is determined that the section is blank upon determining: $S_{S1}$ is less than a predetermined sharp transition threshold, $S_{B1}$ is less than a predetermined blurred transition threshold, $S_{S2}$ is less than a predetermined sharp transition threshold, and $S_{B2}$ is less than a predetermined blurred transition threshold.

In one embodiment, method 2400 includes operation 2422, where for each non-blank section, a first direction blur ratio $r_1=S_{S1}/S_{B1}$ is determined In one embodiment, method 2400 includes operation 2424, where for each non-blank section, a second direction blur ratio $r_2=S_{S2}/S_{B2}$ is determined In one embodiment, method 2400 includes operation 2426, where for each non-blank section, it is determined that the non-blank section is blurred in the first direction upon determining that $r_1$ is less than a predefined section blur ratio threshold.

In one embodiment, method 2400 includes operation 2428, where for each non-blank section, it is determined that the non-blank section is blurred in the second direction upon determining that $r_2$ is less than the predefined section blur ratio threshold.

With reference to method 2400, in some approaches a "first direction" and "second direction" may be characterized as perpendicular, e.g. a vertical direction and a horizontal direction, or perpendicular diagonals of a square. In other approaches, the "first direction" and "second direction" may correspond to any path traversing the digital image, but preferably each corresponds to a linear path traversing the digital image. A person having ordinary skill in the art reading the present descriptions will appreciate that the scope of the inventive embodiments disclosed herein should not be limited to only these examples, but rather inclusive of any equivalents thereof known in the art.

In one embodiment, method 2400 includes operation 2430, where for each non-blank section, it is determined that the non-blank section is blurred upon determining one or more of: the section is blurred in the first direction, and the section is blurred in the section direction.

In one embodiment, method 2400 includes operation 2432, where a total number of blurred sections is determined.

In one embodiment, method 2400 includes operation 2434, where an image blur ratio R defined as: the total number blurred sections divided by a total number of sections; is calculated.

In one embodiment, method 2400 includes operation 2436, where, it is determined that the digital image is blurred upon determining the image blur ratio is greater than a predetermined image blur threshold.

In various embodiments, method 2400 may include one or more additional and/or alternative operations, such as described below with continuing reference to FIG. 24. For example, in one embodiment, method 2400 may also include determining, for each section a distribution of brightness values of the plurality of pixels; determining a characteristic variability v of the distribution of brightness values; calculating a noticeable brightness transition threshold η based on v (for example, η=3*v, but not more than a certain value, such as 16); calculating a large brightness transition threshold μ based on η (for example μ=2*η, but not more than a certain value, such as half of the brightness range); analyzing, for each pixel within the plurality of pixels, a directional pattern of brightness change in a window surrounding the pixel; (for example, horizontally, vertically, diagonally, etc.) and identifying one or more of: the sharp pixel-to-pixel transition and the blurred pixel-to-pixel transitions based on the analysis.

In another embodiment, method 2400 may also include defining a plurality of center pixels; sequentially analyzing each of the plurality of center pixels within one or more small windows of pixels surrounding the center pixel; such as two pixels before and after; identifying the sharp pixel-to-pixel transition upon determining: the large brightness transition exists within an immediate vicinity of the center pixel, (for example, from the immediately preceding pixel to the one following), a first small (e.g. smaller than noticeable) brightness variation exists before the large brightness transition; and a second small brightness variation exists after the large brightness transition; detecting the sharp pixel-to-pixel transition upon determining: the large transition exists within one or more of the small windows, a monotonic change in brightness exists in the large transition; and detecting the blurred pixel-to-pixel transition upon determining: the noticeable transition occurs within a small window; and the monotonic change in brightness exists in the noticeable transition.

In still another embodiment, method 2400 may also include, for each section: counting a total number of sharp transitions in each of one or more chosen directions; counting a total number of blurred transitions in each chosen direction; determining that a section is blank upon determining the total number of sharp transitions is less than a predefined sharp transition threshold (for example, 50); and the total number of blurred transitions is less than a predefined blurred transition threshold; determining the non-blank section is blurred upon determining a section blurriness ratio comprising the total number of sharp transitions to the total number of blurred transitions is less than a section blur ratio threshold (for example, 24%) in at least one of the chosen directions; and determining that the section is sharp upon determining the section is neither blank nor blurred.

In yet another embodiment, method 2400 may also include determining a total number of blank sections within the plurality of sections ($N_{blank}$); determining a total number of blurred sections within the plurality of sections ($N_{blur}$); determining a total number of sharp sections within the plurality of sections ($N_{sharp}$); determining a blurriness ratio ($R_B$)=$N_{blur}$/($N_{blur}$+$N_{sharp}$); and determining that the digital image is sharp if the $R_B$ is less than a blurriness threshold (preferably expressed as a percentage, for example 30%).

Exemplary results of one or more of the foregoing algorithmic processing operations will now be described with reference to FIGS. 8A-8D. As will be appreciated by one having ordinary skill in the art, in various embodiments one or more of the following results may be achieved employing multiple combinations of operations described herein, in various sequences. The particular results depicted in FIGS. 8A-8D and the corresponding descriptions should not be viewed as limiting on the scope of the presently disclosed systems and methods, but rather as exemplary embodiments of one possible process commensurate in scope with the disclosures set forth herein.

Figure 8A:
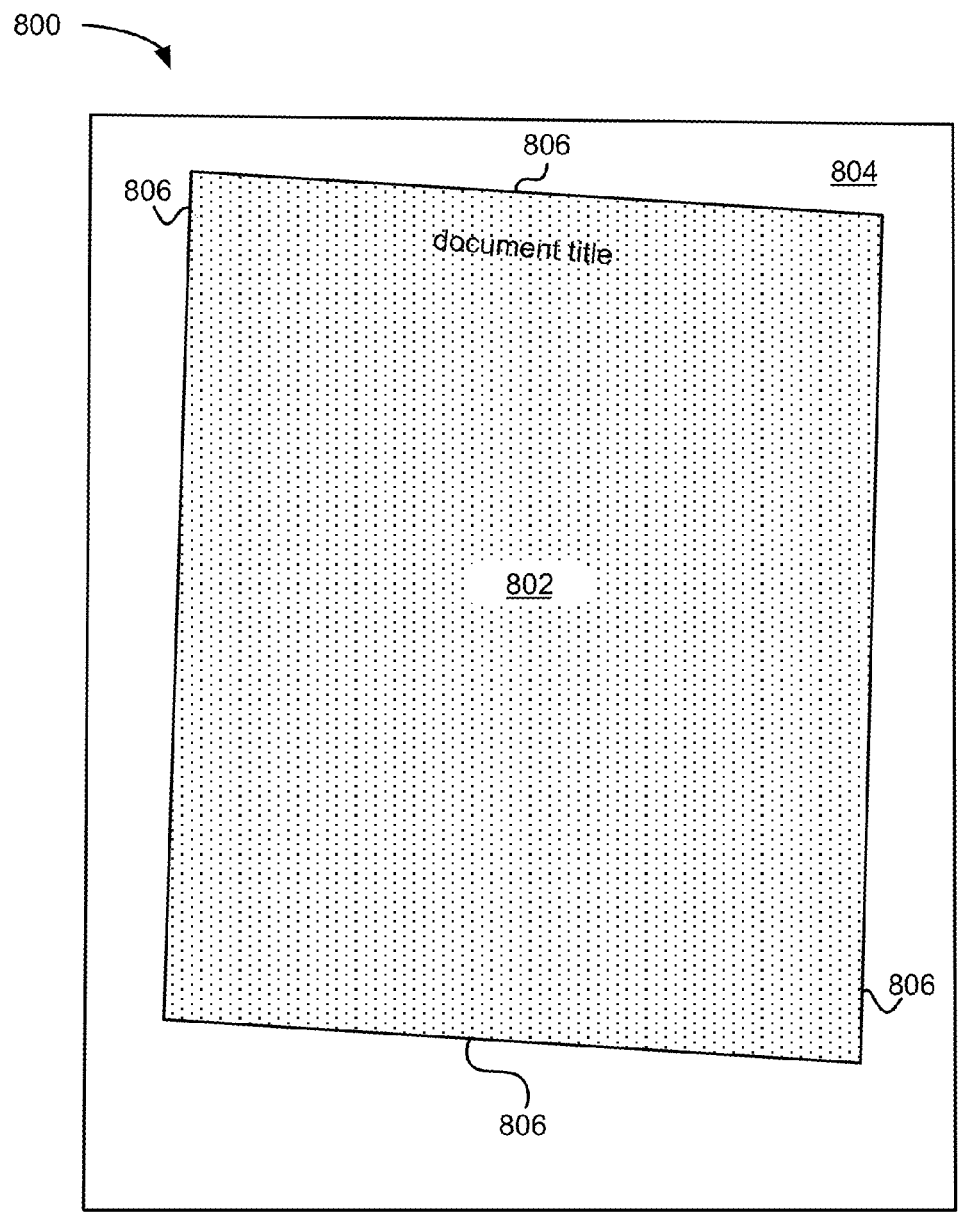
FIG. 8A depicts a digital image comprising a digital representation of a document, according to one embodiment.

FIG. 8A depicts a digital image 800 comprising a digital representation of a document 802, according to one embodiment.

Figure 8B:
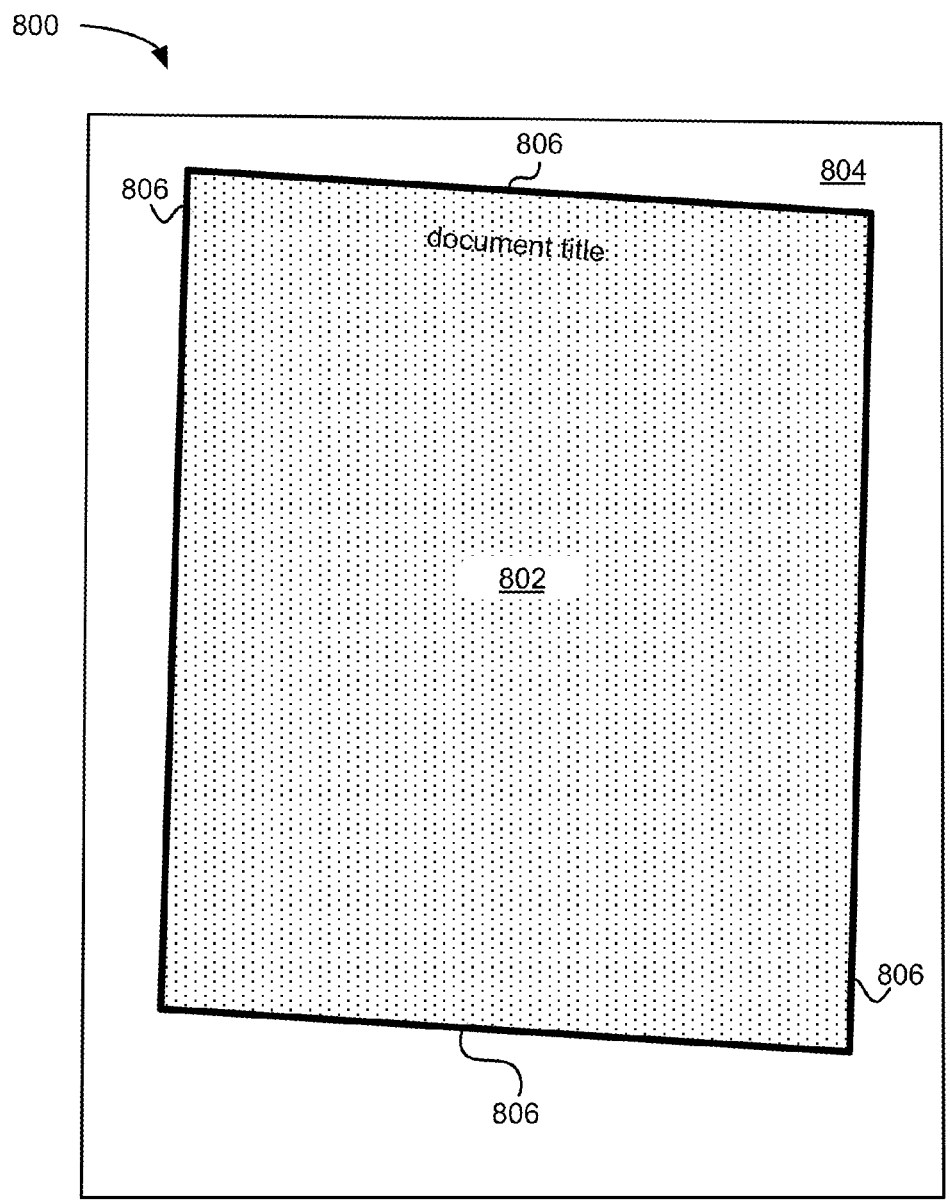
FIG. 8B depicts a digital image as shown in FIG. 8A after performing a page detection algorithm on the digital image, the digital image having a detected digital representation of a document therein, according to one embodiment.

FIG. 8B depicts a digital image 800 as shown in FIG. 8A after performing a page detection algorithm on the digital image 800, the digital image 800 having a detected digital representation of a document 802 therein, according to one embodiment.

Figure 8C:
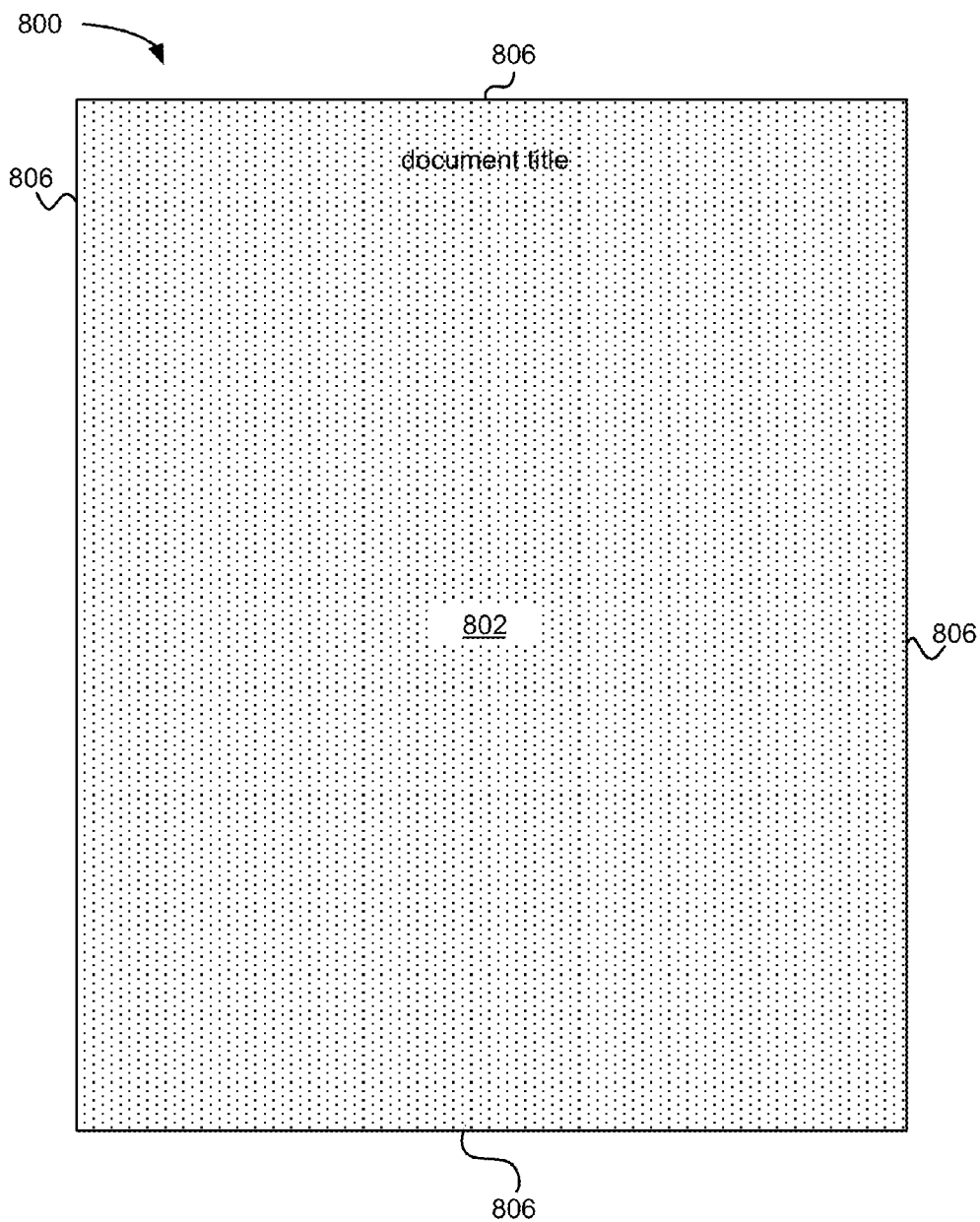
FIG. 8C is depicts a digital representation of a document as shown in FIG. 8B, with the background of the digital image having been removed and a skew angle of the digital representation of the document having been corrected, according to one embodiment.

FIG. 8C is depicts a digital representation of a document 802 as shown in FIG. 8B, with the background of the digital image 800 having been removed and a skew angle of the digital representation of the document 802 having been corrected, according to one embodiment.

Figure 8D:
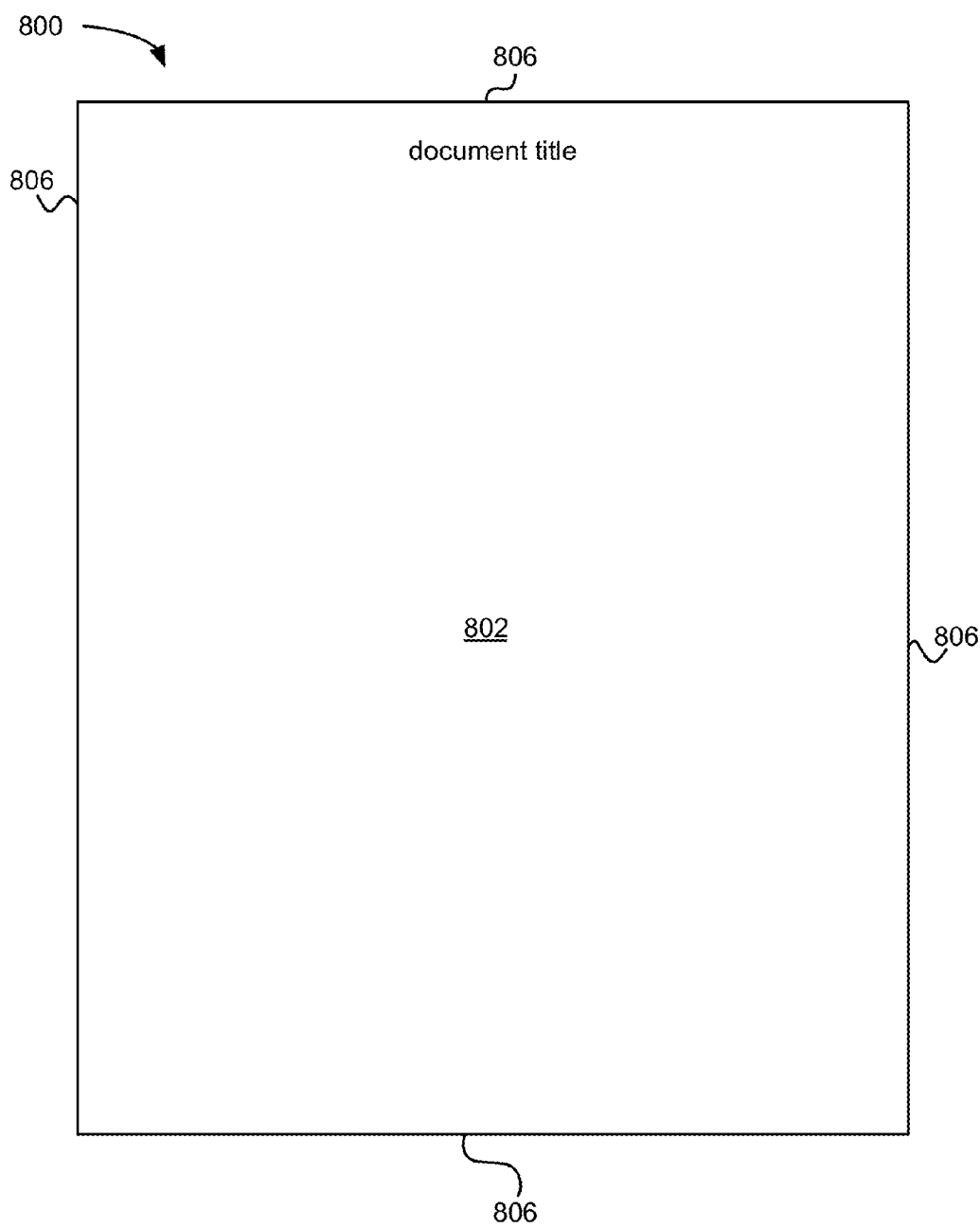
FIG. 8D is a digital representation of a document as shown in FIG. 8C, with the digital representation of the document having been thresholded to produce a bitonal image.

FIG. 8D is a digital representation of a document 802 as shown in FIG. 8C, with the digital representation of the document 802 having been thresholded to produce a bitonal image.

Various Embodiments of Mobile Capture and Processing Application

Several embodiments of the presently described invention relate to providing a software application for use in a mobile computing environment of a mobile device, the software application comprising a plurality of user interfaces configured to facilitate a user performing one or more actions relating to mobile image capture and processing of digital representations of documents and/or associated data. As will become apparent from the following descriptions, user interfaces within the scope of the present disclosure generally relate to one or more of mobile image capture, mobile image processing, managing cases with which mobile images are associated, etc.

Figure 9:
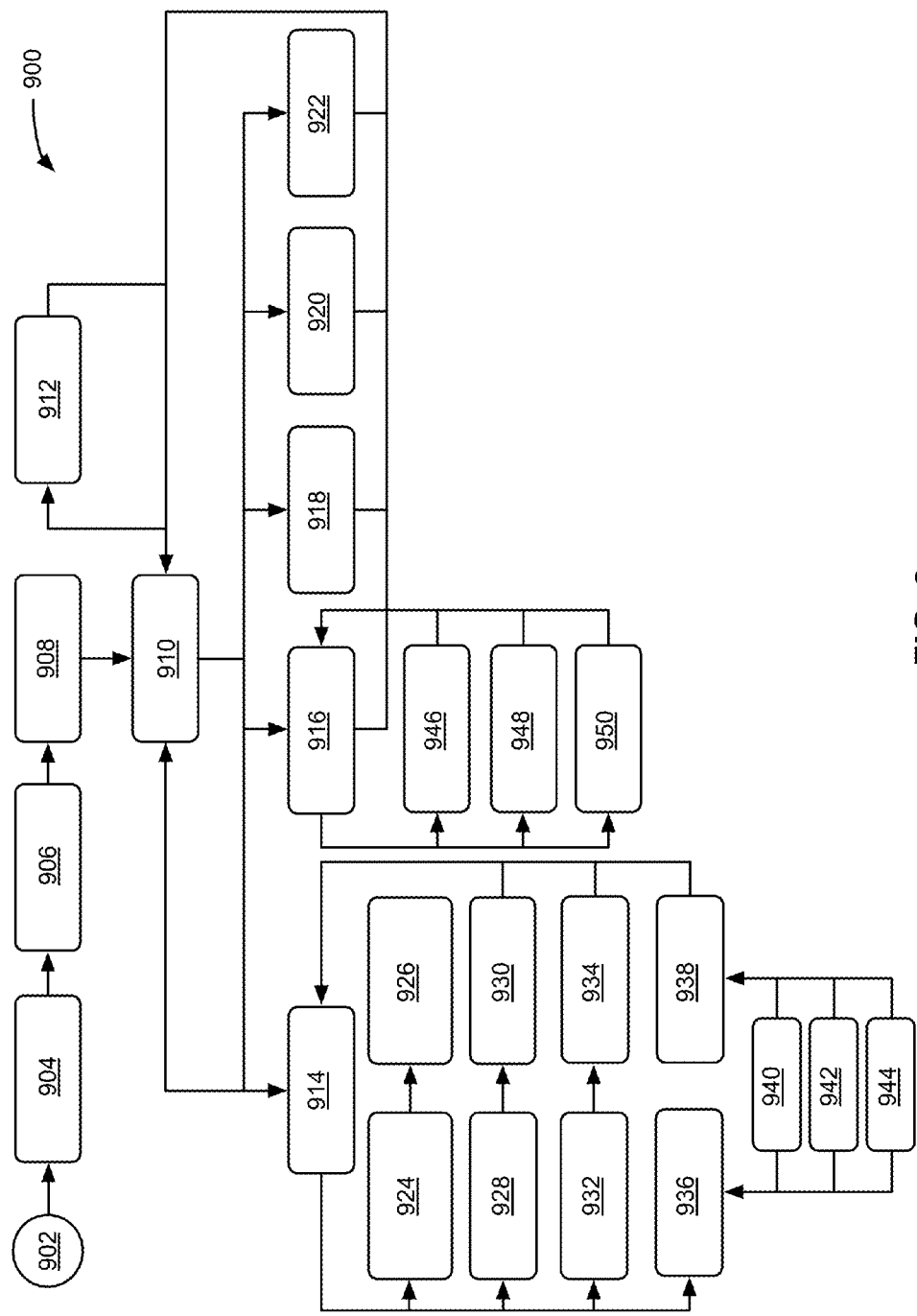
FIG. 9 is a flowchart of a method for capturing and/or processing a digital image comprising a digital representation of a document, according to one embodiment.

FIG. 9 depicts a flowchart 900 of a user interface hierarchy for capturing and/or processing a digital image comprising a digital representation of a document, according to one embodiment. Various operations depicted in the flowchart 900 may be performed in any environment, including those depicted in FIGS. 1-8 and 10A-19D, in various approaches. The user interface hierarchy may be particularly applicable and/or advantageous to employ in a mobile application such as depicted particularly in FIGS. 10A-19D. Moreover, operations depicted in the flowchart 900 may be performed in a multitude of sequences, as depicted by the arrows in the flowchart 900.

In one embodiment, a user may instantiate a mobile application in operation 902. Instantiating the mobile application may be performed in any known manner, such as selecting an icon, performing a gesture, tapping a portion of a mobile device display, via an application call from another application or another operation within the flowchart 900, etc. as will be understood by one having ordinary skill in the art upon reading the present descriptions.

In particularly secure embodiments, a user instantiating the mobile application may be required to provide authentication information to a host device, such as a server or network switch in operation 904. Authentication may be performed according to any known protocol and by any suitable means understood by skilled artisans upon reading the present descriptions, such as via TCP/IP, secure socket layering (SSL), using a virtual private network (VPN) connection, etc.

In more approaches, settings for the user interface and/or algorithmic processing to be performed via the user interface may be synchronized between a client device and a host device in operation 906. Synchronization may be performed in any suitable manner and/or by giving priority to either the host or the client device, i.e. the host may modify settings for a user account on the host to match settings on the client device, the client device may modify settings on the client side to match settings on a user account of the host device, etc. Moreover, synchronization may be account-specific, device-specific, or universal. Synchronization may further include providing and/or resetting settings to a preconfigured set of default settings, e.g. if a client and/or a host system crash or malfunction is experienced.

Whether or not authentication was performed in operation 902 and/or settings were synchronized via operation 904, the user interface hierarchy may enable users to open one or more new or existing cases in operation 908. As understood herein, a case may be embodied as a directory, folder, subfolder, entry in a relational database, or any other suitable organizational structure suitable for use in a computing environment. Moreover, cases may relate to a variety of document-related tasks, such as an invoice, an automobile accident report, an insurance appraisal, patient health care records, a shipping manifesto and/or waybill, a loan application, etc. as would be understood by one having ordinary skill in the art upon reading the present descriptions.

In one embodiment, opening a case may enable the user to perform one or more case management operations falling under the general umbrella of a case management operation 910. Exemplary, nonlimiting case management operations may include one or more of changing a case type, e.g. in operation 912, capturing a document image, e.g. in operation 914, reviewing a captured image, e.g. in operation 916, entering case data, e.g. in operation 918, signing a case, e.g. in operation 920, and submitting a case, e.g. in operation 922, etc. as would be understood by one having ordinary skill in the art upon reading the present descriptions. Of course, case management could include other operations not specifically shown in the user hierarchy flowchart 900 as depicted in FIG. 9, and generally include any action relevant to managing a case as defined herein. Furthermore, each of the general case operations 914-922 described above may include one or more sub-operations, as will be described in greater detail with reference to each specific case management operation below.

With reference to changing case types in operation 912, this operation permits a user to manipulate a classification associated with a particular case file, in one embodiment. Case type classification may determine other actions capable of and/or scheduled to be performed for the particular case, and may facilitate efficient handling of cases. For example, if a case type is a loan application, other actions to be performed may include requesting a credit check, acknowledging receipt of a down-payment or escrow payment, approving/denying the loan, etc. as would be understood by one having ordinary skill in the art. Preferably, the other actions enabled by choosing a particular case type may be especially relevant to that case type, as in the examples provided above, and may not include especially irrelevant actions. With continuing reference to the loan application example, such irrelevant actions may include reviewing submitting an invoice, scheduling a doctor's appointment, contacting an emergency authority to respond to an accident, etc. Other exemplary case types may include accident reports, health care reviews, invoices, shipping actions, etc. as would be understood by one having ordinary skill in the art.

With reference to capturing a document image in operation 914, the scope of the present disclosures includes a variety of embodiments comprising capture methods and mechanisms. For example, image capture may include capturing a digital image using a capture component, e.g. a camera, coupled to or integrated with the mobile device. In such approaches, capture may be performed using photograph capture software native to the mobile device, or may utilize an image capture functionality built-in to the mobile image capture and processing user interface, as will be described in more detail below with reference to FIGS. 15A-16E.

When capturing using the image capture functionality built-in to the mobile image capture and processing user interface, a user may select among three methods for image capture and subsequent processing.

In one embodiment, via operation 924, a user may capture an image in a "Full Process Mode," which assists the user in capturing a high quality image and subsequently performs a full processing algorithm including any or all processing functions described herein, as determined by the user, e.g. using a settings user interface as will be described in further detail regarding FIGS. 17A-B.

In some approaches, after capturing the image in "Full Process Mode" and processing the captured image according to methods described herein, a user may be presented with a Full Process Capture Page Results Output on the display of the mobile device in operation 926.

In another embodiment, via operation 928, a user may capture an image in a "Preview Mode," which assists the user in capturing a high quality image and subsequently performs a quality-control (QC) analysis including processing functions such as detecting the document in the image, detecting illumination problems, detecting blur, etc. as described herein and as would be understood by one having ordinary skill in the art upon reading the present descriptions.

In various preferred embodiments, and in order to reduce processing required to generate a preview in "Preview Mode," image processing operations may be performed in a particularly efficient order. For example, in one approach illumination problems and/or blurred regions may be detected immediately after detecting a digital representation of a document in a digital image. Similarly, in more approaches resolution estimation and matching to known document types may be performed after page detection, but before rectangularizing, deskewing and/or cropping the digital representation of the document in the digital image.

In some approaches, after capturing the image in "Preview Mode" and processing the captured image according to methods described herein, a user may be presented via an image capture QC results user interface on the display of the mobile device in operation 930. The "Preview Mode" interface and the an image capture QC results user interface will be described in further detail below with reference to FIG. 15C.

In some approaches, capturing an image in a "Full Process Mode" and a "Preview Mode" may utilize a substantially identical image capture user interface, which will be described in further detail below with regard to FIGS. 15A-15B.

In still another embodiment, via operation 932, a user may capture an image in a "Mobile Scanner" mode, which captures image data from a mobile scanner in communication with the mobile device. "Mobile Scanner Mode" may include processing as described above for "Full Process Mode" or "Preview Mode," as may follow default settings or as may be determined by the user. The mobile scanner image capture user interface will be described in more detail below with reference to FIGS. 16D-16E.

In some approaches, after capturing the image in "Mobile Scanner Mode" and processing the captured image according to the methods described herein, a user may be presented with a mobile scanner image capture results user interface on the display of the mobile device in operation 934. The mobile scanner image capture results user interface may be substantially similar to the image capture and processing results user interface, the image capture QC results user interface, or combinations thereof, as will be understood by one having ordinary skill in the art upon reading the present descriptions.

When capturing using the interface native to the mobile device, users may capture the image according to the methodology set forth in such interface. Subsequently, in operation 936, a user may designate the captured image for processing, using a capture image attachment user interface such as described below regarding FIG. 16A. Alternatively, the capture attachment user interface depicted in FIG. 16A may be utilized to capture images in "Full Process Mode" and/or "Preview Mode, in some approaches.

In some approaches, after capturing the image in "Capture Attachment Mode," a user may be presented with a capture attachment results user interface on the display of the mobile device in operation 938. The capture attachment results user interface may be substantially similar to the image capture and processing results user interface, the capture image QC user interface, or combinations thereof, as will be understood by one having ordinary skill in the art upon reading the present descriptions.

In particularly preferred embodiments, users may additionally and/or alternatively capture data other than image data. For example, users may capture image data as described above, video data, and/or audio data relating to a case. As a nonlimiting example, a user may capture a video showing perspectives of a walk-around detailing damage to an automobile after an accident, or depicting the condition of real property for purposes of insurance, appraisal, etc. as would be understood by one having ordinary skill in the art upon reading the present descriptions. Similarly, audio data relating to a case may include a recorded statement, for example by an individual involved in an accident, a witness, a police officer responding to the accident, etc. as would be understood by one having ordinary skill in the art upon reading the present descriptions. Exemplary embodiments of the capture video attachment user interface and capture audio attachment user interface will be described below with reference to FIGS. 16B-16C.

As shown in FIG. 9, image data to be associated with a case is represented by element 940, video data by element 942, and audio data by element 944, all of which may be included and/or associated with any of the capture modes and/or results outputs described above and depicted in FIG. 9.

Now, with reference to reviewing captured image(s) in operation 916, in various approaches a user may review a captured image, whether captured in "Full Process Mode," "Preview Mode," "Mobile Scanner Mode" or "Capture Attachment Mode" as described above. Operation 916 may include functionalities such as editing the captured image in operation 946, deleting the captured image in operation 948, and/or enhancing the captured image in operation 950.

As understood herein, editing the captured image in operation 946 may include manually cropping, zooming, rotating, etc. the image. Editing may also include manually adjusting the image aspect ratio, brightness, contrast, sharpness, tint, color, etc. according to any known method in various approaches. Editing may further include re-capturing the image, in various approaches. In still more approaches, editing may include designating a document type, size, or format, which may include any known type, size or format such as U.S. letter, A3, A4, A5, ledger, legal, check, business card, etc. as would be understood by one having ordinary skill in the art upon reading the present descriptions. In preferred approaches, a user may edit the image using an edit object action interface such as will be described below with reference to FIG. 13E. The edit object action interface may facilitate a user editing the image by providing access to further interfaces, such as a crop object user interface and/or a constrain object user interface as discussed below with reference to FIGS. 13F-13G.

Deleting the image in operation 948 may include removing any association between the image and the case, removing any association between the image and the mobile image capture and processing application, deleting the image from a memory of the mobile device, overwriting a portion of the memory of the mobile device storing data corresponding to the image, etc. as would be understood by one having ordinary skill in the art upon reading the present descriptions. Case objects may be deleted in one embodiment using a delete object user interface such as described below with reference to FIG. 13C.

Enhancing the image in operation 950 may include processing the image using one or more algorithmic functionalities described above, including detecting and/or correcting illumination problems, detecting and/or correcting blur, detecting and/or correcting skew, rendering the image bitonal, etc. as would be understood by one having ordinary skill in the art upon reading the present descriptions.

With reference to entering case data in operation 918, a user may enter information relating to a case and/or images captured and associated with a case. Any relevant information may be entered. For example, if a case type is a loan application, a user may enter information such as a loan number, a customer name, a date, a location, an account number, a customer address, a guarantor name, a loan amount, etc. as would be understood by one having ordinary skill in the art upon reading the present descriptions.

Moreover, case data may include alphanumeric characters, items selectable from a drop-down list or field, predetermined options selectable via check boxes, toggle switches, metadata, metadata labels, etc. as would be understood by one having ordinary skill in the art upon reading the present descriptions. In preferred embodiments, users may enter case data via an enter case data interface. One exemplary embodiment of an enter case data user interface will be described in further detail below with reference to FIG. 13I.

With reference to signing cases in operation 920, a user may capture a signature relating to a case. Signatures may be captured using any known method, and may include any type of signature typically associated with a business process, for example a handwritten signature, an electronic signature, a digital signature, etc. as would be understood by one having ordinary skill in the art upon reading the present descriptions. In preferred embodiments, a user may capture a signature using a capture signature user interface, such as will be described according to one embodiment with reference to FIG. 13J, below. Of course other methods of capturing signatures are within the scope of the present disclosures.

With reference to submitting cases in operation 922, a user may review, delete, and or submit a case, e.g. to a central server or other host. Case submission may be advantageous because a user may subsequently delete the case from the mobile device, freeing memory for other sues, may request a peer-review process be performed for the submitted case, may forward or escalate a case to facilitate further processing thereof, etc. as would be understood by one having ordinary skill in the art upon reading the present descriptions. Moreover, case submission allows such actions to be taken remotely, obviating the need to physically travel to a submission location, as well as reducing the amount of resources and time needed to complete processing of a particular case. In preferred embodiments, a user may submit a case by using a submit case user interface such as described in further detail below with reference to FIG. 13K.

User Interfaces for Mobile Image Capture and Processing

The following descriptions will set forth exemplary, non-limiting embodiments of user interfaces suitable for performing one or more of the functionalities described above with particular reference to FIG. 9. Of course, additional, alternative, and/or equivalent interfaces may be employed in other embodiments without departing from the scope of the present disclosures.

The user interfaces described below may be employed in any environment, and may be used to facilitate performing any functionality described herein, including those described above with reference to FIGS. 1-9, in various approaches.

In one embodiment, a method 2500 for providing a mobile image capture and processing user interface may include a plurality of operations such as described below. Furthermore, method 2500 may be performed in any suitable environment, including those described herein and/or represented in the various Figures presented herewith.

Moreover, as will be appreciated by one having ordinary skill in the art upon reading the present descriptions, method 2500 may include performing any combination of image processing operations as described with reference to the myriad Figures submitted herewith, in various approaches. Of course other functionalities equivalent to those described herein may also be facilitated or performed by using one or more aspects of the user interfaces presently disclosed, as would be appreciated by one having ordinary skill in the art upon reading the present descriptions.

Figure 25:
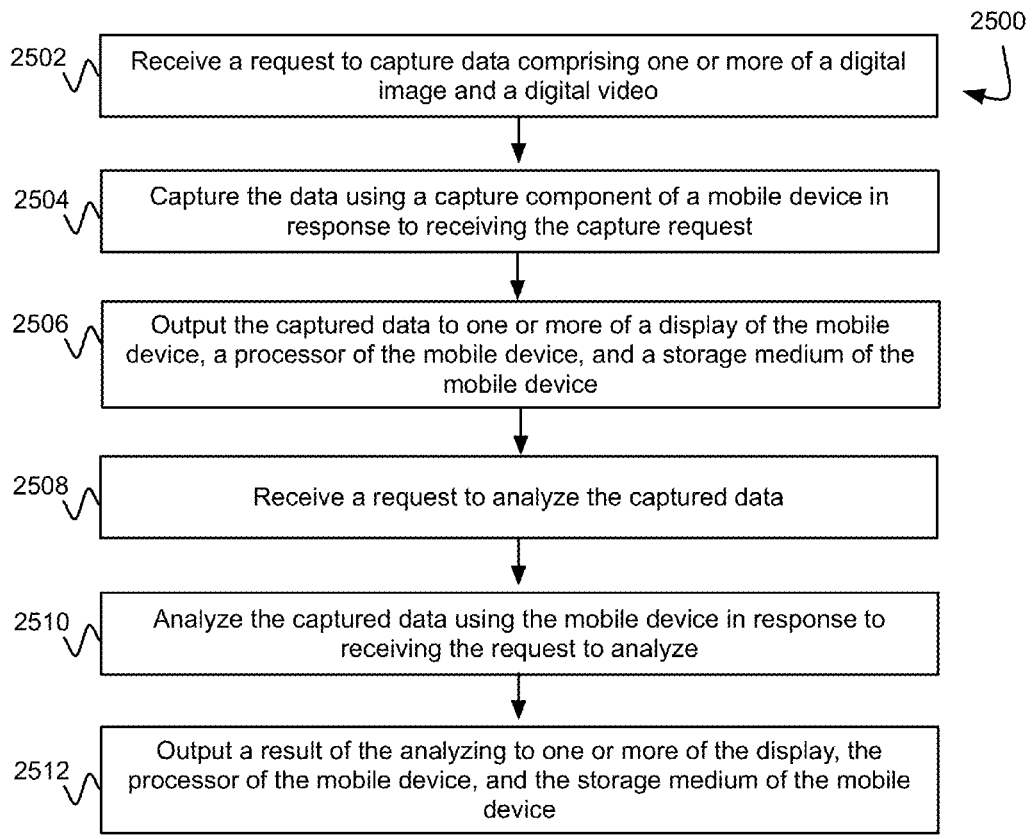
FIG. 25 is a flowchart of a method for providing image processing application functionality, according to one embodiment.
Figure 26:
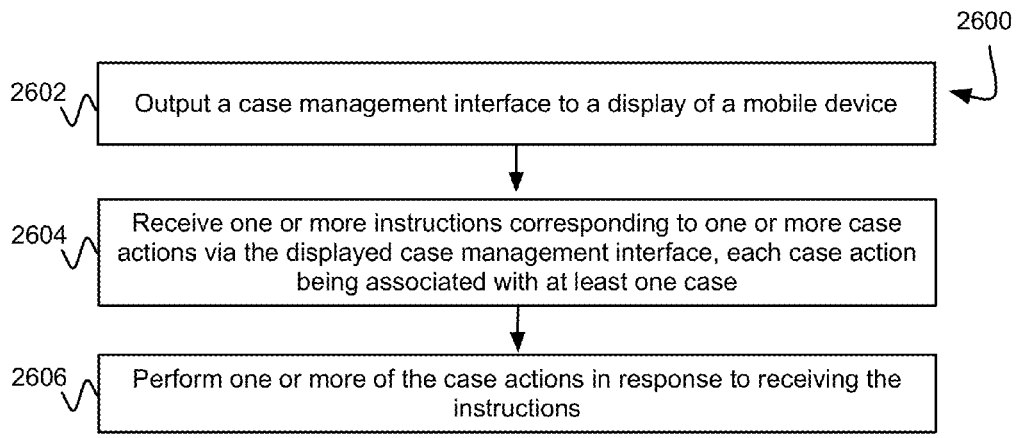
FIG. 26 is a flowchart of a method for providing case management application functionality, according to one embodiment.

Referring now to FIGS. 25-27, two methods for providing user interface functionalities will be described according to several illustrative embodiments. Upon reading the present disclosures, the skilled artisan will appreciate that the scope of the inventive embodiments represented herein are not limited to the methods presented in FIGS. 25-27.

In one embodiment, particularly as shown in FIG. 25, a method 2500 for providing a mobile image capture and processing user interface may include a plurality of operations such as described herein. Furthermore, method 2500 may be performed in any suitable environment, including those described herein and/or represented in the various Figures presented herewith.

Moreover, as will be appreciated by one having ordinary skill in the art upon reading the present descriptions, method 2500 may be performed in any suitable environment, such as any described herein and/or represented in the various Figures presented herewith, among others, without departing from the scope of the present disclosures, according to various embodiments.

In one embodiment, and particularly as shown in FIG. 25, method 2500 includes operation 2502, where a request to capture data is received. As understood herein, capture data may include one or more of a digital image and a digital video.

In another embodiment, method 2500 includes operation 2504, where data is captured using a capture component of a mobile device in response to receiving the capture request. Notably, in some approaches one or more image processing operations may be performed upon capturing the data, such as page detection, illumination correction, or other functions described herein. Thus, the captured data may be the raw image or video, a processed version of the raw image or video, some portion of the initial or processed image or video such as an image of a detected document extracted therefrom, etc. as would be appreciated by one having ordinary skill in the art upon reading the present descriptions.

In yet another embodiment, method 2500 includes operation 2506, where the captured data is output to one or more of a display of the mobile device, a processor of the mobile device, and a storage medium of the mobile device; e.g. to a mobile device display, a mobile device processor and/or memory; a server processor and/or memory, etc. as would be appreciated by one having ordinary skill in the art upon reading the present descriptions.

In still yet another embodiment, method 2500 includes operation 2508, where a request to analyze the captured data is received, e.g. via the mobile device.

In one approach, method 2500 includes operation 2510, where, in response to receiving the request to analyze the captured data, the captured data is analyzed using the mobile device. For example, analyzing the captured data using the mobile device may include processing the captured data using a mobile device processor according to one or more instructions corresponding to, for example, image processing operations as discussed herein.

In still more embodiments of method 2500, the captured data may correspond to a digital representation of a document, e.g., a digital image of a document, and analyzing the data such as in operation 2510 may include comparing one or more characteristics of the digital representation of the document to one or more quality control (QC) metrics (e.g. comparing a characteristic value to a QC threshold); determining whether each characteristic is acceptable based on the comparison and, for each characteristic: outputting an indication that the characteristic is acceptable upon determining the characteristic is acceptable, outputting an indication that the characteristic is not acceptable upon determining the characteristic is not acceptable, and outputting an indication that the digital representation of the document is acceptable upon determining that each characteristic is acceptable.

Moreover, the one or more quality control metrics may include one or more of: a page detection metric (e.g. whether a page detection operation was successful and/or produced a sufficiently reliable result such as indicated by one or more checks described above with reference to FIG. 19, an illumination metric, e.g. whether one or more illumination problems exist such as described above with reference to FIG. 21-22; and a blur metric, e.g. whether one or more blurred regions exist in the digital image, such as described above with reference to FIG. 25.

In some approaches, method 2500 may further include displaying, via a display of the mobile device, the indication that the characteristic is not acceptable; receiving instructions to recapture data in response to the displaying. Notably, as understood herein "recapture data" does not mean to capture the same data as originally captured, but rather to capture data again, the data corresponding to the digital representation of the document, for example taking a new picture, video, etc. of the target document to attempt processing using the new picture, video, etc. Method 2500 may thus include recapturing the data in response to receiving the instructions; and outputting the recaptured data, in various embodiments.

Additionally and/or alternatively, after displaying the indication that the characteristic is not acceptable, method 2500 may proceed by receiving instructions to enhance the captured data in response to the displaying; enhancing the captured data in response to receiving the instructions without recapturing the data; e.g. correcting blur, illumination, skew, performing page detection with different settings (smaller step, different path, modified threshold values, etc. as consistent with the descriptions provided herein and would be understood by a skilled artisan reviewing these disclosures) and outputting the enhanced data.

In one implementation, method 2500 includes operation 2512, where a result of the analyzing is output to one or more of the display of the mobile device, the processor of the mobile device, and the storage medium of the mobile device.

In various embodiments, method 2500 includes may include additional and/or alternative operations for providing an image processing application functionality.

For example, in one embodiment method 2500 may additionally and/or alternatively include: receiving a request to modify one or more capture data parameters; and modifying the one or more capture data parameters in response to the request. Moreover, the one or more capture data parameters may include one or more of: a flash setting (e.g. on, off, auto); a capture stability assistance setting; e.g. outputting instructions to hold camera over document, warning that camera is moving, instructions to hold camera still, etc. a capture alignment assistance setting; e.g. gridlines ON/OFF, number of gridlines in each direction (horizontal, vertical), grid dimensions, etc. a zoom level; a capture color mode; e.g. black/white, color, RGB, CMYK, greyscale, etc. a capture data destination; e.g. processor, memory, etc. as would be appreciated by one having ordinary skill in the art upon reading the present descriptions.

In still yet more embodiments, the captured data may correspond to a digital representation of a document; and method 2500 may additionally and/or alternatively include one or more of: outputting the digital representation of the document to a display of the mobile device; and receiving user input corresponding to instructions to modify the digital representation of the document. For example, user input corresponding to instructions to modify the digital representation of the document may include manual manipulation by the user—crop, rotate, zoom, brightness, contrast, sharpness, color, tint, document boundaries, etc. as would be understood by one having ordinary skill in the art upon reading the present descriptions. Moreover, user input corresponding to instructions to modify the digital representation of the document may include instructions to perform one or more automated operations to modify the digital representation of the document, such as any of the image processing operations described herein.

In additional and/or alternative approaches, method 2500 may also include: receiving metadata corresponding to the captured data; and associating the metadata with the captured data. As will be appreciated by one having ordinary skill in the art, metadata may include any type of metadata known in the art, and may be associated with the captured data by any suitable means. In one particular approach the metadata correspond to one or more of: alphanumeric characters, symbols, signatures, e.g. handwritten, electronic, digital, etc.; and pointers, e.g. file pointers, hash/array references, etc.

In more approaches to method 2500, capturing the data may include reading the data from a storage medium of the mobile device, for example reading an attachment.

In still yet more approaches to method 2500, the captured data may correspond to a digital representation of a document, and method 2500 may further include: correcting one or more artifacts in the captured data by rectangularizing the digital representation of the document. As understood herein, artifacts include any characteristic that may be imparted on an image by virtue of being captured using a camera as opposed to a flat-bed scanner, such as a distortion of one or more portions of the digital representation of the document (e.g. document edge appears curved in image but is truly straight, fishbowl-type effects, projective effects arising from capture perspective, etc.), and a skew angle of the digital representation of the document.

Referring now to FIG. 26, a method 2600 for providing a case management user interface is shown, according to one embodiment. As will be appreciated by one having ordinary skill in the art upon reading the present descriptions, method 2600 may be performed in any suitable environment, such as any described herein and/or represented in the various Figures presented herewith. Moreover, case management user interface provided according to method 2600 may be used in conjunction with any of the image processing operations and/or interfaces described herein without departing from the scope of the present disclosures.

In one embodiment, method 2600 includes operation 2602, where a case management interface is outputted to a display of a mobile device.

In one embodiment, method 2600 includes operation 2604, where one or more instructions corresponding to one or more case actions are received via the displayed case management interface, each case action being associated with at least one case. In various approaches, case actions may include one or more of creating a new case; opening an existing case; deleting one or more of the existing cases; designating a case type; capturing case information; capturing data corresponding to a digital representation of a document the data comprising either image data or video data; outputting the captured data to the display of the mobile device; associating the captured data with one or more of the new case and the existing case; dissociating the captured data from one or more of the new case and the existing case; processing the captured data; outputting the processed data to the display of the mobile device; receiving user input via the display of the mobile device; and submitting one or more of the new case and the existing case to a remote server. printing one or more documents related to one or more of the new case and the existing case; associating the case information with one or more of the new case and the existing case; capturing a signature; detecting the digital representation of the document; and associating the signature with one or more of the new case and the existing case.

Moreover, printing one or more documents related to one or more cases may include submitting a print request from the mobile device to a remote resource, the remote resource and the mobile device not being in communication via a local network, i.e. connected to two separate LANs, WANs, WLANs, separately connected to a cell network and a local network, etc.; and printing the one or more documents at the remote location using the remote resource in response to the print request.

In one embodiment, method 2600 includes operation 2606, where the one or more case actions are performed in response to receiving the instructions.

In various embodiments, method 2600 may include one or more additional and/or alternative operations, such as described below with continuing reference to FIG. 26. For example, in one embodiment, method 2600 may also include outputting a data capture interface to the display of the mobile device for capturing an image comprising a digital representation of a document; receiving a request from a user to capture the image via the data capture interface; capturing the image in response to receiving the request, the capturing being performed using a capture component of the mobile device; and associating the captured image with one or more cases.

In some approaches commensurate with method 2600, capturing may include one or more of receiving user input via the display of the mobile device; capturing data using a capture component of the mobile device in response to the user input and reading the data from a computer-readable storage medium of the mobile device in response to the user input.

In more approaches, user input may correspond to metadata related to the case, such as alphanumeric characters, symbols, signatures; e.g. handwritten, electronic, digital, etc. and pointers. e.g. file pointers, hash/array references, etc. as would be understood by one having ordinary skill in the art upon reading the present descriptions. In such approaches, method 2600 may further include associating the metadata with one or more of the new case and the existing case, Various approaches to implementing method 2600 may further and/or optionally include displaying a plurality of potential case types on the display of the user device; receiving user input via the display of the mobile device, the user input indicating one of the plurality of the potential case types is a desired case type; and designating the case type as the desired case type. Moreover, the potential case types may be inclusive of: an insurance claim; a loan application; a proof of delivery; an undefined case type; a new account opening; an educational program application; a medical record; an expense management; an accident report; and a user-defined case type.

Of course, similar to the principles set forth above with reference to FIG. 26 and method 2600, method 2600 may also be utilized in any combination with any other methodology and in any environment described herein, as well as equivalents thereof that would be appreciated by one having ordinary skill in the art upon reading the present descriptions.

For example, in one embodiment method 2600 may be utilized in conjunction with any of the image processing operations discussed with reference to FIGS. 1-9 and 19-25, above. Exemplary operations suitable for use with method 2600 and/or the corresponding case management interface provided thereby include page detection, page rectangularization, illumination problem detection and/or correction, resolution estimation, blur detection, etc. as would be understood by one having ordinary skill in the art upon reading the present descriptions.

In yet another embodiment, method 2600 may additionally and/or alternatively include outputting an authentication interface to a display of the mobile device; receiving authentication data via the authentication interface; receiving an authentication request; determining whether the authentication data is valid in response to receiving the authentication request; granting access to one or more secure case actions, where any case action could be a secure case action in a particular context, upon determining the authentication data is valid; and denying access to the secure case actions upon determining the authentication data is not valid.

In another embodiment, method 2600 may also include: correcting one or more artifacts in the image by rectangularizing the digital representation of the document.

As described herein, artifacts may include any characteristic that may be imparted on an image by virtue of being captured using a camera as opposed to a flat-bed scanner. For example, artifacts may include one or more of: a distortion of one or more portions of the digital representation of the document, (e.g. document edge appears curved in image but is truly straight, fishbowl-type effects, projective effects arising from capture perspective, etc.) and a skew angle of the digital representation of the document. Of course other artifacts as would be known to skilled artisans upon reading the present descriptions are also within the scope of these disclosures.

Users may interact with the various components of each user interface using any known methods of interaction, including tapping one or more regions on a mobile device display, performing one or more gestures (e.g. swiping, pinching, spreading, scrolling, panning, etc.), each using one or more points of contact, etc. as would be understood by one having ordinary skill in the art upon reading the present descriptions.

Referring now to FIGS. 10A-18B, various schematics of mobile application user interfaces commensurate in scope with present disclosures will be described according to several illustrative embodiments. The scope of the inventive embodiments represented herein are not limited to the features and embodiments presented in FIGS. 10A-18B, but rather include all equivalents thereof as would be known to one having ordinary skill in the art upon reading the present disclosures.

Furthermore, a skilled artisan reading the instant descriptions will appreciate that various embodiments of the user interfaces depicted in FIGS. 10A-18B may be utilized to facilitate and/or perform any operation of the algorithmic processes described herein, including those represented in FIGS. 1-9 and 26-26, among others.

With particular reference to FIG. 10A, a schematic representation of a user authentication interface 1000 of an application for capturing and/or processing a digital image comprising a digital representation of a document is shown, according to one embodiment.

In some approaches, a user authentication interface 1000 may include a plurality of objects, including one or more data entry fields 1002, interactive buttons and/or and toggle switches 1004, 1006. Preferably, the user authentication interface also includes a title bar 1008 describing the presently displayed interface to the user.

As will be appreciated by one having ordinary skill in the art, upon interacting with a data entry field 1002, e.g. by tapping a region of the mobile device displaying the data entry field 1002, a user may enter data into the data entry field 1002 using any known method. For example, upon interacting with a data entry field 1002, the user may be presented with an input interface such as a QWERTY-layout keyboard represented on the display of the mobile device. Additionally and/or alternatively a user may select one of a predetermined set of data entries from a drop-down list, which may or may not be created and/or supplemented from data previously entered by the user and/or default entries, in one embodiment. In particularly preferred embodiments, a user may enter one or more of a user ID and a password in the data entry fields 1002 of the user authentication interface 1000.

As will also be understood by one having ordinary skill in the art reading the present descriptions, in more embodiments the user may interact with interactive buttons 1004, 1006 using any known methodology, e.g. tapping, swiping, gesturing, etc. With particular reference to user authentication interface 1000, upon interacting with an interactive button 1004, 1006, the mobile application may take an action, such as saving a user ID, attempting to log a user in to a user account using the authentication information provided in data fields 1002, provide information about the mobile application, and/or cancel an authentication attempt.

FIG. 10B is a schematic representation of a host connection user interface 1010 of an application for capturing and/or processing a digital image comprising a digital representation of a document, according to one embodiment. As shown in FIG. 10B, host connection user interface includes a plurality of data entry fields 1014 and interactive buttons 1012. Data entry fields may operate in a manner substantially similar to that described above regarding FIG. 10A, and in the host connection user interface 1010 may preferably relate to one or more of a user ID, a password, and one or more host device URLs. Similarly, interactive buttons 1012 may operate in a manner substantially similar to that described above regarding FIG. 10A, and in the host connection user interface 1010 may preferably assist a user in navigating back to the user authentication interface 1000 and/or a settings interface as described in detail below with reference to FIGS. 17A-B. Optionally, one or more of the interactive buttons 1012 may initiate an authentication attempt using the authentication information provided in data fields 1014.

Figure 11:
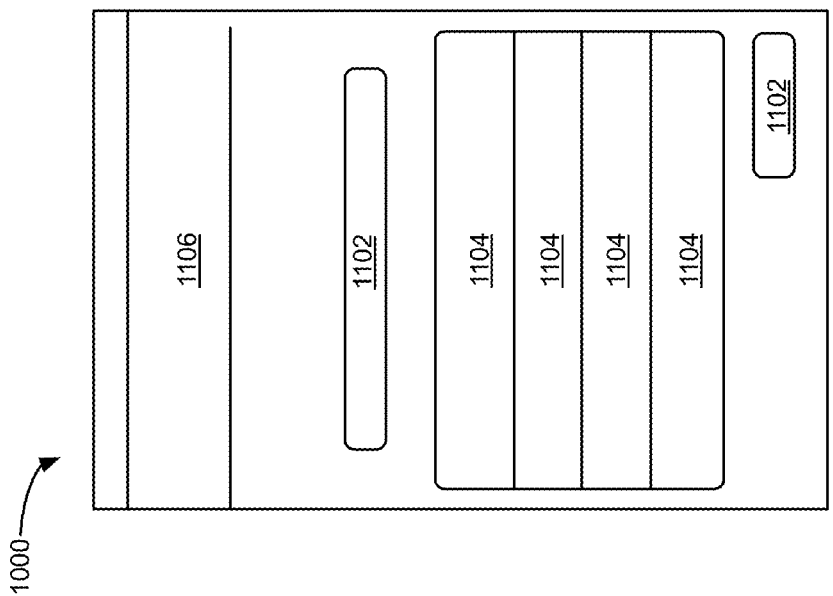
FIG. 11 is a schematic representation of a case creation user interface of an application for capturing and/or processing a digital image comprising a digital representation of a document, according to one embodiment.

FIG. 11 is a schematic representation of a case creation user interface 1100 of an application for capturing and/or processing a digital image comprising a digital representation of a document, according to one embodiment. As shown in FIG. 11, case creation user interface 1100 includes a title region 1106 that may display indicia that the user is interacting with a case creation user interface, and may additionally and/or alternatively display information identifying an authenticated user account associated with one or more cases. For example, user authentication information may include a username entered in an authentication interface 1000 or 1010, as discussed above regarding FIGS. 10A and/or 10B, in some embodiments.

In various approaches, case creation user interface 1100 may further include a plurality of interactive buttons 1102 for facilitating one or more case creation actions by the user. For example, case creation actions may include one or more of opening a new case, opening a pending case, and retrieving information about a selected case. Moreover, case creation user interface 1100 may include a plurality of fields 1104 arranged in a list format, each field displaying information relating to one or more existing cases and displaying relevant case information to assist a user in identifying the case. For example, fields 1104 may display information such as a case type, a case number, a case opening date, a name of an individual associated with the case, etc. as would be understood by one having ordinary skill in the art upon reading the present descriptions. In preferred embodiments, cases having information displayed in one of the plurality of fields 1104 may be characterized as "pending" cases, i.e. cases that were previously opened but not yet submitted to a host device.

In one embodiment, upon a user interacting with an interactive button 1102 designed to facilitate opening a new case, the user may be presented with a list of case types from which the user is prompted to select an appropriate case type to associate with the newly opened case. Upon selecting a case type, the new case may have associated therewith one or more case-type-specific properties, such as a document page size, a number of pages, a color mode (e.g. black and white, greyscale, color, auto, etc.) and/or be provided an interface for associating one or more attachments (e.g. electronic documents) with the case.

Moreover, upon opening a new case and/or an existing case by interacting with one or more of the interactive buttons 1102 and/or fields 1104, the mobile application displaying the case creation interface may optionally synchronize case data with information stored on a host, e.g. a central server. However, if the mobile device is not in connection with the host, or is unable to establish or authenticate a secure session with the host, the mobile application may utilize locally cached data relating to the case. Synchronization and local data caching may be performed using any known methodology, in various approaches.

Figure 12:
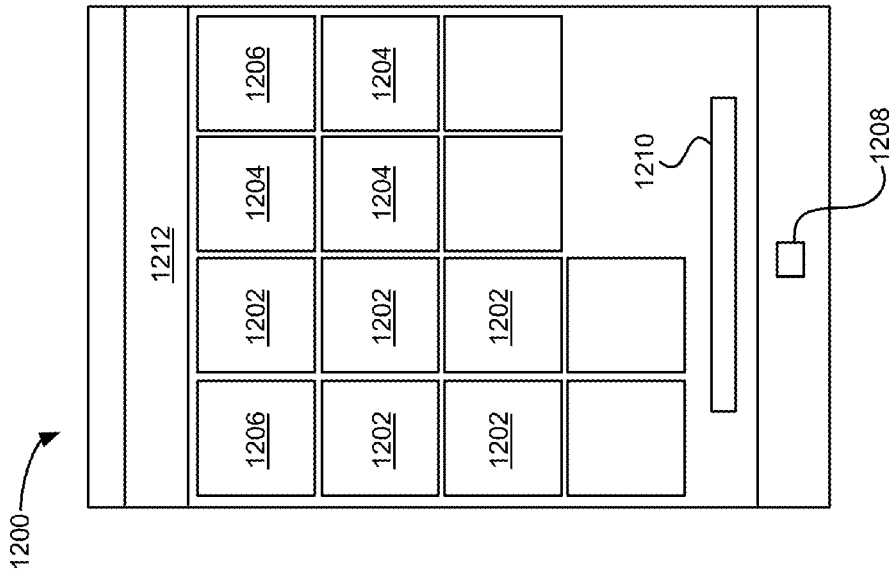
FIG. 12 is a schematic representation of a case object management user interface of an application for capturing and/or processing a digital image comprising a digital representation of a document, according to one embodiment.

Upon opening a new case or selecting an existing case, in several embodiments a user may be directed to a case object management user interface such as case object management user interface 1200 substantially as shown in FIG. 12. In one embodiment, case object management user interface 1200 may display one or more case objects 1202-1206, which may or may not be associated with the case. In embodiments where case objects 1202-1206 are not associated with the case, the case objects 1202-1206 may be files stored on a storage medium integrated into or coupled to the mobile device, e.g. a storage medium of the mobile device, the host device, or a storage medium otherwise coupled to the mobile device. Further, in embodiments where one or more case objects 1202-1206 are not associated with the case, case object management user interface may facilitate a user associating one or more of the case objects 1202-1206 with the open case. In further embodiments, case object management user interface 1200 may facilitate a user associating data stored on a storage medium of the mobile device, the host, etc. but not displayed in the case object management user interface by providing an interactive button 1208 configured to assist the user in navigating to a display (not shown) depicting the data stored on the storage medium. As will be appreciated by one having ordinary skill in the art reading the present descriptions, such a display may be native to the mobile device operating system, the host operating system, etc.

As understood herein, case objects may include one or more of digital image(s), digital video(s), audio, etc. as would be understood by one having ordinary skill in the art upon reading the present descriptions. Moreover, in one embodiment case object management user interface 1200 may further include a summary 1210 displaying a number of case objects 1202-1206 and/or case object types associated with the case. For example, if a case has associated therewith five images 1202, three videos 1204, and two audio clips 1206 (as shown in FIG. 12), then summary 1210 may display information communicating these data to the user, e.g. "5 images, 3 videos, 1 audio."

In some approaches, and similar to the interfaces discussed above, an exemplary case object management user interface 1200 may include a title region 1212 that may display indicia that the user is interacting with a case object management user interface, and may additionally and/or alternatively display information relating to the case with which the one or more case objects 1202-1206 are associated.

Users may preferably interact with one or more case objects 1202-1206 in order to facilitate performing one or more case management actions relating to or on the case objects 1202-1206. For example, a user may select one or more case objects 1202-1206 by tapping on a region of the mobile device display rendering the case object(s) 1202-1206. Upon selecting one or more case objects 1202-1206, the rendered representation of the selected case object(s) 1202-1206 may be modified to provide indicia that the case object(s) 1202-1206 have been selected, e.g. by overlaying a display such as a mark 1302 as depicted in the selected object management user interface 1300 shown in FIG. 13A, according to one embodiment.

In another embodiment, upon selecting one or more case object(s) 1202-1206, case object management user interface 1200 may display additional information not described above regarding FIG. 12, such as displaying the mark(s) 1302 and/or displaying a total number of selected case objects 1202-1206, e.g. in a title region 1304 as depicted in FIG. 13A.

Moreover, selected object management user interface may display one or more interactive buttons 1306 which facilitate performing one or more case actions on selected case objects 1202-1206. For example, interactive buttons 1306 may facilitate performing a processing algorithm on one or more selected case objects 1202-1206. In preferred embodiments, the processing algorithm may include one or more functions substantially as described above, and particularly as described above regarding FIGS. 3-9. Processing may be performed using a processor of the mobile device in a background process, a foreground process, etc., or may alternatively be performed using a processor of a host device.

In additional approaches, case actions may further include deleting the one or more selected case objects 1202-1206, for example by selecting the one or more case objects 1202-1206 and subsequently interacting with a delete button, which may be one of the interactive buttons 1306. Case actions may further include any of the operations discussed herein and particularly with reference to FIGS. 3-9, and in various embodiments the selected case object management interface 1300 may facilitate performing one or more of such case actions upon a user double-tapping a case object 1202-1206, whereupon the selected case object management interface 1300 may direct a user to a list of case actions capable of being performed in relation to the double-tapped case object 1202-1206.

In an exemplary approach, a user may be assisted in performing case actions upon double-tapping case object 1202-1206 via a case management action user interface 1310 such as shown in FIG. 13B. In the embodiment depicted in FIG. 13B, case management action user interface 1310 includes a plurality of interactive buttons 1312 configured to facilitate performing one or more case actions on a selected case object 1202-1206 or generally for the case currently open. In addition, case management action user interface 1310 may include a title region 1314 configured to display indicia that the user is currently interacting with case management action user interface 1310, and/or information relating to the case currently open.

As described above, case actions may include any operation discussed herein, and may preferably include one or more operations discussed above with reference to FIGS. 3-9, such as capturing an image, a video, audio, etc. relating to the case, entering information relating to the case, signing the case, submitting the case, modifying the case type, deleting the case, etc. Moreover, in particularly preferred embodiments interacting with one of the interactive buttons 1312 may direct a user to a corresponding user interface such as described below.

FIG. 13C is a schematic representation of a delete object user interface 1320 of an application for capturing and/or processing a digital image comprising a digital representation of a document, according to one embodiment. In embodiments where one of the interactive buttons 1312 displayed in case management action user interface 1310 facilitates performing a delete object case action, upon a user interacting with the interactive button 1312 corresponding to the delete object case action, a user may be directed to a delete object user interface 1320 such as displayed in FIG. 13C.

In one embodiment, delete object user interface 1320 may include a plurality of interactive buttons 1322 and a title region 1324. Interactive buttons 1322 may facilitate one or more case actions such as deleting a case object 1202-1206 associated with a case, deleting an entire case, and/or navigating between delete object user interface 1320 and any other user interface described herein. Title region 1324 may display indicia that a user is being presented a delete object user interface 1320, information about the case, etc. as would be understood by one having ordinary skill in the art upon reading the present descriptions.

FIG. 13D is a schematic representation of an edit object user interface 1330 of an application for capturing and/or processing a digital image comprising a digital representation of a document, according to one embodiment. In embodiments where one of the interactive buttons 1312 displayed in case management action user interface 1310 facilitates performing an edit object case action, upon a user interacting with the interactive button 1312 corresponding to the edit object case action, a user may be directed to an edit object user interface 1330 such as displayed in FIG. 13D.

In one embodiment, edit object user interface 1330 may include a plurality of interactive buttons 1332 and an action button 1334, as well a title region 1336. Interactive buttons 1332 may facilitate one or more case actions such as saving a case object 1202-1206 associated with a case, undoing one or more edits performed on the case object 1202-1206 and/or navigating between edit object user interface 1330 and any other user interface described herein. Action button 1334 may particularly facilitate performing one or more edit actions on the case object 1202-1206 by enabling a user to interact with the case object 1202-1206 using one or more edit object action tools, such as a crop tool, a constrain tool, etc. such as described herein with reference to FIGS. 13E and 13F, and as would be understood by one having ordinary skill in the art upon reading the present descriptions.

Moreover, title region 1336 may display indicia that a user is being presented an edit object user interface 1330, information about the case, etc. as would be understood by one having ordinary skill in the art upon reading the present descriptions.

Figure 13F:
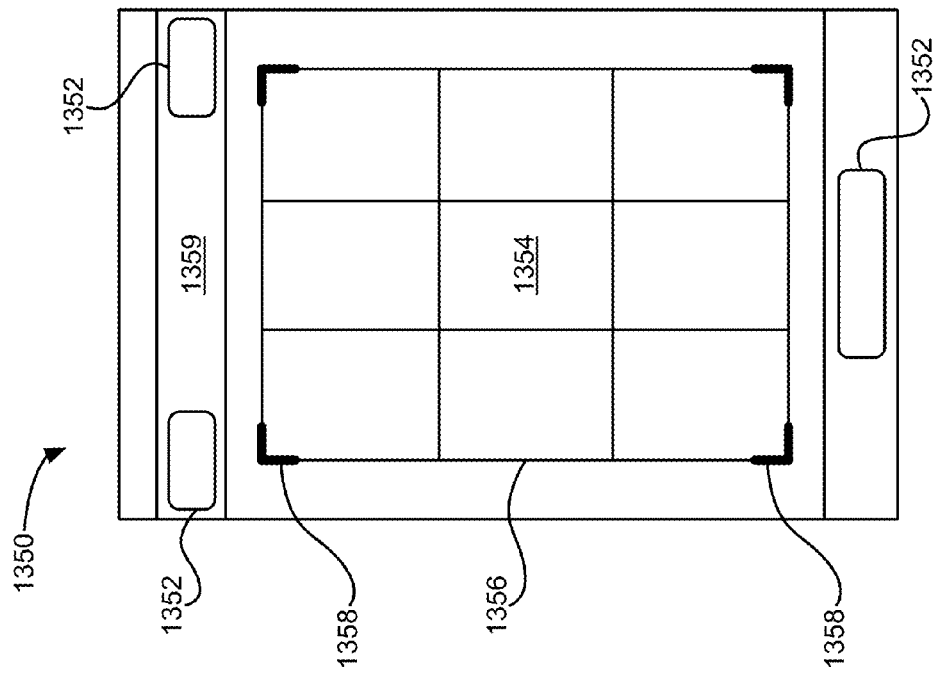
FIG. 13F is a schematic representation of a crop object user interface of an application for capturing and/or processing a digital image comprising a digital representation of a document, according to one embodiment.
Figure 13E:
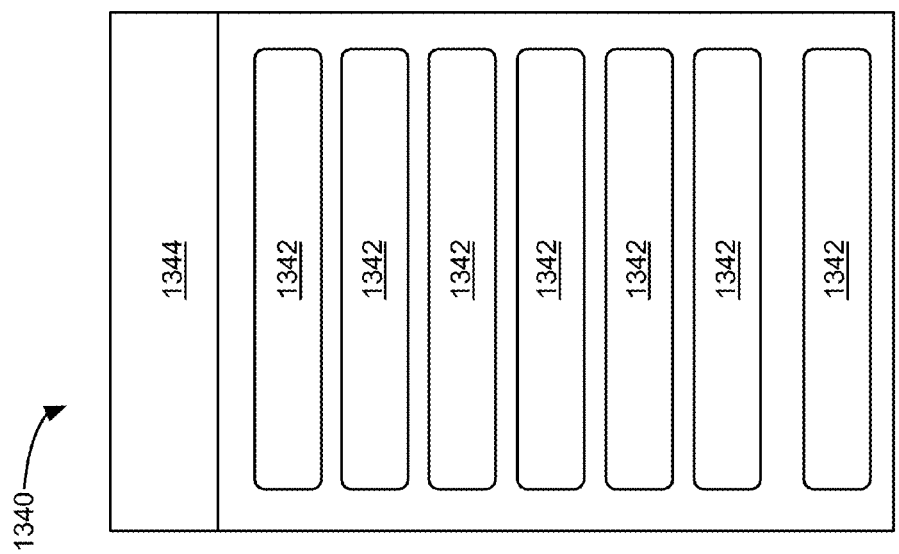
FIG. 13E is a schematic representation of an edit object action user interface of an application for capturing and/or processing a digital image comprising a digital representation of a document, according to one embodiment.

FIG. 13E is a schematic representation of an edit object action user interface 1340 of an application for capturing and/or processing a digital image comprising a digital representation of a document, according to one embodiment. In the exemplary embodiment depicted in FIG. 13E, edit object action user interface 1340 includes a plurality of interactive buttons 1342 and a title region 1344. Title region 1344 may display indicia that a user is being presented an edit object action user interface 1340, information about the case, etc. as would be understood by one having ordinary skill in the art upon reading the present descriptions.

In several approaches, interactive buttons 1342 may facilitate one or more case actions such as saving a case object 1202-1206 associated with a case, undoing one or more edits performed on the case object 1202-1206 and/or navigating between edit object user interface 1340 and any other user interface described herein. Interactive buttons 1342 may particularly facilitate performing one or more edit actions on the case object 1202-1206 by enabling a user to manually interact with the case object 1202-1206 using one or more edit object action tools, such as a crop tool, a constrain tool, a brightness tool, a sharpness tool, a contrast tool, a tint tool, etc.

In additional embodiments, interactive buttons 1342 may facilitate performing one or more algorithmic operations as described herein on a case object 1202-1206. For example, a user may interact with one or more interactive buttons 1342 to initiate an illumination enhancement process, a blur detection process, a page detection process, a page transformation (e.g. rectangularization) process, a deskew process, a recapture process, etc. as would be understood by one having ordinary skill in the art upon reading the present descriptions.

FIG. 13F is a schematic representation of a crop object user interface 1350 of an application for capturing and/or processing a digital image comprising a digital representation of a document, according to one embodiment. As shown in FIG. 13F, crop object user interface 1350 includes a title region 1359, a plurality of interactive buttons 1352, a digital representation of a document 1354, a crop tool comprising a window characterized by one or more edges 1356 and a plurality of corners 1358. At any point, and preferably by interacting with one or more of the interactive buttons 1352, a user may cancel the crop operation and navigate to another of the user interfaces described herein, may save the results of the crop operation, or may reset the window to a predetermined default location. In some approaches, one of the interactive buttons 1352 may facilitate a user interacting with a constrain tool such as will be described below with reference to FIG. 13G.

Title region 1359 may display indicia that a user is being presented an edit object action user interface 1350, information about the case, etc. as would be understood by one having ordinary skill in the art upon reading the present descriptions.

In preferred embodiments, a user may interact with one or more of the edges 1356 and/or corners 1358 in order to adjust boundaries of the window as desired, e.g. to include only the digital representation of the document 1354 and a minimal portion of the background of the image comprising the digital representation of the document 1354.

Figures 13G, 13H:
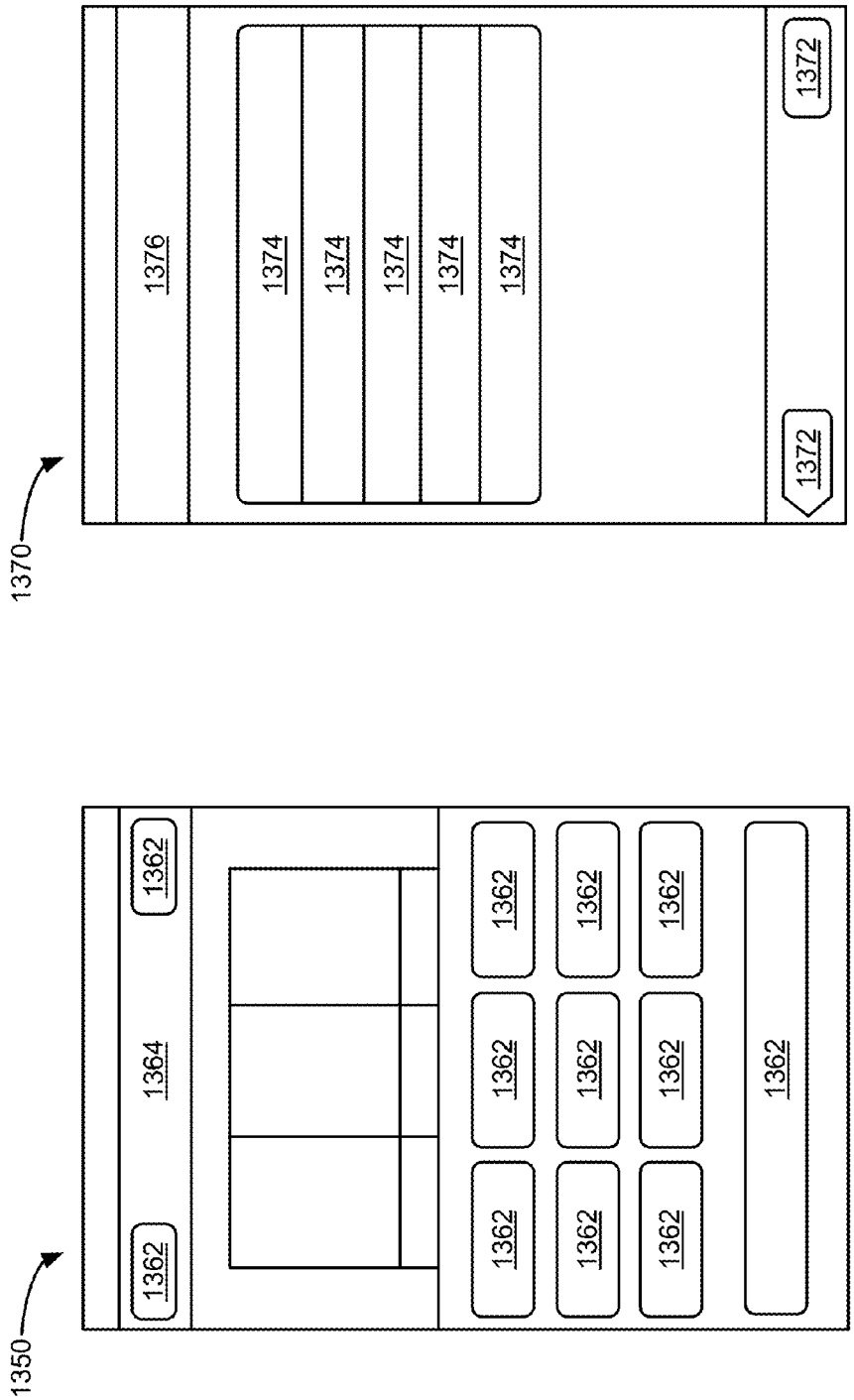
FIG. 13G is a schematic representation of a constrain object user interface of an application for capturing and/or processing a digital image comprising a digital representation of a document, according to one embodiment.
FIG. 13H is a schematic representation of a case type management user interface of an application for capturing and/or processing a digital image comprising a digital representation of a document, according to one embodiment.

FIG. 13G is a schematic representation of a constrain object user interface 1360 of an application for capturing and/or processing a digital image comprising a digital representation of a document, according to one embodiment. As shown in FIG. 13G, constrain object user interface 1360 includes a title region 1364, a plurality of interactive buttons 1362, and digital representation of a document 1354. In some approaches, a user may be presented with constrain object user interface 1360 upon interacting with one of the interactive buttons 1352 of crop object user interface 1350, said button being configured to facilitate the user interacting with the constrain object user interface 1360.

In one embodiment, each of the plurality of interactive buttons 1362 may correspond to a known document size, such as an 8.5"×11" letter, an 8.5"×14" legal document, an A3-size document, an A4-size document, an A5-size document, a ledger, a business card, a personal check, etc. as would be understood by one having ordinary skill in the art upon reading the present descriptions. Of course, interactive buttons 1362 may also correspond to other known document sizes, as would be appreciated by one having ordinary skill in the art upon reading the present descriptions. Further still, interactive buttons 1362 may also facilitate a user navigating between constrain object user interface 1360 and any other user interface described herein, as well as cancel/undo a constrain operation such as described below.

In preferred embodiments, upon a user interacting with one of the interactive buttons 1362, a size and aspect ratio of the window (comprising edges 1356 and corners 1358) may be set to a known aspect ratio and size corresponding to the type of document represented by the interactive button 1362 with which the user interacted. The user may then adjust the location of the window to encompass the digital representation of the document 1354, in one approach.

Title region 1364 may display indicia that a user is being presented an edit object action user interface 1360, information about the case, etc. as would be understood by one having ordinary skill in the art upon reading the present descriptions.

FIG. 13H is a schematic representation of a case type management user interface 1370 of an application for capturing and/or processing a digital image comprising a digital representation of a document, according to one embodiment. As shown in FIG. 13H, case type management user interface 1370 includes one or more interactive buttons 1372, one or more fields 1374, and a title region 1376.

In one embodiment, interactive buttons 1372 may facilitate a user navigating between case type management user interface 1370 and any other user interface described herein, as well as cancel/undo a case type management operation.

In preferred embodiments, a user interacting with case type management interface 1370 may set and/or change a case type associated with an open case by interacting with one of the fields 1374, each field preferably corresponding to a particular case type with which case type-specific data may be associated, e.g. one or more document types, sizes, aspect ratios, case information such as a customer name, a date, a location, a loan number, etc. as would be understood by one having ordinary skill in the art upon reading the present descriptions.

Title region 1376 may display indicia that a user is being presented an edit object action user interface 1370, information about the case, etc. as would be understood by one having ordinary skill in the art upon reading the present descriptions.

Figure 13J:
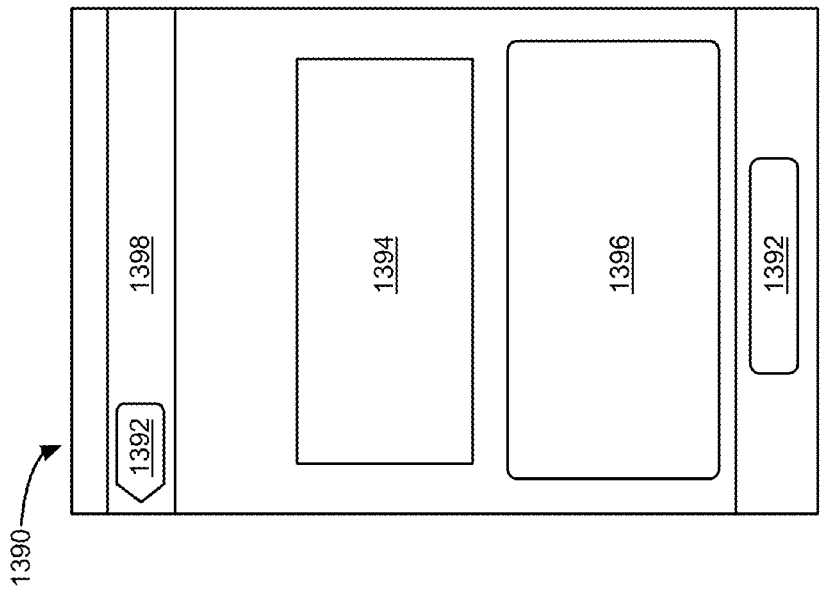
FIG. 13J is a schematic representation of a capture signature user interface of an application for capturing and/or processing a digital image comprising a digital representation of a document, according to one embodiment.
Figure 13I:
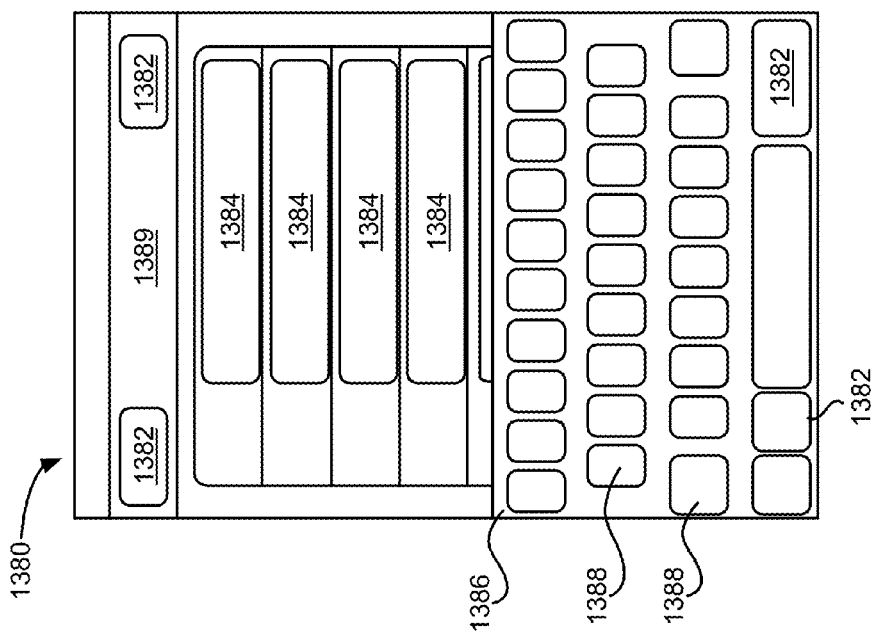
FIG. 13I is a schematic representation of an enter case data user interface of an application for capturing and/or processing a digital image comprising a digital representation of a document, according to one embodiment.

FIG. 13I is a schematic representation of an enter case data user interface 1380 of an application for capturing and/or processing a digital image comprising a digital representation of a document, according to one embodiment. As shown in FIG. 13I, enter case data user interface includes a title region 1389, a plurality of interactive buttons 1382, a plurality of case data fields 1384, and a user input interface 1386 comprising a plurality of input keys 1388. In preferred embodiments, the user input interface 1386 may substantially represent any of a number of standard user input interfaces, such as a keyboard.

Interactive buttons 1382 may facilitate a user navigating between enter case data user interface 1380 and any other user interface described herein, as well as save, cancel, undo, etc. a case data entry operation.

In one embodiment, a user may be presented with the user input interface 1386 upon interacting with one of the case data fields 1384 in order to facilitate the user entering case data into the case data field 1384.

Title region 1389 may display indicia that a user is being presented an edit object action user interface 1380, information about the case, etc. as would be understood by one having ordinary skill in the art upon reading the present descriptions.

FIG. 13J is a schematic representation of a capture signature user interface 1390 of an application for capturing and/or processing a digital image comprising a digital representation of a document, according to one embodiment. As shown in FIG. 13J, capture signature user interface includes a plurality of interactive buttons 1392, a signature capture region 1394, a case data display region 1396, and a title region 1398.

Interactive buttons 1392 may facilitate a user navigating between capture signature user interface 1390 and any other user interface described herein, as well as saving, canceling, undoing, etc. a signature capture operation.

Signature capture region 1394 may facilitate a user capturing a signature, e.g. a handwritten signature using a stylus, attaching and/or uploading an electronic signature or digital signature, etc., or via any other known method of capturing signature data, as would be understood by one having ordinary skill in the art upon reading the present descriptions.

Case data display region 1396 may, in some approaches, be configured to display case data such as may be entered by a user into one of the case data fields 1384 utilizing case data entry user interface 1380 substantially as described above with reference to FIG. 13I. Of course, any type of case data may be displayed in case data display region 1396.

Title region 1398 may display indicia that a user is being presented an edit object action user interface 1390, information about the case, etc. as would be understood by one having ordinary skill in the art upon reading the present descriptions.

FIG. 13K is a schematic representation of a submit case user interface 13000 of an application for capturing and/or processing a digital image comprising a digital representation of a document, according to one embodiment. As shown in FIG. 13K, submit case user interface 13000 includes a plurality of interactive buttons 13002, a progress bar 13004, and one or more case data display regions 13006.

Interactive buttons 1392 may facilitate a user navigating between capture signature user interface 1390 and any other user interface described herein, as well as submitting, deleting, etc. a case.

In one approach, progress bar 13004 may provide progress information regarding submitting a case, e.g. to a remote host over a network. In preferred approaches, progress bar 13004 provides visual indicia of submission progress via the progress bar 13004 changing appearance (e.g. by filling with a particular color, such as green, yellow, red, etc.) in a left-to-right direction. Of course, other methods of indicating submission progress (e.g. by displaying a percentage completion, a data upload rate and/or amount of uploaded data, etc.) may also be employed without departing from the scope of the present disclosures.

In more embodiments, case data display region 13006 may, in some approaches, be configured to display case data such as may be entered by a user into one of the case data fields 1384 utilizing case data entry user interface 1380 substantially as described above with reference to FIG. 13I. Of course, any type of case data may be displayed in case data display region 1396.

In several approaches, it may be advantageous to facilitate outputting data relating to one or more cases for creating physical representations of case data, images relating to cases, etc. In one exemplary approach, the mobile software application may include one or more interfaces configured to facilitate printing case information and associated images, such as described below with reference to FIGS. 14A-14D.

FIG. 14A is a schematic representation of a print case user interface 1400 of an application for capturing and/or processing a digital image comprising a digital representation of a document, according to one embodiment. As shown in FIG. 14A, print case user interface 1400 may include a plurality of interactive buttons 1402, a plurality of descriptive fields 1404, each field optionally including a selection interface 1406, and a title region 1408.

In one embodiment, interactive buttons 1402 may facilitate one or more user actions relating to printing a case, images or other data relating to a case, etc. For example, interactive buttons 1402 may facilitate user navigation between print case user interface 1400 and any other user interface described herein, may facilitate a user searching for printers, e.g. by geographic location, using an electronic mapping system, by prior use (e.g. searching through a print history), may facilitate a user modifying one or more print settings, may facilitate a user viewing printers in conjunction with a map, etc. as would be understood by one having ordinary skill in the art upon reading the present descriptions.

In further embodiments, descriptive fields 1404 may include information describing one or more printers, print locations, etc., such as a geographic location of a printer (e.g. an address, a distance from the mobile device, etc.), a name of an entity controlling the printer, e.g. "FedEx," "AIM Mail Centers," "Doubletree Hotel," "Kinkos," etc., and/or any other identifying information useful to facilitate a user locating a printer for use in printing information relating to a case. In preferred embodiments, some or all of the data displayed in descriptive fields 1404 may be retrieved and/or organized according to a user-submitted search query (not shown) which may be utilized to locate information relating to one or more printers using electronic resources such as a search engine, relational database, electronic service listing, etc. as would be understood by one having ordinary skill in the art upon reading the present descriptions.

In several embodiments, one or more descriptive fields 1404 may further include a selection interface 1406 configured to facilitate a user selecting a print resource associated with information displayed in the respective descriptive field 1404. Upon interacting with the selection interface 1406, print case user interface may display additional details and/or interfaces regarding the associated print resource, and/or may facilitate a user submitting a print job to the print source, in various approaches. Several exemplary embodiments of additional details and/or interfaces accessible via the selection interface are described below with reference to FIGS. 14B-14D.

In still more embodiments, title region 1408 may display indicia that a user is being presented print case user interface 1400, information about the case, etc. as would be understood by one having ordinary skill in the art upon reading the present descriptions.

FIG. 14B is a schematic representation of a select printer user interface 1410 of an application for capturing and/or processing a digital image comprising a digital representation of a document, according to one embodiment. As shown in FIG. 14B, select printer user interface 1410 may include a plurality of interactive buttons 1412, a search query field 1414, a printer data field 1416, a printer resource shortcut interface 1418, and a title region 1419.

In one embodiment, interactive buttons 1402 may facilitate one or more user actions relating to printing a case, images or other data relating to a case, etc. For example, interactive buttons 1412 may facilitate user navigation between select printer user interface 1410 and any other user interface described herein, may facilitate a user searching for printers, e.g. by geographic location, using an electronic mapping system, by prior use (e.g. searching through a print history), may facilitate a user modifying one or more print settings, may facilitate a user viewing print resources in conjunction with a map, particularly print resources within a predetermined distance of the mobile device, etc. as would be understood by one having ordinary skill in the art upon reading the present descriptions.

In several embodiments, search query field 1414 may be configured to accept input from a user and facilitate locating print resources through a search process. The search process may optionally locate information relating to one or more printers using electronic resources such as a search engine, relational database, electronic service listing, etc. as would be understood by one having ordinary skill in the art upon reading the present descriptions. Any known search method may be used in connection with the search query field, and searches may be performed using any suitable form of input, particularly alphanumeric input received from a user.

In more embodiments, printer data field 1416 may display data associated with one or more print resources, such as a geographic location, network address, printer description, etc. Moreover, printer data field 1416 may facilitate displaying one or more print resources having been previously selected by a user, and/or print resources having been previously designated as belonging to a particular print resource classification by the user, for example, "favorite" print resources, "last used" resources, etc. as would be understood by one having ordinary skill in the art upon reading the present descriptions.

In still more embodiments, title region 1419 may display indicia that a user is being presented select printer user interface 1410, information about the case, etc. as would be understood by one having ordinary skill in the art upon reading the present descriptions.

FIG. 14C is a schematic representation of a print details user interface 1420 of an application for capturing and/or processing a digital image comprising a digital representation of a document, according to one embodiment. As shown in FIG. 14C, print details user interface 1420 includes a plurality of interactive buttons 1422, a plurality of print data fields 1424, each print data field 1424 being characterized by one or more of a selection interface 1426 and/or a flagging interface 1428, and a title region 1429.

In one embodiment, the plurality of interactive buttons 1422 may facilitate user navigation between print details user interface 1420 and any other user interface described herein, may facilitate a user searching for printers, e.g. by geographic location, using an electronic mapping system, by prior use (e.g. searching through a print history), may facilitate a user modifying one or more print settings, etc. as would be understood by one having ordinary skill in the art upon reading the present descriptions.

In several embodiments, print data fields 1424 may display one or more details regarding a printing task, e.g. data associated with an image to be printed, a print location, etc. Moreover, each data field 1424 may optionally comprise one or more of a selection interface 1426 and/or a flagging interface 1428. The selection interface 1426 may facilitate a user selecting data displayed in data field 1424 for further review, e.g. in order to view an image having data associated therewith displayed in data field 1424. Similarly, flagging interface 1428 may facilitate a user designating data displayed in a data field 1424 as belonging to or being associated with data of a particular classification, e.g. by designating a particular print resource, print location, etc. as a "favorite" resource, location, etc. in various embodiments.

In still more embodiments, title region 1429 may display indicia that a user is being presented select printer user interface 1420, information about the case, etc. as would be understood by one having ordinary skill in the art upon reading the present descriptions.

FIG. 14D is a schematic representation of a print job user interface 1430 of an application for capturing and/or processing a digital image comprising a digital representation of a document, according to one embodiment. As shown in FIG. 14D, print job user interface includes a plurality of interactive buttons 1432, a print job data field 1434, a print job progress indicator 1436, a print job success indicator 1438, and a title region 1439.

In one embodiment, the plurality of interactive buttons 1432 may facilitate user navigation between print details user interface 1430 and any other user interface described herein, may facilitate a user searching for printers, e.g. by geographic location, using an electronic mapping system, by prior use (e.g. searching through a print history), may facilitate a user modifying one or more print settings, etc. as would be understood by one having ordinary skill in the art upon reading the present descriptions.

In more embodiments, print job data field 1434 may display data relating to a print job, e.g. a print job location, print job resource, print job submission status, print job submission date/time, print job duration, print job size (file size, number of pages, etc.), and/or other print job data as would be understood by one having ordinary skill in the art upon reading the present descriptions. In some approaches, print job data field may include a print job progress indicator 1436 such as a progress bar, which may be substantially similar in appearance and function to progress bar 13004 as described above with reference to FIG. 13K. Of course other progress indicators are within the scope of the present disclosures, including progress indicators such as displaying a print job percent completion, a print job time remaining, a print job data transfer, etc. as would be understood by one having ordinary skill in the art upon reading the present descriptions.

In preferred embodiments, print job user interface 1430 may also include a print job success indicator 1438, which may take any known form, such as displaying an icon, a symbol, alphanumeric text, etc. indicating a print job has been successfully uploaded to the print resource, physical representations of the digitally submitted print job have been successfully generated, etc. as would be understood by one having ordinary skill in the art.

In still more embodiments, title region 1439 may display indicia that a user is being presented select printer user interface 1430, information about the case, etc. as would be understood by one having ordinary skill in the art upon reading the present descriptions.

Turning now to FIGS. 15A-16D, several exemplary embodiments of an image capture user interface are depicted. The exemplary embodiments shown in FIGS. 15A-16D merely represent potential configurations for such an image capture user interface within the scope of the present disclosures, and any known image capture interface or methodology may be utilized in conjunction with the mobile image capture and processing algorithms and/or applications described herein.

FIG. 15A is a schematic representation of an image capture user interface 1500 of an application for capturing and/or processing a digital image comprising a digital representation of a document, according to one embodiment. As shown in FIG. 15A, image capture user interface 1500 includes a plurality of interactive buttons 1502 configured to facilitate a user performing one or more image capture actions, such as adjusting a flash mode (e.g. selecting one of auto-flash, flash-on, and flash off, etc.), capturing content, navigating between the image capture user interface 1500 and any other interface described herein, associating one or more of image data, video data, and/or audio data with a captured image, etc. as would be understood by one having ordinary skill in the art upon reading the present descriptions.

Figure 15C:
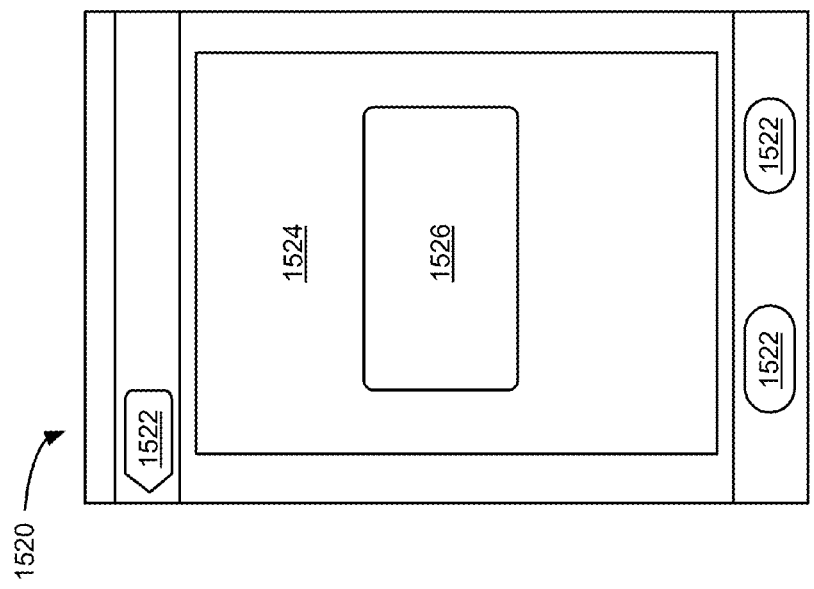
FIG. 15C is a schematic representation of an image capture QC results user interface of an application for capturing and/or processing a digital image comprising a digital representation of a document, according to one embodiment.
Figure 15B:
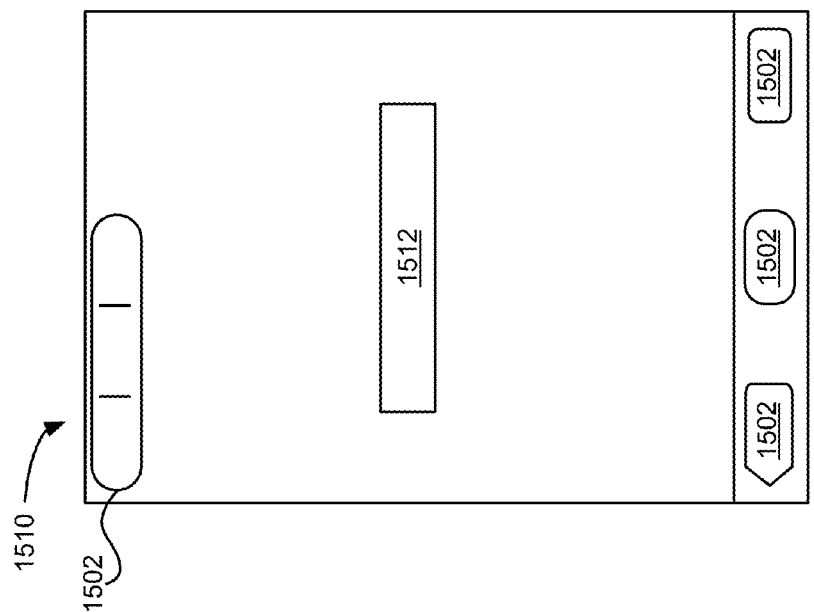
FIG. 15B is a schematic representation of an image capture user interface of an application for capturing and/or processing a digital image comprising a digital representation of a document, according to one embodiment.

FIG. 15B is a schematic representation of another image capture user interface 1510 of an application for capturing and/or processing a digital image comprising a digital representation of a document, according to one embodiment. Similar to the image capture user interface 1500 described above, the image capture user interface 1510 shown in FIG. 1510 also includes a plurality of interactive buttons 1502 with substantially identical functionality as discussed above regarding FIG. 15A. In addition, image capture user interface 1510 may be further configured to assist a user in capturing a high-quality digital image for efficient, accurate processing utilizing one or more algorithmic processing operations described herein.

For example, in one embodiment image capture user interface 1510 may be configured to receive input from a user, e.g. via one of the interactive buttons 1502 directing a capture component of the mobile device to capture an image. Upon receiving such input, the image capture user interface 1510 may display an image capture assistance message, e.g. in a status message region 1512, instructing the user to take one or more actions to facilitate capturing a high-quality image. In preferred embodiments, the mobile application may be in communication with one or more of an accelerometer and/or a gyroscope integrated with the mobile device, and may receive stability data indicating an amount and/or direction of mobile device movement. Such stability data may be received from the accelerometer, the gyroscope, or both, in various embodiments.

Upon detecting the amount and/or direction of mobile device movement, the status message region 1512 may instruct a user to hold the mobile device still, to place the mobile device on a flat surface, or take other action to facilitate capturing a high-quality image, as would be understood by one having ordinary skill in the art upon reading the present descriptions. In preferred embodiments, upon detecting that the amount and/or direction of mobile device movement is less than a predetermined threshold, the status message region 1512 may display another message indicating that image capture is in progress.

FIG. 15C is a schematic representation of an image capture result user interface 1520 of an application for capturing and/or processing a digital image comprising a digital representation of a document, according to one embodiment. As shown in FIG. 15C, image capture result user interface includes a plurality of interactive buttons 1522, a captured image comprising a digital representation of a document 1524, and a status message region 1526.

In one embodiment, the plurality of interactive buttons 1522 may be configured to facilitate a user performing one or more image review actions and/or one or more image capture actions, such capturing content, re-capturing content, and/or navigating between the image capture result user interface 1520 and any other interface described herein, associating one or more of image data, video data, and/or audio data with a captured image, etc. as would be understood by one having ordinary skill in the art upon reading the present descriptions.

In some embodiments, upon capturing content such as an image, image capture result user interface 1522 may be output to a display of the mobile device, and information relating to the captured content may be displayed in status message region 1526. In preferred embodiments, information relating to the captured content may particularly relate to the quality of the captured content, e.g. whether a digital representation of a document was detected in the image, whether the image is characterized by one or more blurred regions, whether an illumination characteristic of the image is acceptable, etc. as would be understood by one having ordinary skill in the art upon reading the present descriptions. Of course, other information, whether relating to image quality or otherwise, may additionally and/or alternatively be displayed in status message region 1526 without departing from the scope of the present disclosures.

Figure 16B:
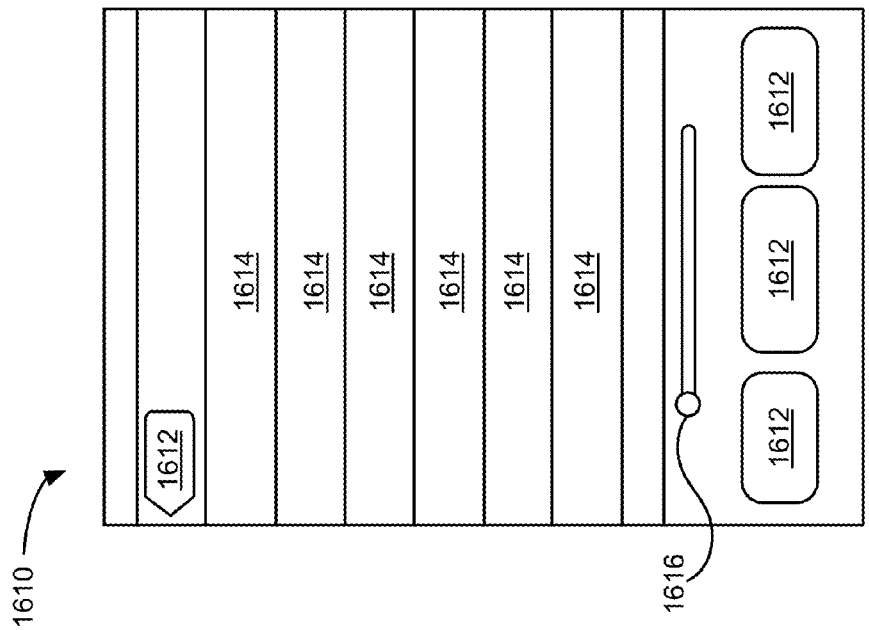
FIG. 16B is a schematic representation of a capture audio attachment user interface of an application for capturing and/or processing a digital image comprising a digital representation of a document, according to one embodiment.
Figure 16A:
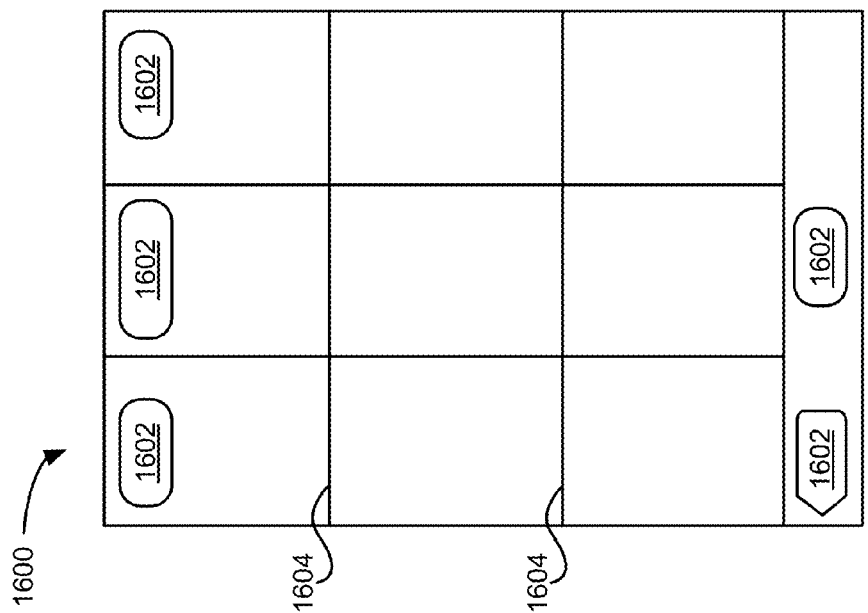
FIG. 16A is a schematic representation of a capture image attachment user interface of an application for capturing and/or processing a digital image comprising a digital representation of a document, according to one embodiment.

FIG. 16A is a schematic representation of a capture image attachment user interface 1600 of an application for capturing and/or processing a digital image comprising a digital representation of a document, according to one embodiment. As shown in FIG. 16A, capture image attachment user interface 1600 includes a plurality of interactive buttons 1602 and a plurality of horizontal and/or vertical gridlines 1604.

In various approaches, the plurality of interactive buttons 1602 may be configured to facilitate a user performing one or more image attachment capture actions such capturing content, saving captured content, recapturing content, adjusting image capture settings such as flash, zoom, brightness, color/greyscale, etc. as well as facilitating a user navigating between the image attachment capture result user interface 1600 and any other interface described herein, etc. as would be understood by one having ordinary skill in the art upon reading the present descriptions.

As will be appreciated by one having ordinary skill in the art upon reading the present descriptions, embodiments of capture image attachment user interface 1600 including a plurality of gridlines 1604 may assist a user in aligning a capture field of the capture component with target content, e.g. with borders of a document. In various embodiments, a user may be able to toggle the presence of visible gridlines 1604 on the mobile display when interacting with capture attachment user interface 1600, may be able to customize the number and direction of gridlines (e.g. horizontal, vertical, both or neither) and may be able to determine the position of gridlines 1604 such that, for example, a central region within the grid corresponds to a predetermined set of known dimensions. In preferred embodiments, the region within the grid corresponding to the predetermined set of known dimensions may correspond to dimensions of a known document type, which may include any type described herein as well as others that would be appreciated by a skilled artisan reading the present descriptions.

In additional and/or alternative embodiments, using capture image attachment user interface 1600, a user may capture either an image stored on a storage medium integrated into or coupled to the mobile device, capture an image using a capture component of the mobile device, or both. Moreover, a result depicting the captured, recaptured, etc. content may be outputted to a display of the mobile device upon receiving user input instructing the capture component of the mobile device to capture content and capturing such content using the mobile capture component. In preferred embodiments, displaying the result in this manner facilitates a user reviewing the captured content and may optionally facilitate a user editing the captured content according to any methodology or operation described herein.

FIG. 16B is a schematic representation of a capture audio attachment user interface 1610 of an application for capturing and/or processing a digital image comprising a digital representation of a document, according to one embodiment. As shown in FIG. 16B, the capture audio attachment user interface 1610 includes a plurality of interactive buttons 1612, a plurality of data fields 1614, and a playback progress indicator 1616.

In various embodiments, the plurality of interactive buttons 1612 may be configured to facilitate a user performing one or more audio content capture and/or review actions, such capturing audio content, reviewing (e.g. playing back) audio content, deleting captured audio content, associating audio data with captured image and/or video content, and/or navigating between the capture audio attachment user interface 1620 and any other interface described herein, etc. as would be understood by one having ordinary skill in the art upon reading the present descriptions. In some approaches, a user may be facilitated in reviewing audio content by interacting with playback progress indicator 1616 using any known method.

In addition, data fields 1614 may be configured to display one or more audio files and/or metadata associated with one or more audio files. In still more embodiments, data fields 1614 may similarly display one or more video files and/or metadata associated with the one or more video files. For example, such metadata may include a capture date and/or time, an audio clip length, a name associated with an audio or video clip, information relating to a case associated with the audio or video clip, etc. as would be understood by one having ordinary skill in the art upon reading the present descriptions.

FIG. 16C is a schematic representation of a capture video attachment user interface 1620 of an application for capturing and/or processing a digital image comprising a digital representation of a document, according to one embodiment. As shown in FIG. 16C, capture video attachment user interface includes a plurality of interactive buttons 1622, a video display region 1624, a playback progress indicator 1626 and a title region 1628.

In various embodiments, the plurality of interactive buttons 1612 may be configured to facilitate a user performing one or more audio content capture and/or review actions, such capturing video content, reviewing (e.g. playing back) video content in video display region 1624, deleting captured video content, associating video content with captured image content and/or metadata, and/or navigating between the capture video attachment user interface 1620 and any other interface described herein, etc. as would be understood by one having ordinary skill in the art upon reading the present descriptions. In some approaches, a user may be facilitated in reviewing video content by interacting with playback progress indicator 1626 using any known method.

In more embodiments, title region 1628 may display indicia that a user is being presented a capture video attachment user interface 1620, information about the case, etc. as would be understood by one having ordinary skill in the art upon reading the present descriptions.

In various embodiments, the plurality of interactive buttons 1622 may be configured to facilitate a user performing one or more audio content capture and/or review actions, such capturing video content, reviewing (e.g. playing back) video content in video display region 1624, deleting captured video content, associating video content with captured image content and/or metadata, and/or navigating between the capture video attachment user interface 1620 and any other interface described herein, etc. as would be understood by one having ordinary skill in the art upon reading the present descriptions. In some approaches, a user may be facilitated in reviewing video content by interacting with playback progress indicator 1626 using any known method.

FIG. 16D is a schematic representation of a mobile scanner image capture user interface 1630 of an application for capturing and/or processing a digital image comprising a digital representation of a document, according to one embodiment. As shown in FIG. 16D, mobile scanner image capture user interface 1630 includes a plurality of interactive buttons 1632, a display region configured to receive and/or display a digital representation of a document 1634, and a status message region 1636.

In various embodiments, the plurality of interactive buttons 1632 may be configured to facilitate a user wirelessly connecting to a mobile scanning device (not shown), communicating one or more commands to the mobile scanning device, receiving data from the mobile scanning device, and/or navigating between the capture video attachment user interface 1630 and any other interface described herein, etc. as would be understood by one having ordinary skill in the art upon reading the present descriptions.

While the presently described processing operations and user interfaces are particularly capable of processing images captured using a mobile capture component (e.g. camera) of a mobile device that include artifacts and present challenges not encountered when analyzing images captured using traditional flatbed scanners, multifunction devices, etc., the instant processing operations and user interfaces are fully suited for processing images captured from such traditional scanners, etc. Thus, the presently disclosed embodiments offer a robust, capture-platform-independent analytical system and method for processing digital images.

For example, in some approaches, a user may initiate a connection with a mobile scanning device, and may receive image data from the mobile scanning device upon communicating a transmit data command from the mobile device to the mobile scanner. In preferred approaches, the mobile scanner may then transmit data to the mobile device. Transmitted data may be either data stored on a storage medium integrated into or coupled to the mobile scanner, or data captured using a capture component of the mobile scanner. For example, upon receiving a transmit data command from the mobile device, the mobile scanner may scan one or more documents, e.g. documents positioned in an automatic document feeder (ADF) of the mobile scanner.

Status message region 1636 may be configured to display one or more messages pertaining to the capture, transmission, receipt, and/or processing of data via the mobile scanner. Messages of any known type may be displayed using any known methodology.

FIG. 17 is a schematic representation of a settings user interface 1700 of an application for capturing and/or processing a digital image comprising a digital representation of a document, according to one embodiment. As shown in FIG. 17A, settings user interface 1700 includes a navigation button 1702, and a plurality of settings fields 1704, each settings field 1704 optionally including one or more of a selection interface 1706 and a toggle interface 1708, and a title region 1710.

In one embodiment, navigation button 1702 may be configured to facilitate a user navigating between the settings user interface 1700 and any other interface described herein, etc. as would be understood by one having ordinary skill in the art upon reading the present descriptions.

Settings fields 1704 may be configured to facilitate a user defining, modifying, synchronizing, and/or resetting one or more settings relating to any navigation, case management, interface organization, interface appearance, mobile device communication, image capture, image processing, etc. functionality as described herein and as would further be understood by one having ordinary skill in the art upon reading the present descriptions.

In various approaches, one or more settings may be configured via a user interacting with a selection interface 1706 configured to direct a user to a more detailed interface for modifying options relating to the setting, e.g. facilitating the user to select one from among several possible settings displayed in a drop-down list, entering data or metadata in a data entry field, etc. as would be understood by one having ordinary skill in the art upon reading the present descriptions.

Additionally and/or alternatively, one or more settings may be configured via a user interacting with a toggle interface 1708 that may be alternately set to one of two possible states for a given setting. Toggle interface 1708 may be particularly preferable for settings having only two possible states, such as enabling/disabling functionalities, switching between one of two alternate configurations, etc. as would be understood by one having ordinary skill in the art upon reading the present descriptions.

Specific, but nonlimiting examples of settings capable of being manipulated via settings interface 1710 include virtual rendering settings such as toggling real-time analysis feedback, processing mode (full, preview, etc.), display preferences for captured content (original format, enhanced, black and white, greyscale, etc.), toggling geographic tagging of images, configuring connection and/or authentication information, configuring status message display settings, determining image processing and/or analysis scheduling (e g immediately upon capture, at a user-defined date and time, upon reviewing a case, etc.) processing location (e.g. client device, host device, cloud resources, etc.), toggling image capture stability assistance, notification settings, and/or other settings relevant to any functionality described herein, as would be understood by one having ordinary skill in the art upon reading the present descriptions.

Title region 1710 may display indicia that a user is being presented the select settings user interface 1700, etc. as would be understood by one having ordinary skill in the art upon reading the present descriptions.

The application described herein for use in capturing and/or processing digital images comprising one or more digital representations of a document may further include notification functionalities capable of informing a user about any relevant information pertaining to image processing, case management, etc. according to various embodiments. In preferred approaches, users may further be facilitated in receiving desirable notifications, not receiving undesired notifications, and/or configuring notification characteristics via a notifications user interface, such as the exemplary embodiment described below with reference to FIG. 18.

FIG. 18 is a schematic representation of a notifications user interface 1800 of an application for capturing and/or processing a digital image comprising a digital representation of a document, according to one embodiment. As shown in FIG. 18, notifications interface 1800 includes a navigation button 1802, a plurality of notification fields 1804, each notification field optionally including a selection interface 1806, a toggle interface 1808 and a title region 1810.

Generally, in various approaches a user may be facilitated in selecting, creating, modifying and/or deleting notifications by interacting with one or more notification fields 1804, e.g. via a corresponding selection interface 1806. As will be understood by one having ordinary skill in the art reading the present descriptions notifications may take any known format and may utilize one or more functionalities native to the mobile device operating system. For example, in various embodiments notifications may comprise one or more of an email, a text message, a pop-up alert, a banner, a meeting or other event managed using a calendar interface, etc.

In further embodiments, notifications user interface 1800 may facilitate a user reviewing recent notifications, configure notification repetition frequency, determine whether to display notifications when the mobile device is locked, whether to display notifications when a mobile device display is off or in a "sleep mode," etc.

Additionally and/or alternatively, one or more settings may be configured via a user interacting with a toggle interface 1818 that may be alternately set to one of two possible states for a given setting. Toggle interfaces may be particularly preferable for configuring notifications having only two possible states, such as enabling/disabling notifications.

Title region 1808 may display indicia that a user is being presented the notifications user interface 1800, etc. as would be understood by one having ordinary skill in the art upon reading the present descriptions.

Use Methodology

In one illustrative use, the document(s) being photographed can be validated. For example, assume the document(s) is a hotel receipt submitted with an expense report. Then the application and/or the server can check whether the receipt is actually for that user. If the hotel that issued the receipt has put a different name on the receipt, a warning may be output, requesting verification that the invoice is for that user. As discussed in more detail below, the mobile device may send some identifying information that corresponds to the device and/or user, thereby enabling such validation.

In another illustrative use, assume an employee wants to cheat on an expense report. The employee borrows receipts from a friend and takes pictures of those in order to inflate reimbursable expenses. As above, names, credit card numbers, etc. can be cross-checked.

Illustrative methods of document validation that may be used in various embodiments of the present invention are disclosed in U.S. patent application Ser. No. 12/368,685, filed Feb. 10, 2009 and entitled "Systems, Methods, and computer program products for determining document(s) validity" and which is herein incorporated by reference. An advantage of some approaches disclosed therein is that the system already knows what it is expecting, so upon receipt of an invoice, and with the purchase order number already known, the system easily determines what should have been invoiced. Thus, the system can more easily extract that data from the document(s) and more easily check it. In the present scenario, the system knows what entity would be performing the back extraction, taking the image, and for what kind of business process this image is intended. Accordingly, the system may expect an image that has made it to this business process, and so the accuracy with which the algorithm is capable of extracting data from the image drastically improves.

In one embodiment, a portable scanner may communicate with the mobile device using any known connection, e.g., using Bluetooth, WiFi, a USB cable, etc. and instead of taking the picture with the camera, the portable scanner scans the document(s) and transmits the document(s) to the mobile device. Upon receipt, the image data may be processed as discussed herein.

According to one embodiment, the architecture may incorporate a mobile device having a mobile application thereon, and one or more remote servers, which may be standalone, part of a cloud service, etc. Any of these may incorporate Kofax Capture, the Kofax transformation modules, and/or other software available from Kofax Inc., 15211 Laguna Canyon Road, Irvine, Calif. 92618-3146, United States.

In various approaches, a mobile device and/or a remote server may initiate a login authentication. In such case, a login authentication may be initiated automatically once the mobile application is opened, upon receiving a request from a user, an upload from the mobile device to the remote server is initiated, etc. or any of the other approaches described above. Examples of embodiments including login authentications are presented below.

According to one approach, when a mobile device receives a request from a user to login to the remote server, a signal may be sent to the cloud service. In various approaches, the cloud service may be hosted by Kofax, a third party, the user, etc. This cloud service may then assist in connecting the mobile device to a corresponding remote server.

In one approach, software including, but not limited to Kofax Front Office Server (KFS) may act as a plug in, allowing the remote server to connect to the mobile device. In another approach, KFS may also allow administrators, programmers, etc. to create users types and/or decide what capabilities may be available to certain mobile devices. In one approach, mobile devices with similar capabilities and/or user types may be assigned to groups. These groups may be distinguishable based on login information provided, a predetermined list, information received about the user, etc.

In one approach, after the mobile device is connected to the remote server, the remote server may connect to an additional enterprise resource planning (ERP) system, customer relationship management (CRM) system, database, remote server, etc.

According to one approach, once the login to the mobile device and/or the remote server has been completed, the user may be able to perform any number of certain predetermined tasks. These tasks may be determined by the login information provided, a predetermined list, information received about the user, saved user preferences, KFS, etc.

In one approach, based on the task request received by the mobile device and/or the remote server, the user may be able to create any number of predetermined document(s) types. In this case, the mobile device and/or remote server may receive some information from the user regarding the type of documents which will be processed e.g., invoices, loan applications, etc. The mobile device may receive this information from the user via a graphical user interface, saved user preferences, login information, etc. or any other method mentioned herein.

In one approach, a mobile device and/or a remote server may receive preferences from a user regarding tasks and their association with a given document(s) type. In another approach, these preferences may be saved and used in future embodiments. Thus, one or more document types may define what kind of image processing will be available, automatically performed, forbidden, etc.

In another approach, the mobile device and/or a remote server may receive input from the user regarding the desired information to be extracted from a specific document(s). This input may then be saved on the mobile device and/or the remote server for future use. The desired information may require processing that may be the same as, similar to, or different than the aforementioned preferences. Alternatively, the input regarding the information to be extracted from a specific document(s) or document(s) type may be received from the cloud service and/or the remote server(s).

Similarly, in still another approach mobile devices may receive input from a user regarding which jobs should be processed on the desired information for a specific document(s), document(s) type, etc. Input regarding job-processing preferences may be saved on the mobile device and/or the remote server as well. Documents and/or preferences unique to those documents may be distinguished from others by using file names, security passcodes, etc.

Using the capture software described above, the camera of a mobile device may capture any number of images and/or audio recordings.

In one approach, the image processing described above may initiate a job on one or more objects, which may be processed on the mobile device and/or the remote server.

In another approach, the job may be processed on the mobile device if the processing speed, available memory, battery life, etc. meet some threshold predetermined by the user, job, remote server, cloud service, etc. Moreover, it is preferable that if that threshold is not met, the job is processed partially or entirely on one or more remote servers within a cloud service to optimize performance. In one approach, it may be predetermined by the user, cloud service, remote server, etc. for any one or more jobs to be processed solely on the mobile device and/or the remote server regardless of any thresholds.

In one methodology, if it is desired, the mobile device may receive a signature from a user via a touchpad, a stylus, an audio recording, etc. which may provide authentication to documents being sent from the mobile device to a destination. In one approach, one or more signatures may be added to a case (e.g., explained below) or sent alone from a mobile device.

Once the desired jobs have been completed, the mobile device may receive a request to send one or more documents to the remote server. Software including, but not limited to Kofax Transformation Module (KTM) may act as a plugin to Kofax Capture (KC) software and may assist with the data extraction.

These documents may preferably be packaged and sent together as a case, but may be sent individually as well. When sending documents from a mobile device, identification such as a confirmation number, claim number, verification code, etc. may be included to help index the documents. In one approach, the mobile device may receive the identification from the user.

Alternatively, the documents may be sent without identification so that the cloud service, remote server, etc. may autonomously index documents. In one approach, the documents may be sent to the cloud service, before arriving at the remote server. In this event, the documents may be classified by the remote server based on the available information from the login authentication, saved user preferences, document(s) types, image processing, etc. Once processed, the remote server may transmit these documents to another server, a third party, etc.

In one approach, the document(s) types of some or all captured documents are determined automatically. In one approach, raw image information is used to determine the type of one or more documents. In another approach, any number of image processing operations as described herein is performed before the image information is used to determine the type of one or more documents. In yet another approach, information derived from an image (e.g. the text derived from an image by use of OCR, a bar code found in the image, etc.) is used to determine the type of one or more documents. Where such determination is performed (locally or remotely) may be configured as described herein. Any known classification method may be used to determine the document(s) type, for example those described in U.S. Pat. Nos. 7,386,527 and 7,761,391, which are herein incorporated by reference.

Preferably, the automatic determination is output to the user, who can verify the type of the document(s), and optionally change the type of document(s). In another approach, the automatic determination is only output to the user if the confidence of the determination is below a certain threshold.

The document(s) type may be stored; transmitted e.g., in conjunction with the image of the document(s); be used to determine a recipient of the document(s) and/or initiate a business process; etc. Techniques that may be adapted for such purposes include those described in U.S. patent application Ser. No. 11/743,110, filed May 1, 2007, entitled "Systems and methods for routing facsimiles based on content" and which is herein incorporated by reference.

In one approach, prior to sending the documents from the mobile device, the remote server and/or the mobile device may perform some review to determine if any additional documents, signatures, pictures, audio recordings, etc. are required. In various approaches, the review parameters may be preset by the user, preset by the application, dependent upon login information, etc. Examples of reviews are presented in more detail below.

In one approach, the user and the mobile device and the cloud service and/or remote server(s) operate in an interactive fashion to validate information extracted from an image, e.g., using methodology such as that disclosed in U.S. patent application Ser. No. 12/368,685, as mentioned before.

In one approach, the mobile device may receive a notification such as an email, text message, voicemail, link, etc. from the remote server in response to processed documents. The mobile device may provide this notification to the user as to inform the user how the documents were processed.

The following examples are in no way meant to limit the present invention, but rather are intended to provide illustrative embodiments that place the inventive concepts in a context. One skilled in the art, upon reading the present disclosure, would understand the plethora of permutations of the present invention that are encompassed by the description provided herein.

One illustrative embodiment may include a field claims adjuster for Mercury Auto Insurance. On a given day, the field claims adjuster may visit a particular body shop regarding a particular claim filed that day by a client. At the body shop, the field claims adjuster (user) may take out his mobile device and activate a Mobile Application as described herein. Upon doing so, the mobile device may prompt the field claims adjuster to login. After the field claims adjuster provides his login information, the Mobile Application may identify that he is in fact an insurance claims adjuster.

At this point, the mobile device may inform the field claims adjuster that he is able to process a field claim (task). Upon selecting a field claim, the field claims adjuster is informed that he is able to process a repair quote, an accident report, a proof of insurance, a driver license, a general correspondence, and photos of the damaged vehicle (document(s) types). Therefore, these types of documents are what the field claims adjuster may be allowed to process based on his login information.

The field claims adjuster may decide to use the capture software described above and capture individual pictures of a repair quote, an accident report, and a driver license using the camera in his mobile device. Whereupon, the image processing described above may process the pictures on the mobile device itself and/or the image may be pushed up to a remote server for processing.

In addition, the field claims adjuster may capture an image while walking around the damaged vehicle, as well as capture an audio statement recording from the client who is submitting the claim. Furthermore, the field claims adjuster may have the same client digitally sign a window in his mobile device using a finger or a tool such as a stylus for further authorization and/or authentication.

Once this content has been collected, the field claims adjuster may create a case which combines all the gathered pictures, videos, audio recordings, and digital signatures. Then the field claims adjuster may send this case with the customer's claim number to a remote server.

In one approach, this case may be sent to a cloud system, whereupon it is indexed to the remote server corresponding to the customer's particular claim.

Once the case is delivered to the remote server, the relevant information may be extracted, and some email or SMS may be sent back to the field claims adjuster and/or the customer who filed the claim informing them of the status and/or providing them a link.

In another approach, the customer filing the claim may be required to perform the aforementioned steps of the present illustrative embodiment with their own mobile device and submit the case documents to the Mercury Auto Insurance company before the company is willing to send a field claims adjuster to the site of the vehicle. In another approach, the field claims adjuster may not be required to come to the site of the vehicle if the customer is able to perform any, some or all of the aforementioned embodiment themselves.

Another illustrative embodiment may include a loan officer. On a particular day, a loan officer may visit a client who wishes to refinance their loan. Once with the client, the loan officer (user) may take out his tablet (mobile device) and activate the Mobile Application. Upon doing so, the tablet may prompt the loan officer to login. After the loan officer provides his login information, the Mobile Application may identify that he is in fact a loan officer.

At this point, the tablet may inform the loan officer that he is able to process a field loan (task). Upon selecting a field loan, the loan officer is informed that he is able to process property comparisons, a termite report, proof of residence, and income verification (document(s) types). Therefore, these types of documents are what may be allowed to be submitted and/or processed based on his login information.

The loan officer may decide to use the capture software described above and capture individual pictures of a termite report, proof of residence, and income verification using the camera in his tablet. Thereafter, the images may be sent to a cloud service which then selects and sends the images to one or more remote servers to conduct the image processing described above. This may be done to optimize processing time because the tablet itself may not have had enough processing speed, memory and/or battery life to successfully do so.

In addition, the loan officer may capture a video while walking around the client's house, as well as capture an audio statement recording from the client. Furthermore, the loan officer may have the same client digitally sign a window in his tablet using the client's finger or a tool such as a stylus for further authorization.

Once this content has been collected, the loan officer may create a case which combines all the gathered pictures, videos, and audio recordings, but accidentally omits to include the digital signatures. Then the loan officer then attempts to send this incomplete case with the customer's loan number to a remote server.

However, before the case is sent to the remote server, the mobile device may perform a review of the components being sent in some embodiments. As explained above, based on the loan officer's login information, the mobile device may know that all field loans require signatures from the client. Therefore, when performing the review, the mobile device may detect the absence of such signatures, thereby stopping the package from being sent to the remote server. In one approach, the user may be informed of the review results by a text on a screen of the mobile device, an email, an audible sound projected through the speakers of the mobile device, etc.

After the loan officer includes the appropriate signatures to the case, the case may be sent to a cloud system, whereupon it is indexed to the remote server corresponding to the customer's particular loan.

Once the case is delivered to the remote server, the relevant information may be extracted, and some email or text message may be sent back to the loan officer and/or the customer who has the loan, informing them of the status and/or providing them a link.

In yet another illustrative embodiment, a doctor (user) may have an appointment with a patient, in which doctor may need to capture pictures of 35 separate documents from the patient. In this exemplary embodiment, for the doctor to use her mobile device to capture all 35 documents would not be a time efficient method. Instead, the doctor may use a mobile wireless scanner which wirelessly connects with the Mobile Application on the doctor's mobile device.

In another approach, the mobile scanner may connect to the mobile device via a wire, a cable, a removable memory chip (e.g., USB), etc.

In one approach, the mobile device may send a signal to the mobile wireless scanner upon receiving an initiation from the user. In another approach, the mobile wireless scanner may receive an input directly from a user. This input may include the user tapping a button or region of a mobile device display, giving a vocal command, a time lapse, etc.

Upon receiving a signal, the mobile wireless scanner may begin scanning images of the patient's document(s) and wirelessly transmitting the scanned images to the doctor's mobile device. Thereupon the Mobile Application may receive the images and process and/or forward them the same way, or a similar way to as if the mobile device had simply captured photos of all the documents.

Once the scans are transferred to the mobile device, the remainder of the image processing, formation of the case, etc. may be done on the mobile device according to any of the embodiments described herein.

Yet another illustrative embodiment may include a FedEx delivery person (user). The delivery person may show up to a home to pick up a package that is being sent overseas or to a domestic location. However, for packages being sent overseas, customs requires that the client sending this package declare its contents on a form.

Upon arrival, the FedEx delivery person may take out a mobile device and activate the Mobile Application. Upon doing so, the mobile device may prompt the FedEx delivery person to login. After the FedEx delivery person provides login information, the Mobile Application may identify that he is in fact a FedEx delivery person.

At this point, the mobile device may inform the FedEx delivery person of the ability to process a customs submittal (task). Upon selecting a customs submittal, the FedEx delivery person is informed of the ability to process a customs form (document(s) type). Therefore, this document(s) is what the FedEx delivery person may be allowed to process based on the login information.

The FedEx delivery person may decide to use the capture software described above and capture individual pictures of the customs form using the camera in the mobile device. Whereupon, the image processing described above may process the pictures on the mobile device.

In addition, the FedEx delivery person may have the same client digitally sign a window in his mobile device using a tool such as a stylus for further authorization.

Once this content has been collected, the FedEx delivery person may create a case which combines all the captured pictures, and digital signatures. Then the FedEx delivery person may upload this case with the customer's package number to a remote server.

As a result, this case may be sent to a cloud system, whereupon it is indexed to the remote server corresponding to the customer's particular package.

Once the case is delivered to the remote server, the relevant information may be extracted, and some email or text message may be sent back to the FedEx delivery person and/or the customer who is sending the package, informing them of the status and/or providing them a link.

In another embodiment, a mobile device may receive a notification regarding further requirements for an existing transaction. In one approach, the notification may include a link that may be activated by detecting the user tapping a button on the mobile device, a portion of the mobile device display, etc., automatically when the notification is received by the mobile device, etc. Once activated, the link may connect the mobile device to a remote server via a cloud service, a direct connection, etc.

In one approach, the user, by way of the mobile device, may then be presented with the option to download an application from a remote server in exchange for some form of currency, for free, goods, etc. In the case that the mobile device receives permission from a user to download the application, the download may be conducted by the mobile device and/or the remote server depending on processing speed, available memory, etc. as described above. Once downloaded, the application may allow a mobile device to perform any of the embodiments described and/or suggested herein in conjunction with a cloud service and/or a remote server.

In one illustrative embodiment, a student applying to a certain college receives an email from the college informing him that he is required to electronically submit some additional form of identification. In the case that the student does not have access to some type of mobile device, he may activate the link provided in the email from the college, where said link presents him with the option to download a Mobile Application which will allow him to submit his identification via his mobile device.

If the student chooses to download the Mobile Application at that time, then he may capture pictures, videos, signatures, etc. and successfully submit them to the college as requested.

In another illustrative embodiment, a business process may be initiated upon processing the image, e.g., to create a machine-readable (e.g., an OCRed) document(s). Illustrative methodology which may be used in conjunction with such an embodiment is described in U.S. patent application Ser. No. 11/743,110, as mentioned above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
   capturing image data using a mobile device, the image data depicting a digital representation of a document; and
   using at least one processor:
   defining, based on the image data, a plurality of candidate edge points corresponding to the document;
   defining four sides of a tetragon based on at least some of the plurality of candidate edge points;
   determining a document type corresponding to the document is one of:
   "loan document;"
   "data relating to loan application;"
   "data not relating to loan application;" and
   "unknown;" and
   displaying at least one of:
   loan-relevant information from the captured image; and
   a loan status corresponding to the document,
   wherein the displaying is performed using a display of the mobile device.

2. The method as recited in claim 1, further comprising associating the determined document type with the captured image data.

3. The method as recited in claim 1, wherein the document type "data relating to loan application" corresponds to one or more of a termite report, a proof of residence, an income verification, a property comparison, an appraisal, a proof of insurance, a form of personal identification, a signature, an audio clip comprising a statement by a user, an image of property subject to a loan, and video data depicting property subject to a loan.

4. The method as recited in claim 3, further comprising:
   capturing one or more of the audio clip and the video data using the mobile device;
   extracting loan-relevant information from on one or more of the document, the audio clip and the video data; and
   submitting loan application data comprising at least one of the captured image, the determined document type, extracted loan-relevant information, and one or more signatures relating to the document.

5. The method as recited in claim 1, further comprising receiving one or more signatures relating to the loan document, and associating the one or more signatures with the captured image data.

6. The method as recited in claim 5, wherein receiving the one or more signatures further comprises capturing the one or more signatures using the mobile device.

7. The method as recited in claim 6, wherein capturing the one or more signatures comprises one or more of:
   a user inputting a digital signature via a display of the mobile device; and
   capturing an image of a signature.

8. The method as recited in claim 6, further comprising validating one or more of a user identification and a user authorization.

9. The method as recited in claim 1, further comprising authenticating an identity of a user performing the capturing using the mobile device prior to performing the capturing,
   wherein the authenticating further comprises determining the user identity corresponds to either an authorized loan officer or a loan applicant.

10. The method as recited in claim 1, further comprising extracting loan-relevant information from the captured image.

11. The method as recited in claim 10, wherein the displaying comprises displaying the extracted loan-relevant information using the display of the mobile device.

12. The method as recited in claim 11, further comprising prompting a user for feedback regarding the displayed loan-relevant information.

13. The method as recited in claim 10, further comprising transmitting data to a remote server, the data comprising at least one of the captured image, the determined document type, the extracted loan-relevant information, and one or more signatures relating to the document.

14. The method as recited in claim 13, further comprising, prior to the transmitting, analyzing the data to detect an absence of one or more required components selected from the captured image, the determined document type, the extracted loan-relevant information, and the one or more signatures relating to the loan document.

15. The method as recited in claim 14, further comprising, in response to detecting the absence of one or more of the required components, providing an indication of the absence to a user via the mobile device.

16. The method as recited in claim 14, further comprising:
   in response to detecting the absence of one or more of the required components, prompting a user of the mobile device to provide the one or more required components detected to be absent; and
   transmitting the data including the one or more required components to the remote server in response to receiving the one or more required components.

17. The method as recited in claim 16, wherein the prompting, the transmitting, and the detecting are each performed using the mobile device.

18. The method as recited in claim 1, further comprising transmitting data to a remote server, the data comprising at least one of the captured image, the determined document type, loan-relevant information, and one or more signatures relating to the document.

19. The method as recited in claim 1, wherein each side of the tetragon corresponds to a different side of the document, and
   wherein the tetragon bounds the digital representation of the document.

20. computer program product comprising a non-transitory computer readable medium having embodied therewith computer readable program code, the computer readable program code comprising:
   computer readable program code configured to capture image data using a mobile device, the image data depicting a digital representation of a document;
   computer readable program code configured to define, based on the image data, a plurality of candidate edge points corresponding to the document;
   computer readable program code configured to define four sides of a tetragon based on at least some of the plurality of candidate edge points; and
   computer readable program code configured to determine a document type corresponding to the document is one of:

"loan document;" "data relating to loan application;" "data not relating to loan application;" and "unknown"; and
computer readable program code configured to display at least one of:
loan-relevant information from the captured image; and
a loan status corresponding to the document, wherein the displaying is performed using a display of the mobile device.

* * * * *

UNITED STATES PATENT AND TRADEMARK OFFICE
CERTIFICATE OF CORRECTION

PATENT NO. : 9,117,117 B2  
APPLICATION NO. : 14/569375  
DATED : August 25, 2015  
INVENTOR(S) : Macciola et al.

Page 1 of 1

It is certified that error appears in the above-identified patent and that said Letters Patent is hereby corrected as shown below:

In the claims:

col. 74, line 53 claim 20 replace "computer program" with --A computer program--.

Signed and Sealed this  
Twenty-second Day of March, 2016

Michelle K. Lee  
*Director of the United States Patent and Trademark Office*